(12) United States Patent
Barnes et al.

(10) Patent No.: US 7,382,787 B1
(45) Date of Patent: Jun. 3, 2008

(54) PACKET ROUTING AND SWITCHING DEVICE

(75) Inventors: Peter M. Barnes, Mountain View, CA (US); Nikhil Jayaram, Los Altos, CA (US); Anthony J. Li, San Mateo, CA (US); William L. Lynch, Redwood City, CA (US); Sharad Mehrotra, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1044 days.

(21) Appl. No.: 10/177,496

(22) Filed: Jun. 20, 2002

Related U.S. Application Data

(60) Provisional application No. 60/309,042, filed on Jul. 30, 2001, provisional application No. 60/309,087, filed on Jul. 30, 2001.

(51) Int. Cl.
*H04L 12/28* (2006.01)
(52) U.S. Cl. .................. 370/401; 370/414; 370/473
(58) Field of Classification Search .............. 370/392, 370/389, 349, 395.31
See application file for complete search history.

(56) References Cited

U.S. PATENT DOCUMENTS

| | | | |
|---|---|---|---|
| 5,524,258 A | 6/1996 | Corby, Jr. et al. | |
| 5,734,649 A | 3/1998 | Carvey et al. | |
| 5,781,772 A | 7/1998 | Wilkinson, III et al. | 395/600 |
| 5,802,278 A | 9/1998 | Isfeld et al. | |
| 5,838,894 A | 11/1998 | Horst | |
| 5,905,725 A | 5/1999 | Sindhu et al. | 370/389 |
| 5,909,440 A | 6/1999 | Ferguson et al. | 370/389 |
| 5,923,643 A | 7/1999 | Higgins et al. | |
| 5,930,256 A | 7/1999 | Greene et al. | |
| 6,011,795 A | 1/2000 | Varghese et al. | 370/392 |
| 6,018,524 A | 1/2000 | Turner et al. | 370/392 |
| 6,078,963 A | 6/2000 | Civanlar et al. | 709/238 |
| 6,091,725 A | 7/2000 | Cheriton et al. | 370/392 |
| 6,101,192 A | 8/2000 | Wakeland | 370/429 |
| 6,161,139 A | 12/2000 | Win et al. | |
| 6,308,219 B1 * | 10/2001 | Hughes | 709/238 |
| 6,430,181 B1 | 8/2002 | Tuckey | |
| 6,453,413 B1 | 9/2002 | Chen et al. | |
| 6,526,055 B1 * | 2/2003 | Perlman et al. | 370/392 |

(Continued)

OTHER PUBLICATIONS

"Xelerated Packet Devices", MicroDesign Resources Presentation, Network Processor Forum, pp. 1-11, (Jun. 14, 2001).

(Continued)

*Primary Examiner*—Chau Nguyen
*Assistant Examiner*—Kenneth R Hartmann
(74) *Attorney, Agent, or Firm*—Schwegman, Lundberg & Woessner, P.A.

(57) ABSTRACT

A method for routing and switching data packets from one or more incoming links to one or more outgoing links of a router. The method comprises receiving a data packet from the incoming link, assigning at least one outgoing link to the data packet based on the destination address of the data packet, and after the assigning operation, storing the data packet in a switching memory based on the assigned outgoing link. The data packet extracted from the switching memory, and transmitted along the assigned outgoing link. The router may include a network processing unit having one or more systolic array pipelines for performing the assigning operation.

29 Claims, 56 Drawing Sheets

U.S. PATENT DOCUMENTS

| | | |
|---|---|---|
| 6,631,419 B1 | 10/2003 | Greene |
| 6,658,002 B1 | 12/2003 | Ross et al. |
| 6,675,187 B1 | 1/2004 | Greenberger |
| 6,687,781 B2 | 2/2004 | Wynne et al. |
| 6,721,316 B1 * | 4/2004 | Epps et al. ................. 370/389 |
| 6,731,633 B1 | 5/2004 | Sohor et al. |
| 6,732,203 B2 | 5/2004 | Kanapathippillai et al. |
| 6,751,191 B1 | 6/2004 | Kanekar et al. |
| 6,778,490 B1 | 8/2004 | Achilles et al. |
| 6,785,728 B1 | 8/2004 | Schneider et al. |
| 6,795,886 B1 | 9/2004 | Nguyen |
| 6,801,950 B1 | 10/2004 | O'Keeffe et al. |
| 6,804,815 B1 | 10/2004 | Kerr et al. |
| 6,879,559 B1 | 4/2005 | Blackmon et al. |
| 6,922,724 B1 | 7/2005 | Freeman et al. |
| 6,944,183 B1 | 9/2005 | Iyer et al. |
| 6,944,860 B2 | 9/2005 | Schmidt |
| 6,961,783 B1 | 11/2005 | Cook et al. |
| 6,965,615 B1 * | 11/2005 | Kerr et al. ................. 370/474 |
| 6,973,488 B1 | 12/2005 | Yavatkar et al. |
| 6,990,527 B2 | 1/2006 | Spicer et al. |
| 7,006,431 B1 | 2/2006 | Kanekar et al. |
| 7,020,718 B2 | 3/2006 | Brawn et al. |
| 7,028,098 B2 | 4/2006 | Mate et al. |
| 7,043,494 B1 | 5/2006 | Joshi et al. |
| 7,051,039 B1 | 5/2006 | Murthy et al. |
| 7,051,078 B1 | 5/2006 | Cheriton |
| 7,054,315 B2 | 5/2006 | Liao |
| 7,054,944 B2 | 5/2006 | Tang et al. |
| 7,073,196 B1 | 7/2006 | Dowd et al. |
| 7,095,713 B2 | 8/2006 | Willhite et al. |
| 7,103,708 B2 | 9/2006 | Eatherton et al. |
| 7,111,071 B1 * | 9/2006 | Hooper ....................... 709/238 |
| 7,124,203 B2 | 10/2006 | Joshi et al. |
| 7,139,238 B2 | 11/2006 | Hwang |
| 7,155,518 B2 | 12/2006 | Forslow |
| 7,159,125 B2 | 1/2007 | Beadles et al. |
| 7,185,365 B2 | 2/2007 | Tang et al. |
| 7,200,144 B2 | 4/2007 | Terrell et al. |
| 7,200,865 B1 | 4/2007 | Roscoe et al. |
| 7,203,171 B1 | 4/2007 | Wright |
| 7,225,204 B2 | 5/2007 | Manley et al. |
| 7,225,263 B1 | 5/2007 | Clymer et al. |
| 7,227,842 B1 | 6/2007 | Ji et al. |
| 7,230,912 B1 | 6/2007 | Ghosh et al. |
| 7,231,661 B1 | 6/2007 | Villavicencio et al. |
| 7,239,639 B2 | 7/2007 | Cox et al. |
| 7,249,374 B1 | 7/2007 | Lear et al. |
| 7,257,815 B2 | 8/2007 | Gbadegesin et al. |
| 7,274,702 B2 | 9/2007 | Toutant et al. |
| 7,280,975 B1 | 10/2007 | Donner |
| 7,302,701 B2 | 11/2007 | Henry |
| 2002/0035639 A1 | 3/2002 | Xu |
| 2003/0108056 A1 | 6/2003 | Sindhu et al. |
| 2003/0163589 A1 | 8/2003 | Bunce et al. |
| 2004/0024888 A1 | 2/2004 | Davis et al. |
| 2006/0117126 A1 | 6/2006 | Leung et al. |
| 2006/0159034 A1 | 7/2006 | Talur et al. |

OTHER PUBLICATIONS

Cataldo, Anthony, "Net Processor Startup Takes Pipelined Path to 40 Gbits/s", EE Times, http://www.eetimes.com/story/OEG20010702S0061, (Jul. 2, 2001).

Kung, H. T. et al. "Algorithms for VLSI Processor Arrays", In Introduction to VLSI Systems, Mead C. et al., Eds. Addison-Wesley, Reading, Mass., pp. 271-292 (1980).

Partridge, Craig et al., "A 50-Gb/s Router", IEEE/ACM Transactions on Networking, vol. 6, No. 3, (Jun. 1998).

Degermark, Mikael et al., "Small Forwarding Tables for Fast Routing Lookups", Lulea University of Technology, (date unknown).

Lampson, B. et al., "IP Lookups Using Multiway and Multicolumn Search", (Aug. 1, 1997).

Gupta, Pankaj et al., "Routing Lookups in Hardware at Memory Access Speeds", Stanford University, IEEE Infocom http://www.stanford.edu, (Apr. 1998).

McAuley, Anthony J. et al., "Fast Routing Table Lookup Using CAMs", http://www.citeseer.nj.nec.com, Infocom '93, (Mar.-Apr. 1993).

Lindberg, Klaus, Multi-gigabit Routers, http://www.tml.hut.fi/Opinnot/Tik-110.551/1998/papers, (May 3, 1998).

Belenkiy, Andrey, "Deterministic IP Table Lookp at Wire Speed", New Jersey Institute of Technology, http://www.isoc.org/inet99/proceedings/4j/4j_2.htm, (printed Jul. 24, 2000).

Chiueh, Tzi-cker et al., "High-Performance IP Routing Table Lookup Using CPU Caching", State University of New York, Proceedings of IEEE Infocom, http://citeseer.nj.nec.com/216222.html, (1999).

Waldvogel, Marcel et al., "Scalable High Speed IP Routing Lookups", Computer Engineering and Networks Laboratory, http://citeseer.nj.nec.com/did/12751, (1997).

"What's Inside a router?", http://www-net.cs.umass.edu/kurose/network/inside/inside.htm, (observed Aug. 29, 2005), 11 pgs.

Gupta, P., et al., "Classifying Packets with Hierarchical Intelligent Cuttings", *IEEE Micro, 21 (1),* (Jan./Feb. 2000), 34-41.

Gupta, P., et al., "Packet Classification on Multiple Fields", *Proceedings of the Conference on Applications, Technologies, Architectures, and Protocols for Computer Communication (ACM SIGCOMM '99),* (1999), 147-160.

Lakshman, T. V., et al., "High-Speed Policy-Based Packet Forwarding Using Efficient Multi-Dimensional Range Matching", *Proceedings of the Conference on Applications, Technologies, Architectures, and Protocols for Computer Communications (ACM SIGCOMM '98),* (1998), 203-214.

Qui, L., et al., "Fast Firewall Implementations for Software and Hardware-Based Routers", *Microsoft Technical Report MSR-TR-2001-61,* (Jun. 2001), 18 pgs.

Srinivasan, V., et al., "Fast and Scalable Layer Four Switching", *Proceedings of the Conference on Applications, Technologies, Architectures, and Protocols for Computer Communications (ACM SIGCOMM '98),* (1998), 191-202.

Srinivasan, V., et al., "Packet Classification Using Tuple Space Search", *Proceedings of the Conference on Applications, Technologies, Architectures, and Protocols (ACM SIGCOMM '99),* (1999), 135-146.

"U.S. Appl. No. 10/177,187, Final Office Action mailed Jun. 29, 2005", 9 p.

"U.S. Appl. No. 10/177,187, Non-Final Office Action mailed Nov. 18, 2004", 13 p.

"U.S. Appl. No. 10/177,187, Notice of Allowance mailed Sep. 22,2005", 6 p.

"U.S. Appl. No. 10/177,187, Response filed Apr. 18, 2005 to Non-Final Office Action mailed Oct. 18, 2004", 9 p.

"U.S. Appl. No. 10/177,187, Response filed Aug. 29, 2005 to Final Office Action mailed Oct. 18, 2004", 10 p.

"U.S. Appl. No. 10/407,528 Non-Final Office Action mailed Jun. 29, 2007", 20 p.

"U.S. Appl. No. 10/414,133, Final Office Action mailed Aug. 8, 2007", 13 p.

"U.S. Appl. No. 10/414,133, Non-Final Office Action mailed Feb. 23, 2007", 11 p.

"U.S. Appl. No. 10/414,133, Response filed May 22, 2007 to Non-Final Office Action mailed Feb. 23, 2007", 9 p.

"U.S. Appl. No. 10/414.135 Final Office Action mailed Sep. 11, 2007", 25 p.

"U.S. Appl. No. 10/414,135, Non-Final Office Action mailed Mar. 8, 2007", 10 p.

"U.S. Appl. No. 10/414,135, Response filed Jun. 5, 2007 to Non-Final Office Action mailed Mar. 8, 2007", 10 p.

"U.S. Appl. No. 10/414,137, Final Office Action mailed Sep. 11, 2007", 3 p.

"U.S. Appl. No. 10/418,634, Non-Final Office Action mailed Sep. 14, 2007", 21 p.

Ballardie, A., "Core Based Trees (CBT) Multicast Routing Architecture", RFC 2201, (Saptember 1997), 1-15.

Finseth, C. "An Access Control Protocol, Sometimes Called TACACS", RFC 1492, (Jul. 1993), 1-21.

Kille, S., "Representing the O/R Address Heirarchy in the X.500 Directory Information Tree", RFC 2294, (Mar. 1998), 1-13.

Myers, J., "IMAP4 ACL Extension", RFC 2086, (Jan. 1997), 1-8.

Stokes, E., et al., "Access Control Requirements for LDAP", RFC 2820, (May 2000), 1-9.

Wijnen, B. et al., "View-Based Access Control Model (VACM) for the Simple Network Management Protocoi (SNMP)", RFC 2575, (Apr. 1999), 1-38.

* cited by examiner

| Inst 1 | F | D | E | W | ... | ... | |
|---|---|---|---|---|---|---|---|
| Inst 2 | ... | F | D | E | W | | |
| Inst 3 | ... | ... | F | D | E | W | |
| Inst 4 | ... | ... | ... | F | D | E | W |

Time ⟶

Delta Count Flow

P₁: Q₂, 7 cells
P₂: Q₆, 4 cells
P₃: Q₁, 6 cells
P₄: Q₂, 8 cells

NMT₀ ($t_0$)

| Q | MCU |
|---|-----|
| 0 | -   |
| 1 | 3   |
| 2 | 4   |
| 3 | -   |
| 4 | -   |
| 5 | -   |
| 6 | 4   |

NMT₁ ($t_{p1}$)

| Q | MCU |
|---|-----|
| 0 | -   |
| 1 | 3   |
| 2 | 11  |
| 3 | -   |
| 4 | -   |
| 5 | -   |
| 6 | 4   |

NMT₂ ($t_{p2}$)

| Q | MCU |
|---|-----|
| 0 | -   |
| 1 | 3   |
| 2 | 11  |
| 3 | -   |
| 4 | -   |
| 5 | -   |
| 6 | 8   |

NMT₃ ($t_{p3}$)

| Q | MCU |
|---|-----|
| 0 | -   |
| 1 | 9   |
| 2 | 11  |
| 3 | -   |
| 4 | -   |
| 5 | -   |
| 6 | 8   |

NMT₄ ($t_{p4}$)

| Q | MCU |
|---|-----|
| 0 | -   |
| 1 | 9   |
| 2 | 7   |
| 3 | -   |
| 4 | -   |
| 5 | -   |
| 6 | 8   |

Fig. 33A

|           | MCU₀ | MCU₁ | MCU₂ | MCU₃ | MCU₄ | MCU₅ | MCU₆ | MCU₇ | MCU₈ | MCU₉ | MCU₁₀ | MCU₁₁ |
|-----------|------|------|------|------|------|------|------|------|------|------|-------|-------|
| $t_{p1}$  |      |      |      |      | $C_{1H}$ | $C_{11}$ | $C_{12}$ | $C_{13}$ | $C_{14}$ | $C_{15}$ | $C_{1T}$ |       |
| $t_{p2}$  |      |      |      |      | $C_{2H}$ | $C_{21}$ | $C_{22}$ | $C_{2T}$ |      |      |       |       |
| $t_{p3}$  |      |      |      | $C_{3H}$ | $C_{31}$ | $C_{32}$ | $C_{33}$ | $C_{34}$ | $C_{3T}$ |      |       |       |
| $t_{p4}$  |      |      |      |      |      |      |      |      |      |      |       | $C_{4H}$ |
|           | $C_{41}$ | $C_{42}$ | $C_{43}$ | $C_{44}$ | $C_{45}$ | $C_{46}$ | $C_{4T}$ |      |      |      |       |       |

Fig. 33B

MCU₄

|     |      |      |   |   |
|-----|------|------|---|---|
| Q₀  |      |      |   |   |
| Q₁  | $C_{31}$ |      |   |   |
| Q₂  | $C_{1H}$ | $C_{45}$ |   |   |
| Q₃  |      |      |   |   |
| Q₄  |      |      |   |   |
| Q₅  |      |      |   |   |
| Q₆  | $C_{2H}$ |      |   |   |

MCU₅

|     |      |      |   |   |
|-----|------|------|---|---|
| Q₀  |      |      |   |   |
| Q₁  | $C_{32}$ |      |   |   |
| Q₂  | $C_{11}$ | $C_{46}$ |   |   |
| Q₃  |      |      |   |   |
| Q₄  |      |      |   |   |
| Q₅  |      |      |   |   |
| Q₆  | $C_{21}$ |      |   |   |

MCU₆

|     |      |      |   |   |
|-----|------|------|---|---|
| Q₀  |      |      |   |   |
| Q₁  | $C_{33}$ |      |   |   |
| Q₂  | $C_{12}$ | $C_{4T}$ |   |   |
| Q₃  |      |      |   |   |
| Q₄  |      |      |   |   |
| Q₅  |      |      |   |   |
| Q₆  | $C_{22}$ |      |   |   |

Fig. 33C

PACKET ROUTING AND SWITCHING DEVICE

CROSS-REFERENCE TO RELATED APPLICATION

This application claims priority under 35 U.S.C. 119(e) to U.S. provisional patent application entitled "PACKET ROUTING AND SWITCHING DEVICE," Ser. No. 60/309,042 filed Jul. 30, 2001, the disclosure of which is hereby incorporated by reference in its entirety. This application is also related to the co-pending, commonly assigned patent application entitled "PROCESSING UNIT FOR EFFICIENTLY DETERMINING A PACKET'S DESTINATION IN A PACKET-SWITCHED NETWORK," filed on Jul. 30, 2001, Application No. 60/309,087, the disclosure of which is hereby incorporated by reference in its entirety.

FIELD OF THE INVENTION

This invention relates, in general, to network routers, and more particularly to a device for performing routing and switching in a packet-switched computer network.

BACKGROUND OF THE INVENTION

Computer networks often use packet-switching for transmitting messages, such as web pages and e-mail, along a path between a source and a destination on the network. An example of the basic topology of a packet-switched network is illustrated in FIG. 1, and the Internet is one example of a packet-switched network.

In a packet-switched network 10, messages to be transmitted are first divided into smaller discrete packets, which when transmitted may take different paths from a source 12 to a destination 14. When all of the packets arrive at the destination they are recompiled into the original message. The arrangement of the communication links or "hops" between the various devices of the packet-switched network is a partially connected mesh topology where many of the devices are not directly connected to the other devices. Therefore, transmitting messages over a packet-switched network requires a device at the intersection of the links to guide packets from one link to another link along the packet's path.

Guiding packets along the path from the source 12 to the destination 14 includes routing and switching functions. Routing involves the examination of the packet to determine, among other things, the address of the next device in the network to send the packet to, i.e., determining the outgoing link for the packet. Switching involves actually directing packets to the outgoing link that corresponds to the next device in the network, i.e., switching the packet from the incoming link to the outgoing link.

In a packet-switched network, a router 16 performs both routing and switching. Having multiple ports coupled with different links in the network, the router receives packets from an incoming link, examines a header of the packet to determine the outgoing link for the packet, and then transmits the packet on the outgoing link. The packet includes a portion of the message to be transmitted, and a header that includes destination information for the packet. In particular, routers make routing decisions based on an Internet Protocol (IP) destination address contained within the header. Generally, in a "lookup" operation, the router compares the IP destination address to a number of potential paths stored in a forwarding table, and then assigns the outgoing link to the packet. The header may also contain quality of service (QoS) data, which designates the priority with which the packet should be serviced by the router.

The IP destination address (or Layer 3 destination address) is a 32-bit identifier assigned to a device on a TCP/IP packet-switched network. The 32-bit IP address is subdivided into four numbers between 0 and 255 separated by periods, e.g., 10.230.15.255. The subdivisions of the IP address are hierarchical, representing from left to right greater specificity as to the destination for the packet. For example, the left most "10" portion of the exemplary address may represent the East Coast, the "230" portion may represent New York City, the "15" portion may represent a local area network ("LAN") in the Empire State Building, and "255" may represent the intended final destination in the LAN for the packet. To properly route a packet, a router 16 need only have an output port associated with a portion of the IP destination address, such as one of the subdivision. For example, the router might transmit all packets having an IP destination address beginning with "10" on the outgoing link attached with a second router on the East Coast, which will then determine where to send the packet to next. Accordingly, a packet may make several hops along its path from the source 12 to the destination 14.

The IP addressing scheme of a packet-switched network 10 provides for scalability of the network, in that each router 16 need not be directly connected with the destination 14 for the packet. To manage scalability, the addition or removal of devices from the network is tracked and updated by the routing or forwarding table, which is typically dynamic. Routing protocol software provides communication between routers on the network and updates the forwarding table in each router to reflect changes in the topology of the network.

Conventional routers can suffer from a "denial of service attack" wherein the route processor of a conventional router is interrupted each time a route processor destined packet is received by the router. If a hacker generates a large number of route processor destined packets to a particular router, then that router may experience performance problems, and possibly shut down, if the route processor is continually interrupted so that it can deal with the receipt and processing of the route processor destined the packets.

Packets come in many different sizes ranging from 20 bytes to thousands of bytes, and are generally transmitted into a router at a line rate of, for example, 40 gigabits per second (Gbps). It may be problematic for conventional routers to perform the required routing table lookup operations for a series of smaller sized packets flowing into the conventional router at the 40 Gbps line rate without having to drop packets. If a packet is dropped, then the packet must be retransmitted, which slows the overall message transmission time. To avoid dropping packets, conventional routers frequently are "input-striped" in that as they receive packets from the network, the packets are divided into a number of fixed length units referred to as "cells," and the cells are written to a large buffer memory before performing the forwarding table lookup operations and determining the outgoing link for the packet. Such an input-striping process makes the initial front end writing process into the buffer memory rather simple, however, it is often difficult to read out the cells and reassemble the cells into a packet because packets are processed out of order in general within the router, which adds latency to the transmission of the packet.

In conventional routers, the input buffer memory required to store the incoming packets while the lookup is performed must be large to avoid overflowing the input buffer memory. Moreover, an additional large switching memory is generally required to store the packets for a period of time after the lookup operations are performed, but before the packet is transmitted to the correct outgoing link of the router. Accordingly, in order to avoid duplication of large high-speed memories, prior art devices oftentimes use a single memory for both the input buffering and the switching memory.

Oftentimes input-striping involves storing the cells non-contiguously in whatever portions of the single memory are available. The cells then stay in the single memory while the lookup is performed and the QoS priority for the packet is determined. As a consequence, the storage of the cells in the single memory is not a function of the outgoing link for the packet or the QoS priority for the packet because the outgoing link and the priority are unknown at the time the packet is cellified and stored. As an additional consequence, when the conventional router is ready to transmit the packet, the cells of the packet must be located in the single memory and then extracted. This generally requires a significant memory management scheme including, for example, memory pointers, link lists, and link list arrays to find and extract the cells from the single memory.

As recognized by the present inventors, what is needed is a packet routing and switching device, such as a router, which provides lookup processing of any size packet at the incoming link line rate while reducing the risk that packets are dropped. It is against this background that various embodiments of the present invention were developed.

SUMMARY OF THE INVENTION

According to one broad aspect of one embodiment of the invention, disclosed herein is a method for routing and switching data packets from one or more incoming links to one or more outgoing links of a router. The method comprises receiving a data packet from the incoming link, assigning at least one outgoing link to the data packet based on the destination address of the data packet, and after the assigning operation, storing the data packet in a switching memory based on the assigned outgoing link. The data packet is extracted from the switching memory, and transmitted along the assigned outgoing link.

The operation of assigning an outgoing link to the data packet may include assigning a destination queue to the data packet, the destination queue being mapped to the assigned outgoing link, and the operation of storing the data packet in a switching memory may include the operation of storing the data packet in the assigned destination queue. The operation of storing the data packet in a switching memory may include dividing the data packet into at least two cells and storing the cells in the destination queue. In one embodiment, the cells are less than or equal to 34 bytes. The operation of storing the data packet in the switching memory may include storing the cells contiguously, in round robin order, in the destination queue.

In this manner, by writing data packets to the switching memory (in round-robin order, for instance) after an outgoing link of the router has been assigned to the data packets, the data packets can be quickly extracted from the switching memory for transmission out of the router along the assigned outgoing link.

According to another broad aspect of an embodiment of the invention, disclosed herein is a method of routing and switching data packets in a router, wherein each data packet has a packet header specifying a destination address for the packet. The method comprises providing a systolic array pipeline in communication with a forwarding table, receiving a data packet from an incoming link of the router, and looking-up the destination address in the forwarding table using the systolic array pipeline to assign the outgoing link to the data packet. The data packet is then stored in a memory, retrieved from the memory, and transmitted on the assigned outgoing link out of the router.

Other features, utilities and advantages of the various embodiments of the invention will be apparent from the following more particular description of embodiments of the invention as illustrated in the accompanying drawings.

BRIEF DESCRIPTION OF THE DRAWINGS

FIG. 33A illustrates an example of a set of next MCU tables (NMT), in accordance with one embodiment of the present invention.

FIG. 33B illustrates an example of writing of cells to the MCUs, in accordance with one embodiment of the present invention.

FIG. 33C illustrates an example of storage of cells in queues, in accordance with one embodiment of the present invention.

DETAILED DESCRIPTION OF EMBODIMENTS OF THE INVENTION

Figure 1:
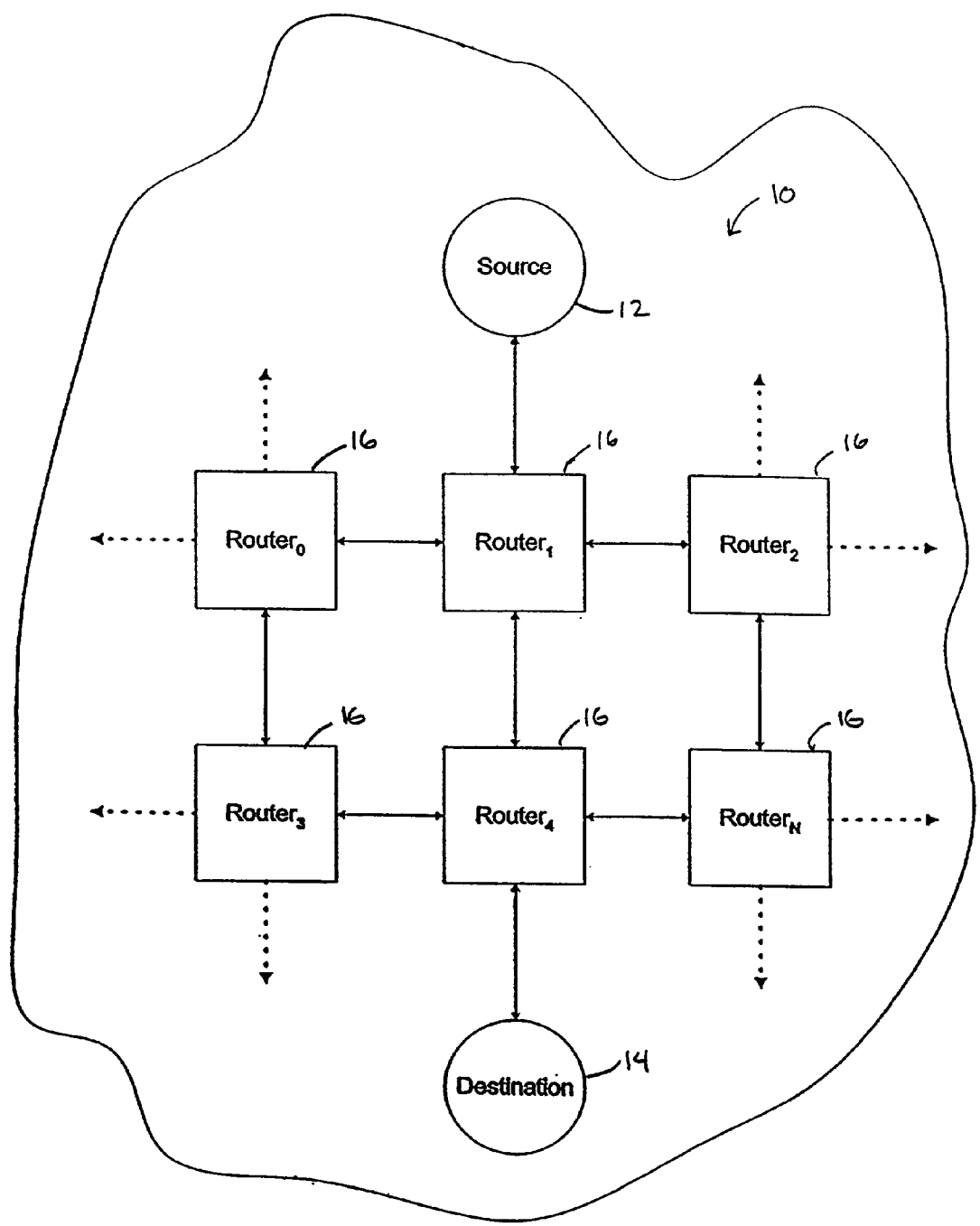
FIG. 1 illustrates one example of the basic topology of a packet-switched network, such as the Internet, having a source, a destination, and a plurality of routers therebetween.

This detailed description of embodiments of the present invention is subdivided into six sections: section I ("Introduction"); section II ("Method for Routing and Switching a Packet"); section III ("Input-side of the Interface Subsystems"); section IV ("Switching Engine"); section V ("Output-side of the Interface Subsystems"); and, section VI ("Redundancy and Scalability"). The introduction provides a description of components of a router and a description of an architecture for a router, according to various embodiments.

The second section describes methods of routing and switching a packet, including a discussion of the flow of a packet through a router and various operations performed by a router as the packet flows therethrough. Unlike conventional routers, one example of a method of routing and switching according to the present invention includes performing a forwarding table lookup operation for a packet before the packet is cellified and stored for switching. Accordingly, an outgoing link for the packet is determined before the packet is cellified, which is advantageous because the cells may then be stored in a switching memory as a function of the outgoing link, thereby making retrieval of the cells from memory efficient and fast.

The third section provides a discussion of the input-side of the interfaces of a router that receive and transmit packets, as well as components of a router which perform various network processing operations—(collectively referred to as the "interface subsystem"). Conceptually, the router has an input-side and an output-side. The input-side receives packets from an incoming link, and performs various network processing operations, including routing. For instance, a network processing unit (NPU) performs many network processing operations, such as a forwarding table lookup operation at the incoming line rate, which facilitates the ability of a router of the present invention to perform routing and switching without input-striping.

The fourth section provides a discussion of a switching engine of a router, which includes a switching memory for the cellified packets. After being processed by the input-side of the interface subsystem, a packet is transmitted to a switching engine where the packet is cellified, and the cells are stored in a switching memory. Because an outgoing link for a packet is known before the packet reaches the switching engine, the switching memory may be arranged so that the cells of the packet are stored in destination queues that are mapped to the outgoing link on which the packet can be transmitted.

The fifth section provides a discussion of the output-side of the interface subsystem of a router, the output-side reassembling into packets the cells received from the switching engine, and the output-side transmitting the reassembled packets to the proper outgoing link.

The sixth section provides a discussion of redundancy and scalability in various embodiments of a router. Redundancy is advantageous because it permits a router to operate at or near its standard operating characteristics despite some components being off-line due to a failure, an upgrade, or other reasons. Embodiments of the router are also scalable, which allows the same components of a router to be used in a variety of different configurations to provide different levels of reliability and performance.

I. Introduction

Figure 2:
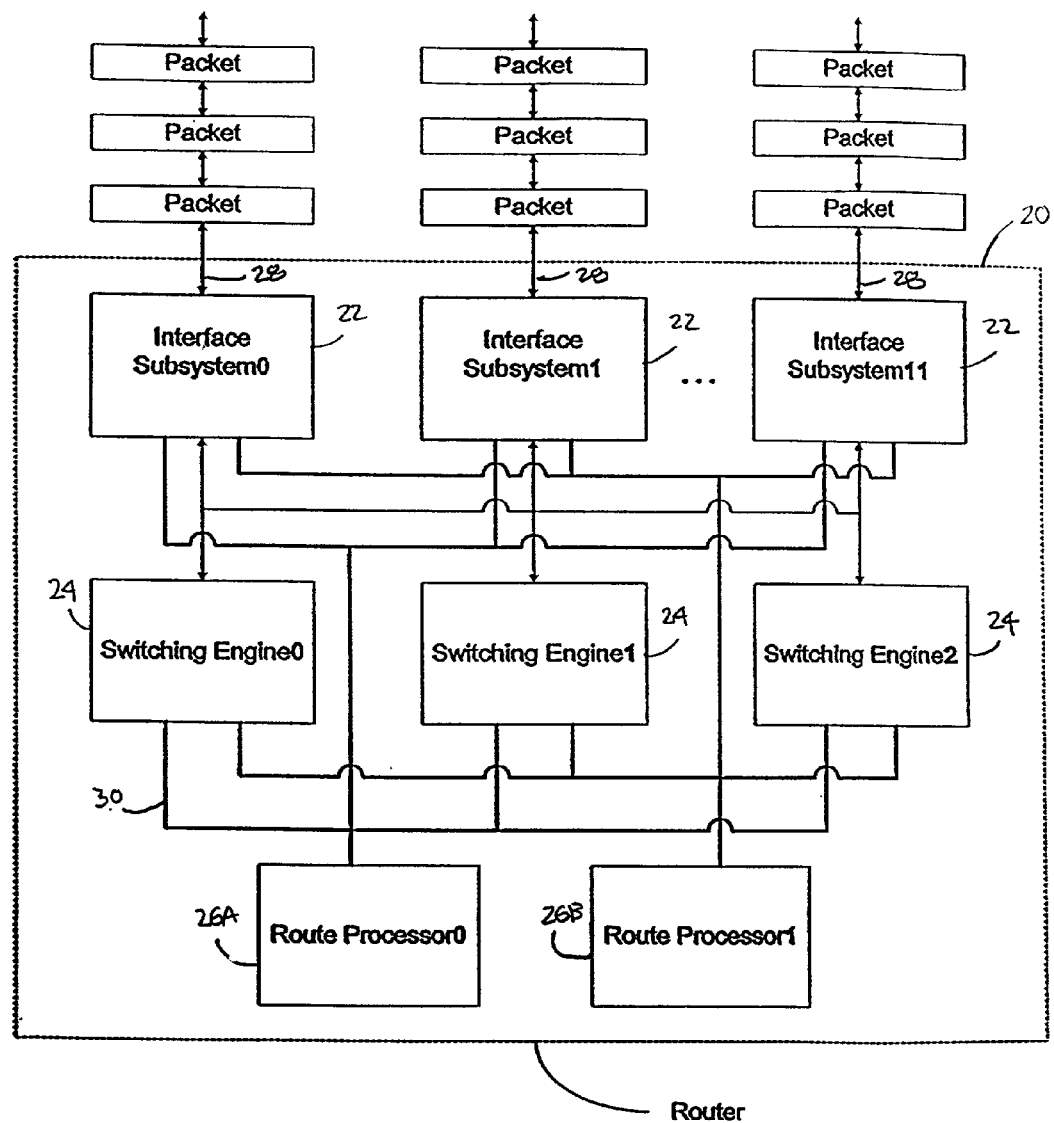
FIG. 2 illustrates a block diagram of a router, in accordance with one embodiment of the present invention.

FIG. 2 illustrates a high-level block diagram of a packet routing and switching device 20, or router, according to one example of the present invention for passing packet-switched data from an incoming link to an outgoing link. In one embodiment, a router 20 includes at least one interface subsystem 22, at least one switching engine 24, and at least one route processor 26, the functionality of each is described in detail below. In one example, a full-scale router includes 12 interface subsystems, three switching engines, and two route processors. A router may include full-scale configurations, or may be implemented as scaled down or "cut-down" embodiments of the packet routing and switching device.

The interface subsystem 22 provides an interface between the router 20 and the network in which the router is connected. As mentioned above, conceptually a router has an input-side and an output-side. On the input-side of a router, each interface subsystem performs various operations on the packets including receiving packets from the incoming link of the network and determining the outgoing link to transmit the packet on. On the output-side of the router, each interface subsystem performs additional operations including receiving cells from the switching engines 24, reassembling the packets, and transmitting packets to the outgoing link, in one embodiment.

The interface subsystem 22 includes a plurality of bi-directional ports 28 that are connected with the links in the network. Being bi-directional, the ports both receive packets from the links and transmit packets to the links. After a packet is received, the interface subsystem determines routing information for the packet including the destination or outgoing link for the packet. One advantage of an embodiment of the present invention is that the operations to determine routing information for a packet are performed at the incoming link line rate, such as 40 Gbps. Accordingly, the packet may be cellified, and the cells stored in memory as a function of the routing information for the packet—this process is referred to herein as "output-striping." Therefore, input-striping may be avoided, i.e., packets need not be divided into cells and stored in memory before the routing information for the packet is determined, as with conventional routers. In one embodiment, a plurality of destination queues are implemented in a switching memory, wherein each destination queue is mapped to an outgoing link. When a new packet is received by the router, it is assigned to a destination queue corresponding to the outgoing link for the packet, and then the packet is stored in the destination queue in FIFO order. The packet is transmitted to the outgoing link when it reaches the front of the queue, after the other packets before it in the queue are transmitted.

In one embodiment, each interface subsystem 22 is connected with two of the three switching engines 24 in a full-scale router 20, which provides redundancy so that the router will function if one of the switching engines is off-line.

In one embodiment, the switching engine 24 receives a packet from one of the interface subsystems 22, cellifies the packet, and temporarily stores the cells in a destination queue associated with the outgoing link for the packet. The cells are output-striped in that the cells are stored, in one embodiment contiguously, in memory as a function of the output for the packet. The cells are stored in the destination queue until the interface subsystem associated with the outgoing link for the packet requests the packet for transmission, at which time the switching engine transmits the cells to the interface subsystem. The packet is then reassembled and transmitted along the port 28 connected with the outgoing link for the packet.

Output-striping is advantageous because, in one embodiment, in order to extract all cells from memory of the switching engine 24, the interface subsystem 22 simply needs to know the location of the first cell of the packet in the destination queue, and the number of cells in the packet. In one example, the cells are stored contiguously in memory and the interface subsystem sends requests in round robin order to each memory device associated with the cells. In contrast, as previously discussed, prior art devices utilize input-striping, cellifying the packet and storing the cells arbitrarily in memory before performing lookup operations. Accordingly, prior art devices implement complicated extraction operations to extract cells from memory, which can reduce the overall throughput of the router.

The route processor (RP) 26 shown in FIG. 2 performs several overall management and configuration tasks for the router 20 including running routing protocols that configure a forwarding table that the interface subsystems 22 use to determine the outgoing link for the packet. In one version of a full-scale embodiment, a router includes two route processors (26A, 26B) which provide redundancy to the router in the event that one of the RP's fail. The route processors are connected with the switching engines 24 and the interface subsystems via a control plane interface (CPI) 30.

Figure 3A:
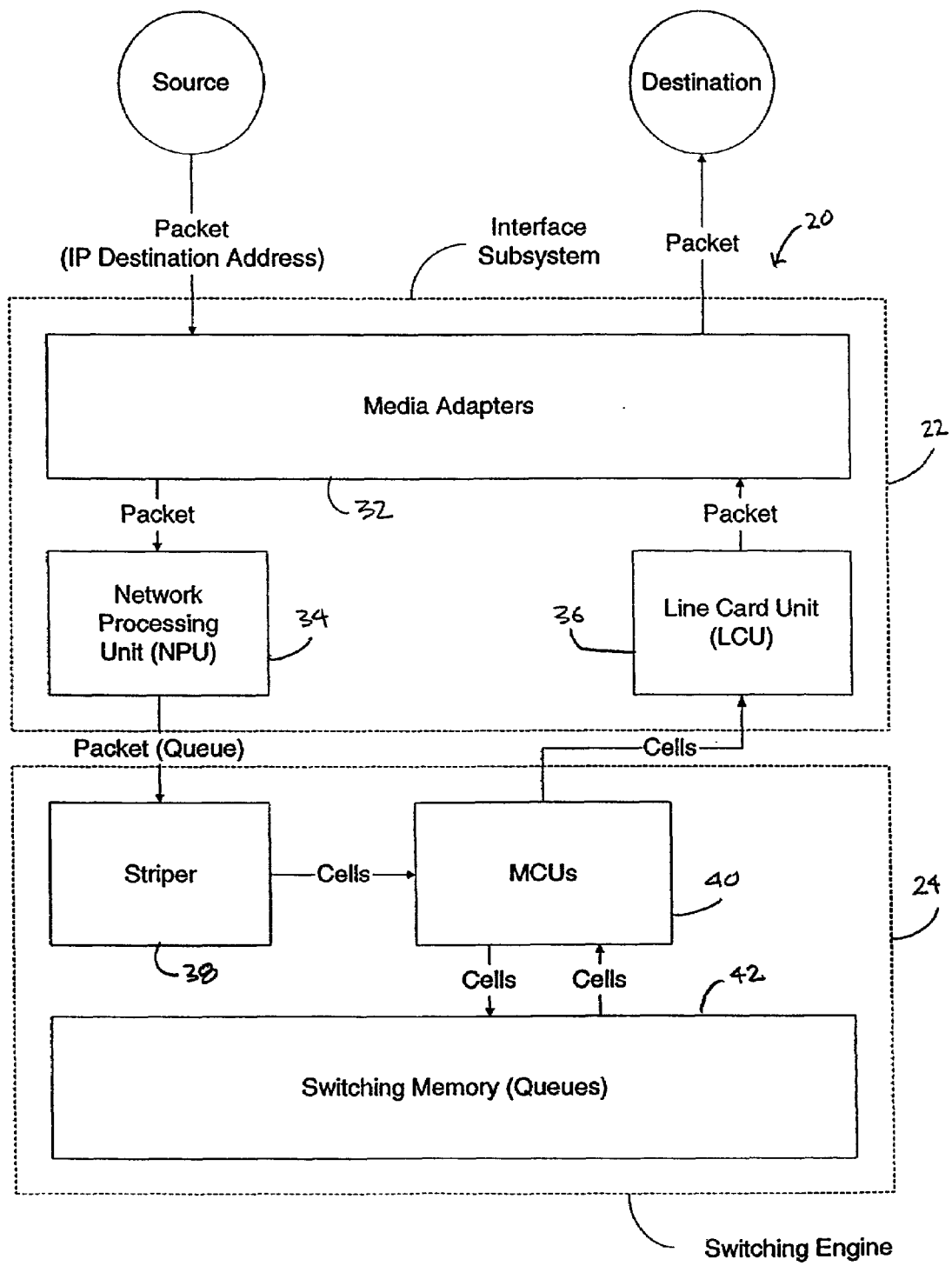
FIG. 3A illustrates a block diagram of a router including an interface subsystem and a switching engine, in accordance with one embodiment of the present invention.
Figure 3B:
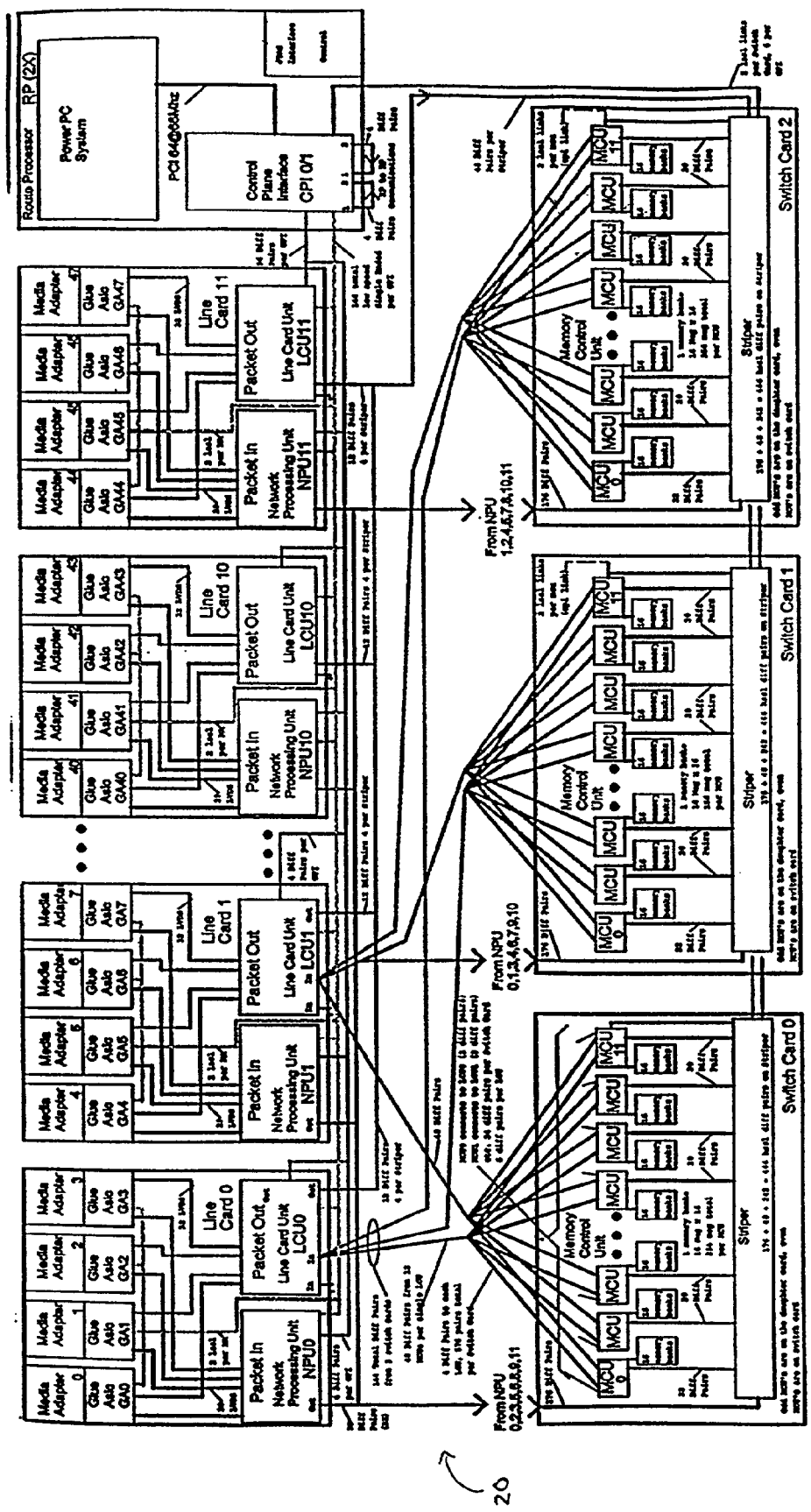
FIG. 3B illustrates a block diagram of a full-scale router including a plurality of interface subsystems and a plurality of switching engines, in accordance with one embodiment of the present invention.

Referring now to FIG. 3A, a block diagram of a router 20 is shown, according to one embodiment, illustrating a packet flow from the input-side of the interface subsystem 22, to the switching engine 24, and to the output-side of interface subsystem. Referring also to FIG. 3B, a block diagram of a full-scale router 20 is shown, in accordance with one embodiment of the present invention. The input-side of the interface subsystem includes a media adapter (MA) 32 connected with the incoming link for receiving packets from the incoming link and performing formatting operations on the packet. The input-side of the interface subsystem also includes a forwarding engine or network processing unit (NPU) 34 for receiving packets from the MA, and then analyzing the packet header and assigning a destination queue to the packet based on the packet header information. The destination queues are each associated with an outgoing link and are described in more detail below. The NPU is connected with the switching engine 24 and transmits packets along with associated destination queue information thereto, in one embodiment.

On the output-side, the interface subsystem also includes an output processing unit or line card unit (LCU) 36 that is connected with the output-side of the switching engine 24 for receiving cells therefrom.

The switching engine 24 is connected between the input-side and the output-side of the interface subsystems 22. In particular, the input-side of the switching engine is connected with the NPU 34, and the output-side of the switching engine is connected with the LCU 36. On the input-side, the switching engine includes a cellification engine or striper 38 that receives a packet from the NPU and divides the packet into one or more cells. In one embodiment the striper 38 is connected with at least one memory control unit (MCU) 40 managing at least one destination queue 42 where the cellified packet is stored. The destination queues are physically implemented in a series of high-speed memory units connected with the MCUs. On the output-side, the MCUs are connected with the LCU.

Generally, when an outgoing link associated with a destination queue is available, the LCU 36 issues a request to the switching engine 24 for the next packet in the associated destination queue. After receiving the cells of the requested packet, the LCU, amongst other operations, reassembles the packet and transmits the reassembled packet to the media adapter 32 associated with the outgoing link for the packet.

II. Method for Routing and Switching a Packet

Figure 4:
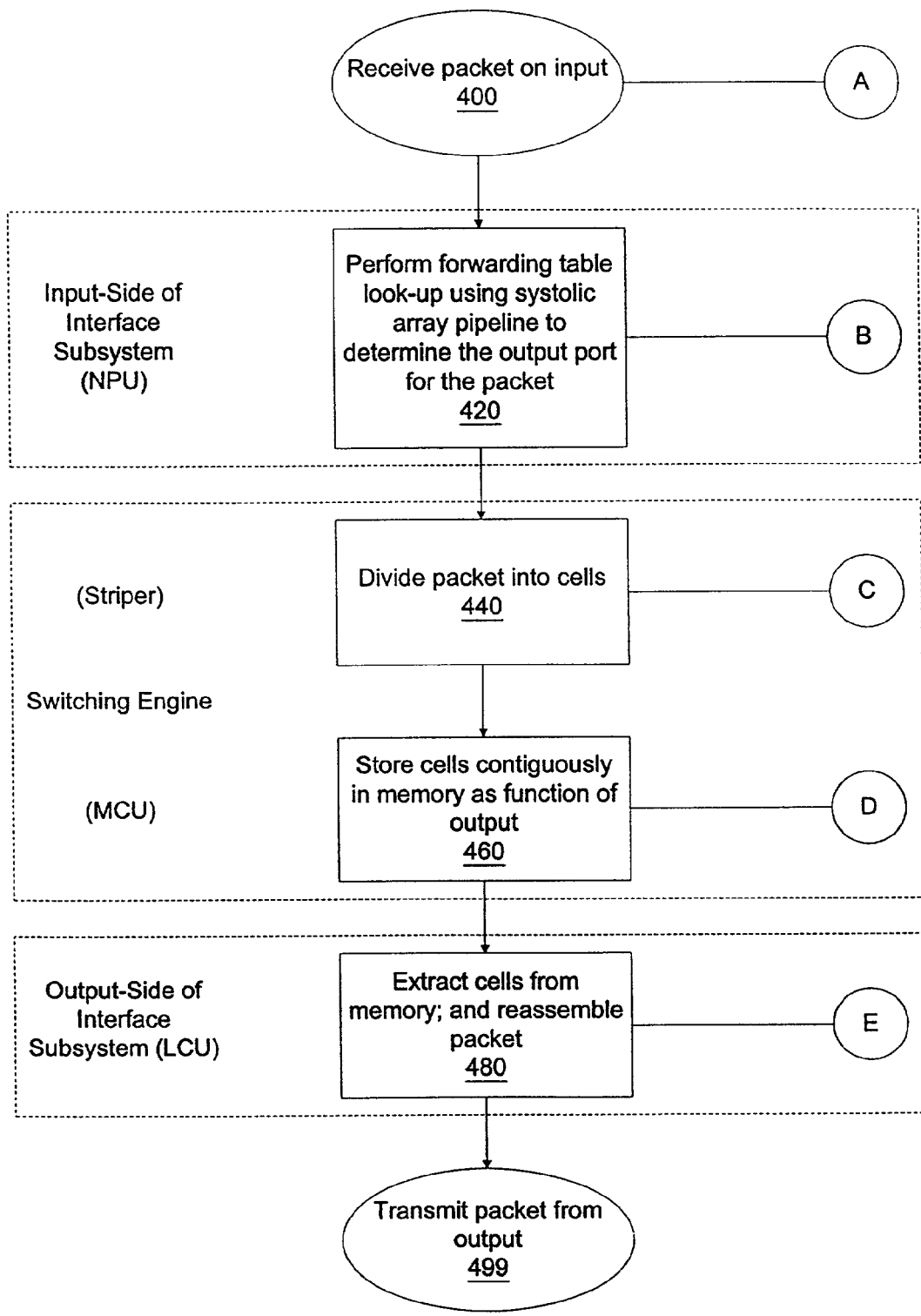
FIG. 4 illustrates a flowchart of an example of the operations for routing and switching a packet, in accordance with one embodiment of the present invention.

In accordance with one embodiment of the present invention, FIG. 4 illustrates one example of the operations of routing and switching a unicast packet from the time that the packet is received by a router 20 until the time the packet is transmitted by the router. The router may support routing and switching of both unicast and multicast packets. A unicast packet is generally considered a packet with a single destination, whereas a multicast packet is generally considered a packet with multiple destinations. FIG. 4 references the components of the interface subsystems 22 and the switching engines 24 shown in FIGS. 2, 3, 5 and others, showing the processes that occur as a packet flows through the router, in one embodiment.

Referring to FIG. 4, in operation 400, a packet is received by the input-side of the interface subsystem 22 from an incoming link coupled with the network. In operation 420 the packet's destination port is determined. In one embodiment, the NPU 34 performs routing operations including a forwarding table lookup operation based on the packet header, so that an output port can be assigned to the packet. The NPU may include a systolic array pipeline, which is discussed in more detail below, to perform the forwarding table lookup and other operations. The NPU completes the lookup process and a destination port or output queue of the router 20 is assigned to the packet—before the packet is cellified or striped to memory, in one example of the invention.

In operation 440, the packet is divided into cells. In one embodiment, the NPU 34 transmits the packet to the switching engine 24 where the packet is divided into cells. In operation 460, the cells are output-striped into the switching memory 42, i.e., the cells are stored contiguously in memory as function of the output interface previously assigned based on the packet's destination address.

In operation 480, the cells are removed from the memory, and are reassembled for transmission along the proper outgoing link. In one embodiment, the LCU 36 requests the cells from the switching engine 24, and reassembles the packet after the cells have been received. The output-striping of the cells by the striper 38 is advantageous because the cell locations are always known, and in order to request cells only the location of the first cell is required because all remaining cells are stored contiguously. In operation 499, after the packet is reassembled, it is transmitted from the LCU 36 to the appropriate outgoing link.

Figure 5A:
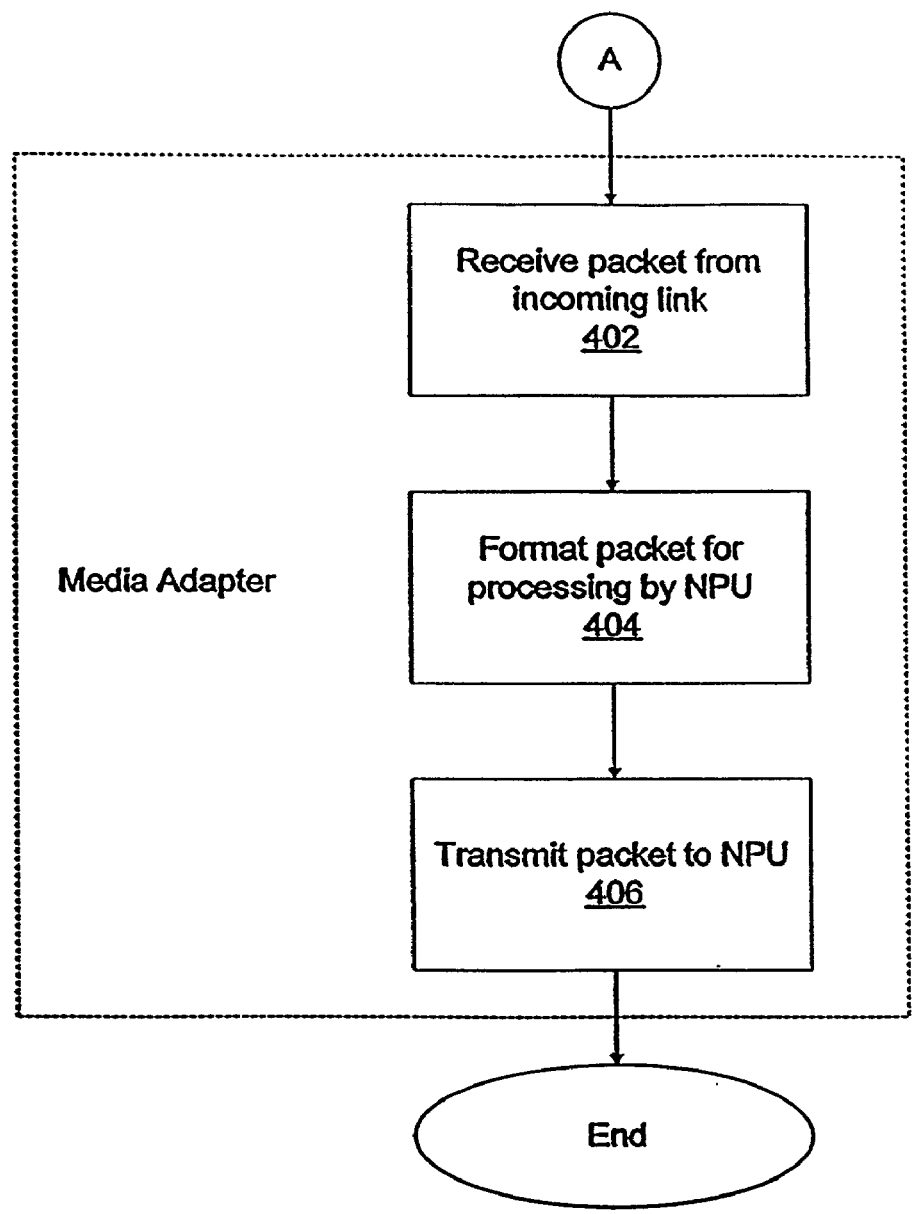
FIG. 5A illustrates a flowchart of an example of the operations for receiving a packet in a router, in accordance with one embodiment of the present invention.

FIGS. 5A-5E illustrate operations associated with each primary operation shown in FIG. 4. FIG. 5A illustrates the operations for receiving a packet, which are performed by the MA 32 in one embodiment. In operation 402, the MA receives a packet on a port 28 connected with an incoming link. As discussed herein, the term "incoming link" is used to conceptually refer to a link on which packets are streaming into the router 20, and the term "outgoing link" is used to conceptually refer to a link on which packets are streaming out of the router. The links, like the ports 28, however, may be bi-directional, and accordingly messages may be both flowing into and out of the router on the links. In operation 404, the MA formats the packet for processing by the NPU 34. Generally, formatting includes adding information to the header and removing information from the header to facilitate subsequent operations performed by the router.

In operation 406, the MA 32 transmits the packets to the NPU 34. In one example, the MA transmits packets to the NPU in fragments, as they are received. The last fragment of any given packet may be marked to indicate the end of the packet. After all of the fragments of the packet have been transmitted to the NPU, the MA can send a signal to the NPU that the transmission of the packet is complete.

Figure 5B:
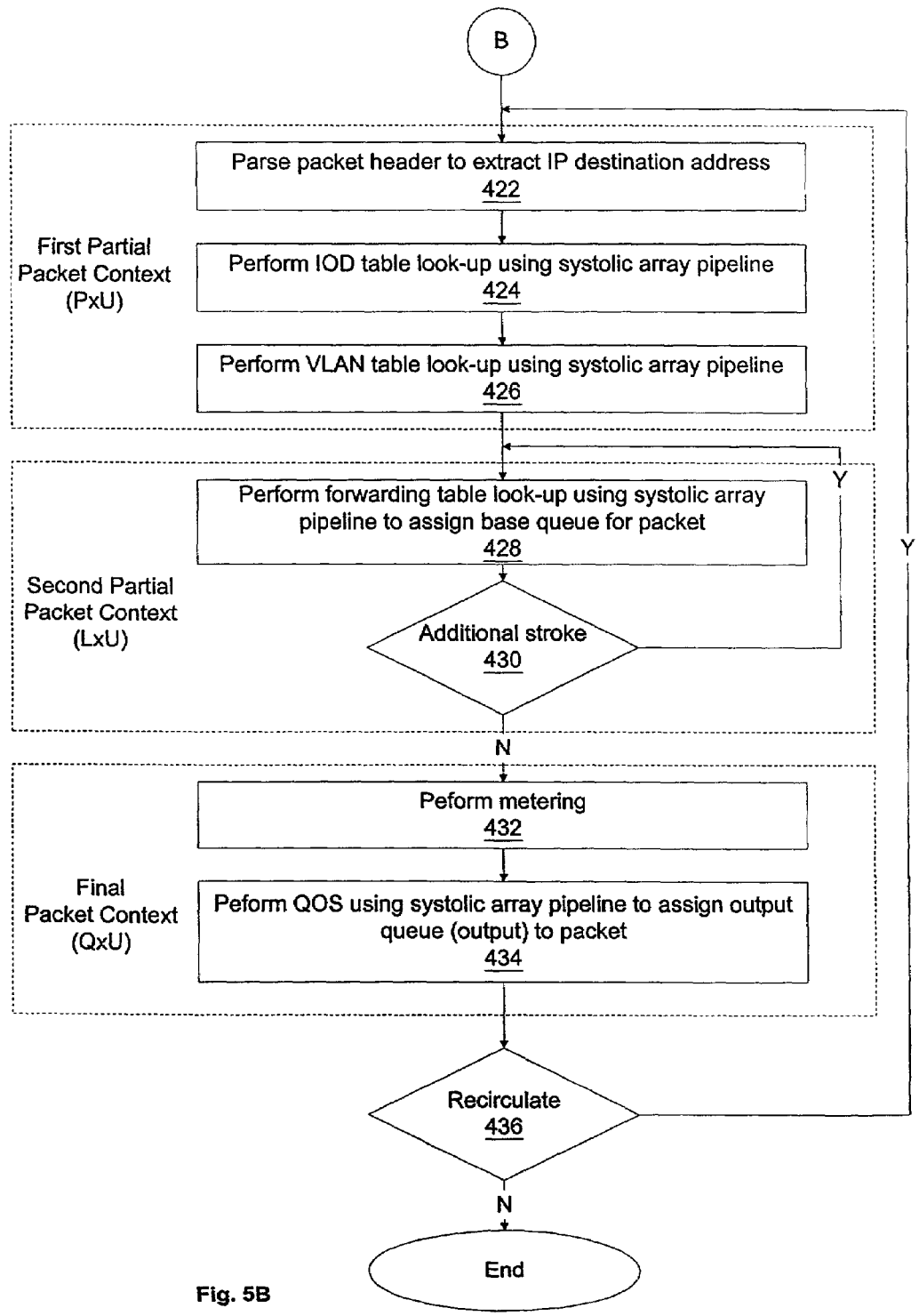
FIG. 5B illustrates a flowchart of an example of the operations for performing a forwarding table lookup to determine an output for the packet, in accordance with one embodiment of the present invention.

FIG. 5B illustrates examples of routing operations, including performing a forwarding table lookup. The look up operation may use, in one example, a systolic array for assigning an output to the packet. These operations are performed by the NPU 34 in one embodiment. Other forwarding engines may be used to the extent that they can process packets at line rate. After receiving a packet from the MA 32, in operation 422, the NPU parses the packet header to extract the IP destination address and other information, which are used to create a packet context associated with the packet. As will be described below, a packet context generally includes information from the packet header—such as the IP destination address and the QoS data—but may not include the body or payload of the packet. In one example, parsing the header is performed because the header may contain variable length information such as the link layer portion of the header (e.g., VLAN encapsulation on Ethernet).

In operation 424, the NPU 34 performs an interface ordinal descriptor ("IOD") table lookup and assigns an IOD number to the packet. The IOD number describes the input port 28 that the packet was received on, which is useful, for example, to meter the input ports. In one example, the IOD table lookup is performed using a systolic array pipeline. In operation 426, the NPU performs a virtual local area network ("VLAN") table lookup and determines if the packet is destined for a VLAN. In one example, the VLAN table lookup is performed using a systolic array pipeline. Parsing operations 422-426, can be used to form a first partial packet context including the IP destination address for the packet, IOD information, and VLAN information. Conceptually, a "partial packet context" may include an incomplete or in-process packet context, and a "packet context" may include a partial packet context or a complete packet context which contains the complete routing and switching information for the packet along with other information.

Following the parsing operations, the packet context (i.e., the first partial packet context) and the IP destination address of the packet are used in a lookup operation, which may be used to form a second partial packet context. In operation 428, the NPU 34 looks-up the IP destination address in the forwarding table to assign a base destination queue to the packet. Each destination queue is mapped to an outgoing link. In one embodiment, the lookup operation is performed using a systolic array pipeline by doing a trie search of tries stored in the forwarding table. Because the NPU is able to execute forwarding table lookups at the line rate for any size packet, it is able to assign a destination queue to the packet before the packet is cellified and stored in memory.

In operation 430, it is determined whether an additional stroke of the lookup pipeline is required. Depending on the IP destination address and the set-up of the systolic array pipeline, the first partial packet context may have to pass through the pipeline more than once to determine the base destination queue for the packet, which is referred to as "stroking" and is discussed in more detail below. If an additional stroke is not necessary, then the base destination queue information is added to the first packet context thereby generating a second partial packet context.

After the forwarding table lookup operations, the packet context (i.e., the second partial packet context) is processed by the queuing operations to complete the packet context generation. In operation 432, the NPU 34 may perform metering, which is the monitoring and potential attenuation of packet traffic on a particular input port. Metering is used to provide customers with different levels of service. In one example, the NPU may also perform policing, which is the act of enforcing a certain policy for a group of packets having similar characteristics based on, for example, the results of metering, the packet's source address, destination address, source port, and destination port. In one example, an array of meters can be used for policing. Alternatively, the LCU may perform policing.

In operation 434, the NPU, taking into account the QoS for the packet, assigns the destination queue to the packet. In one embodiment, QoS is performed using a systolic array pipeline which accesses a queue-offset number in a QoS table, and thereby modifies the base destination queue number to arrive at the destination queue for the packet. As described in more detail below, each outgoing link has multiple destination queues mapped to it, but the queues may have differing priorities associated therewith.

In one embodiment, the router may support 3072 unicast queues per LCU 36, and 36,864 total queues for the full-scale router 20 having 12 LCUs. Each destination queue corresponds to a port 28 of the router (i.e., an output port connected with an outgoing link), and corresponds to a priority that the packet will be serviced at. Multiple queues may designate the same port, but with varying priorities. Accordingly, as discussed above with regard to operation 428, the base destination queue is assigned to the packet. In operation 434, depending on QoS information, the base destination queue may be offset, which will designate the same port, but with a different priority.

In operation 436, it is determined whether the packet will be recirculated. Some packets, such as tunneled packets, may require recirculation through the NPU 34 to complete the generation of the packet context.

As shown in FIG. 3A, the switching engine 24 includes the striper 38, which is connected in a full-scale embodiment with a plurality of MCUs 40. After completion of the packet context, the packet and its context are transmitted by the NPU 34 to the switching engine 24.

Figure 5C:
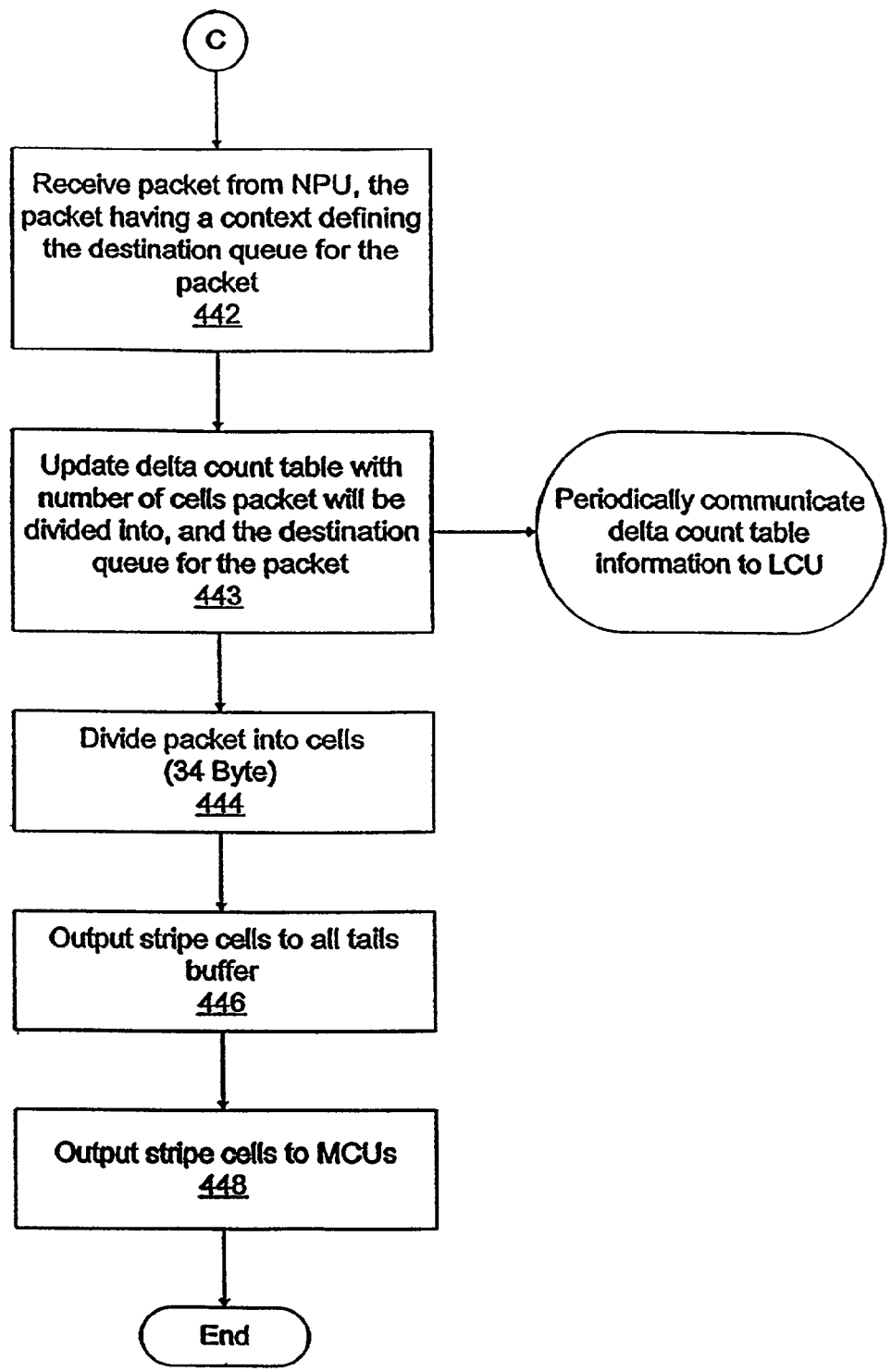
FIG. 5C illustrates a flowchart of an example of the operations for dividing a packet into cells, in accordance with one embodiment of the present invention.

Referring now to FIG. 5C, in operation 442, the striper 38 receives the packet and its context from the NPU 34. In operation 443, when the striper receives a packet, a delta count table is updated with information regarding the number of cells to be stored in a destination queue. The delta count table information is periodically communicated to the LCU 36 so that the LCU can track the number of cells in each destination queue and the MCU 40 associated with the first cell in the queue. In operation 444, the packet is divided into one or more cells, which is referred to as "cellification." In one embodiment, cells are 34 bytes in length, with 30 bytes of data and 4 bytes of cell header information but may be of other lengths depending on the particular implementation.

In operations 446-448, the cells are output-striped to the MCUs that manage the destination queues. In one embodiment, in operation 446, the cells are first transmitted in strict round robin order across a series of buffers in the striper referred to as the all tails buffer (ATB) (see FIG. 26) which buffers the cells to avoid overflow. In one example, there is one first-in first-out (FIFO) ATB per MCU. In operation 448, the cells drain from the ATBs into the MCUs, which store the cells in the appropriate destination queue. One advantage of output-striping is that the striper 38, on average, uses all of the bandwidth to the MCUs 40 equally within a single packet because the cells are written in one embodiment from the striper to the MCUs in a parallel arrangement, which spreads the cells around to all MCUs thereby using all of the available bandwidth to all the MCUs. Along with each cell of the packet, the destination queue that the cell is assigned to is sent to the MCU. The first cell of the packet is accompanied by control information about the packet, including the number of cells in the packet.

Figure 5D:
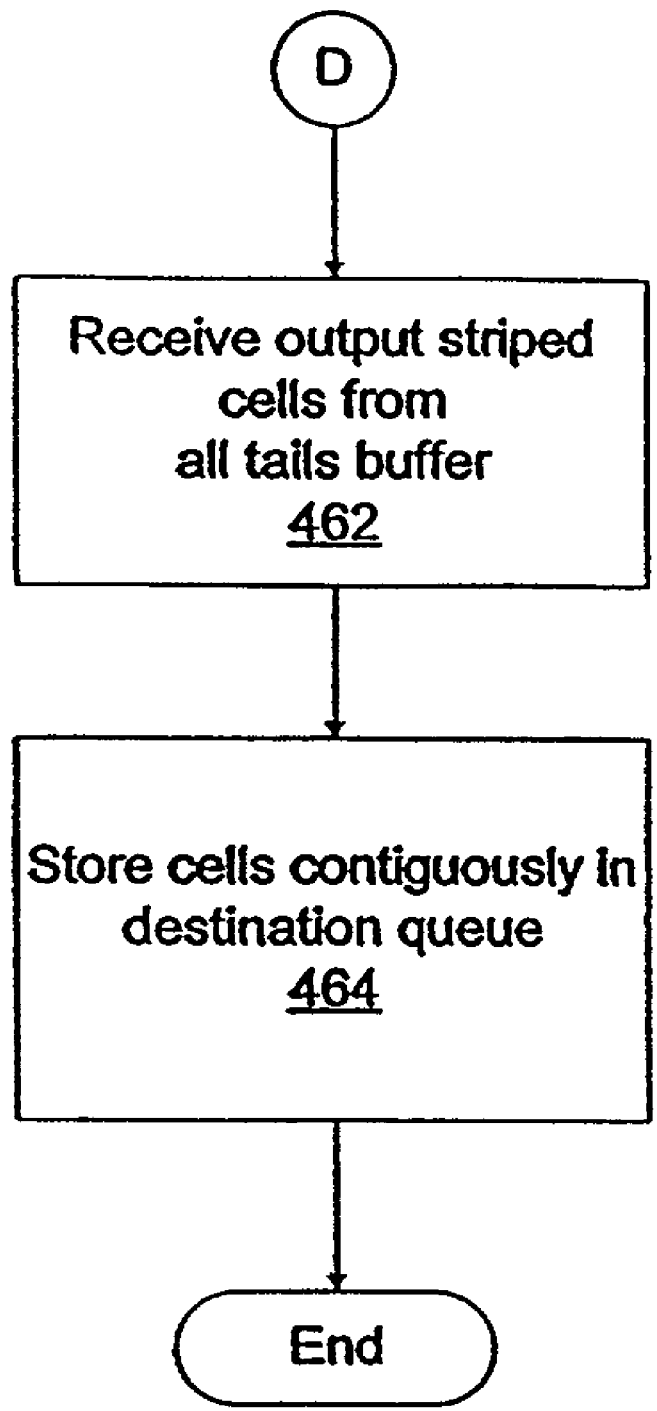
FIG. 5D illustrates a flowchart of an example of the operations for storing cells contiguously in memory as a function of the output for the packet, in accordance with one embodiment of the present invention.

Referring to FIG. 5D, in operation 462, the MCU 40 receives the cells from the striper 38, vis-à-vis the ATB. In operation 464, the MCUs store the cells contiguously in the destination queue assigned to the packet. In one embodiment, the MCUs store the cells in strict round robin order in their assigned destination queue.

Embodiments of a router 20 of the present invention may have several advantages over prior art devices. First, a destination queue for a packet is determined before the packet is cellified and stored by the switching engine 24. Accordingly, the cells for the packet may be stored in a contiguous order in the queues, which facilitates quick extraction of the cells from the destination queues. In one embodiment, the cells are stored in the queue assigned to the packet in strict round robin order. Second, the striper 38 communicates delta count information to the LCU 36 so that the LCU can track the number of cells in each queue and the MCUs 40 associated with the head of the queues. Accordingly, the LCU 36 may begin extracting cells from the destination queues as soon as the router 20 is ready to transmit the packet. Third, the cells may be extracted from the assigned destination queue efficiently in the contiguous order that they were stored in the assigned destination queue. In one embodiment, the LCU knows the location of the first cell in each queue (which is generally a head cell for a packet which specifies the number of cells for the packet); therefore, the LCU issues a request to the striper 38 to transmit the cells from the MCUs in the same contiguous order in which they were placed in the assigned destination queue. Accordingly, additional memory pointers to cells, link lists of cells, and arrays of link lists of cells are not required because all of the cells of a packet are stored in well known locations.

Figure 5E:
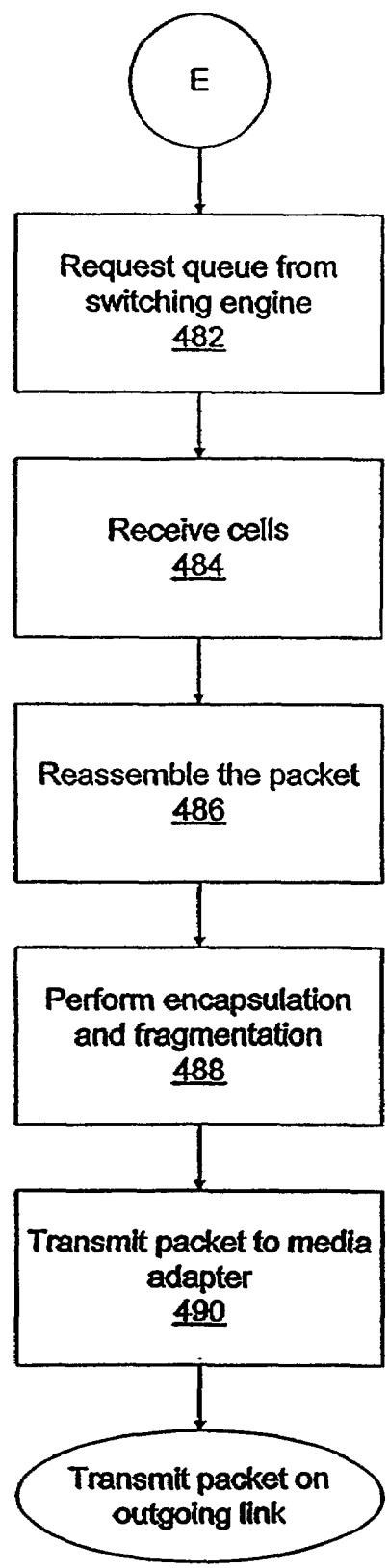
FIG. 5E illustrates a flowchart of an example of the operations for requesting cells from memory and reassembling the packet from the cells, in accordance with one embodiment of the present invention.

Referring to FIG. 5E, in operation 482, the LCU 36 extracts cells from the switching engine 24 by requesting a queue from the switching engine in order to process the cells within the queue. The LCU may include a queuing discipline that is continuously executing and that determines when a particular queue should be serviced. When a queue is selected for service, the LCU sends a message to the MCU 40 or to the striper 38, to transmit some number of cells from the queue to the LCU. In one example, the striper issues commands to the MCUs beginning with the MCU of the head cell, and then issuing commands in strict round robin order to the MCUs following the MCU with the head cell, until all of the cells for the packet are extracted from the assigned destination queue. After the extraction is complete, the head cell of the next packet in the queue will be at the beginning of the queue. In an alternative embodiment, the LCU may issue read requests directly to the MCUs in strict round robin order beginning with the head cell for the queue.

In operation 484, the LCU 36 receives the cells. In one embodiment, once the LCU has received the head cell, it can request the remaining cells for the packet based on the total number of cells for the packet, which is specified in the head cell. After the MCU 40 transmits a cell to the LCU, the MCU periodically transmits the number of cells remaining in each queue to the striper 38. This allows the striper to track the number of cells that are stored within the MCU so that it can perform random early discard (RED), which is a well known algorithm for randomly dropping packets, if the queue begins to overflow.

In operation 486, the LCU 36 reassembles the packet from the received cells. The LCU tracks the read requests that it has made so that when cells arrive from the MCU 40, it can correctly reassemble and transmit complete packets. In one embodiment, the LCU tracks the order in which it transmitted requests to the striper 38, and the MCU is commanded to reply in the same order, so the LCU will receive cells in the same order that it transmitted requests. In operation 488, the LCU performs encapsulation and fragmentation of the packet as needed for transmission of the packet on the appropriate outgoing link. Finally, in operation 490, the LCU transmits the packet to the MA 32, which in turn transmits the packet on the port 28 connected with the appropriate outgoing link for the packet.

The above described operations may be preformed using one or more of the components described hereafter.

III. Input-Side of the Interface Subsystems

In one embodiment of the present invention, a full-scale router 20 includes twelve interface subsystems 22. As shown in FIG. 3A and others, each interface subsystem includes at least one media adapter 32 which is bi-directional, supporting both the receipt and transmission of packets. On the input-side of the router the media adapter is connected with a network processing unit (NPU) 34, and on the output-side of the router the media adapter is connected with a line card unit (LCU) 36.

A. Media Adapters (MA)

In a full-scale embodiment, four MAs 32 are connected with each NPU 34 (FIG. 3B). The MAs generally provide the incoming and outgoing interface between the network and the router 20. Accordingly, packets are received from an incoming link and are transmitted on an outgoing link via the MAs.

Figure 6:
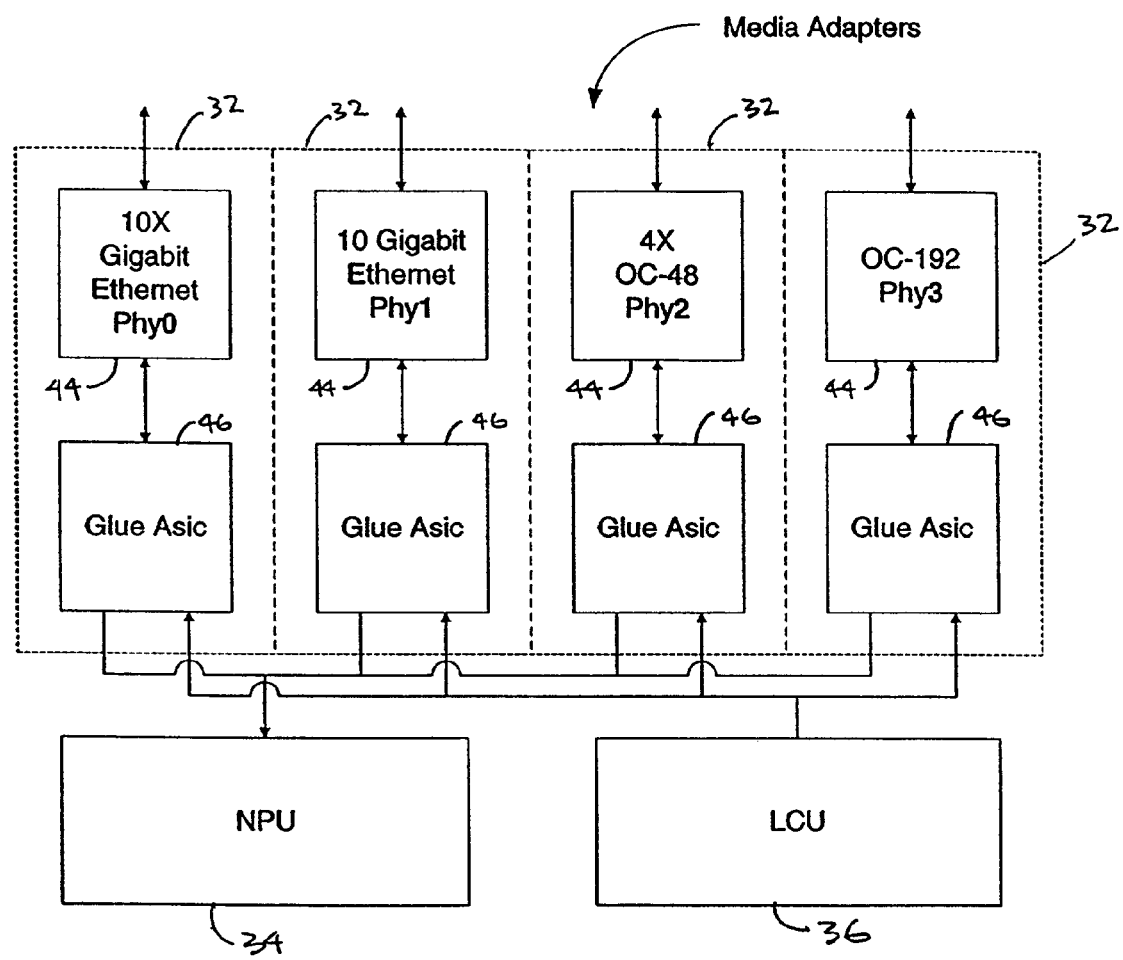
FIG. 6 illustrates a block diagram of various media adapters, in accordance with one embodiment of the present invention.

FIG. 6 illustrates a block diagram of an embodiment of a MA 32 having four physical interface units (Phy) 44 and four Glue ASIC units 46. Each Phy 44 includes at least one bi-directional port that is connected with a link, and may include a MAC (Medium Access Control) or a framer chip. Links are the physical medium that packets are transmitted between devices on the network and are generally a copper or a fiber optic line. On the incoming link side, the Phy converts packets received on the port into electric signals that can be processed by the router in subsequent operations. On the outgoing link side, the Phy converts packets from an electrical signal into the appropriate signal for the particular link that the packet is transmitted on. For example, packets transmitted over a fiber optic line are modulated into a light wave. Accordingly, in one example, the packet data must be converted from a modulated light wave into an electrical signal by the Phy for processing by the router, and then must be converted from an electrical signal back into a modulated light wave to transmit it to a fiber optic line. In one embodiment, the Phys may support OC-192 POS, OC-48 POS, 1 Gigabit Ethernet, and 10 Gigabit Ethernet, or any other conventional data transmission standards.

The Glue ASIC 46 performs the operation of formatting different packet types consistently before transmission to the NPU 34. For SONET (Synchronous Optical Network) interfaces, the formatting performed by a SONET Framer includes removing the physical layer information such as framing, frame checksums, and SONET overhead. For Ethernet interfaces, the formatting performed by a MAC chip includes removing the physical layer information such as framing, frame check sums, and overhead. In addition, the formatting performed by the Glue ASIC may include: checking the packet length to ensure that the entire packet was received by the router; adding a checksum; inserting an identification of the port that the packet arrived on in the header, which is used later as index into the IOD table; and temporarily storing the packet in a FIFO buffer until it is transmitted to the NPU. In one example, the buffer does not affect the ability of the NPU to process packets at the line rate because packets stream in and out of the buffer at the line rate. The buffer merely provides a delay between packets arriving in the MAs 32, and packets being transmitted to the NPU 34, and smoothes any bandwidth mismatches between the output of the Glue ASIC and the input of the NPU.

The Glue ASIC 46 does not, however, remove any data link layer information such as Ethernet source and destination addresses, and point-to-point protocol encapsulation, in one example. Each Glue ASIC has a 10 Gbps bus connected with the NPU 34, accordingly, the MAs 32 have a 40 Gbps aggregate connection with the NPU, in one embodiment.

B. Network Processing Unit (NPU)

FIGS. 7A-22 relate to a network processing unit (NPU) 34 for determining the destination of a packet. In one embodiment, the NPU employs a systolic array pipeline 48 architecture. As used herein, the term "network processing unit" includes any processor, microprocessor, or other integrated circuit (or collections thereof)—such as a forwarding engine—which determines the destination of a packet. As will be described herein in greater detail, the NPU may employ one or more systolic arrays in various execution units of the NPU to perform various operations on a packet as the packet passes through the NPU. Although embodiments of the invention are described with reference to the NPU described herein, it is understood that a router could employ other future developed processors capable of processing packets at line rate, in place of the NPU.

Figure 8A:
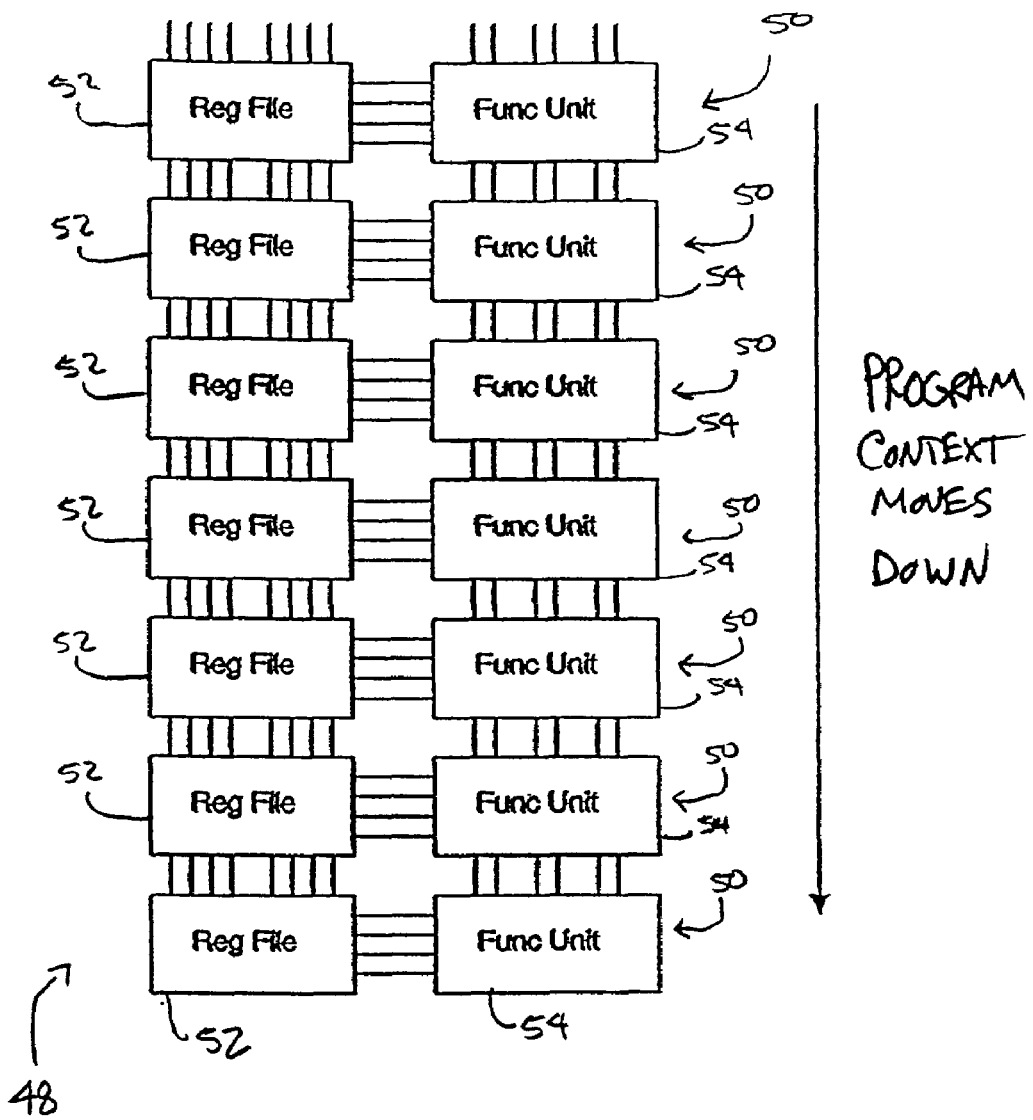
FIG. 8A illustrates a systolic array pipeline including a plurality of stages, in accordance with one embodiment of the present invention.
Figure 8B:
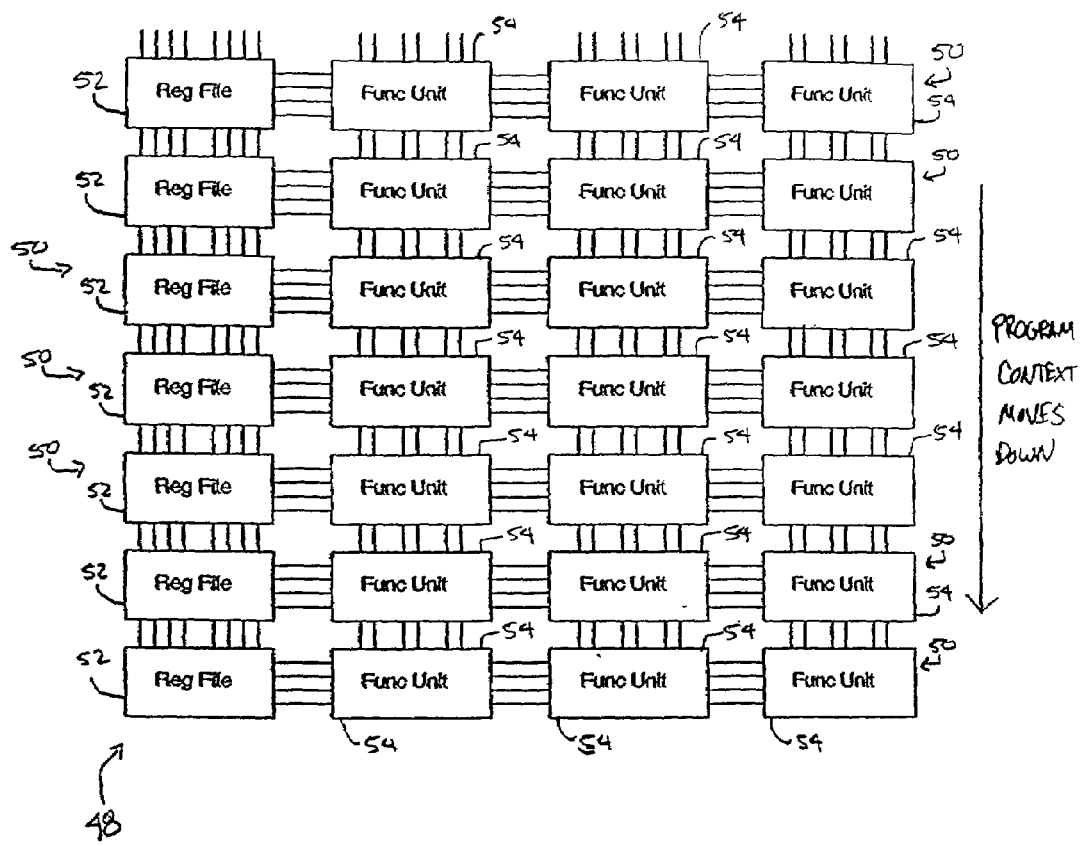
FIG. 8B illustrates a systolic array pipeline including a plurality of stages for very long instruction words, in accordance with one embodiment of the present invention.

As used herein, the term "systolic array" or "systolic array pipeline" includes, but is not limited to, a series or collection of stages wherein each stage may contain a register file and one or more functional units. In one embodiment, the data or program context being processed by the stages—which may include items such as the state of the register files, the program counter, and/or the current state of the program—flows from a stage to a next stage. In one example, the stages of a systolic array are arranged in a generally linear or sequential order, wherein each stage is capable of performing an operation involved in processing a packet, and the data/program context processed in each stage is processed therein for one clock cycle after which the data/program context is passed to the next stage for processing therein. One example of a systolic array is shown in FIG. 8A wherein each stage 50 has a register file 52 and a functional unit 54, while FIG. 8B shows a systolic array for a very long instruction word wherein each stage 50 has a register file 52 and a plurality of functional units 54.

In one embodiment, some of the stages 50 of the systolic array 48 are programmable to perform a processing operation involved in processing the packet under program control, while other stages of the systolic array can perform a delay operation (as with "sleep stages," discussed below) where the data passes through a stage with no processing therein. In general, on every clock cycle of the NPU 34, data/program context is moved from one stage of the systolic array to the next stage in the systolic array, without blocking the intake of new packets or the processing of existing packets. As will be described below, the systolic array of the NPU can receive new packets at a line rate of, for example, 40 Gbits/second, and can finish processing a packet at the line rate during steady state operation. The NPU is adapted for use in a router 20, where the router 20 has multiple bi-directional ports 28 for receiving and transmitting data into and out of the router, wherein each port is connected with different portions of the network. As mentioned above, in one embodiment when the NPU receives a packet, the NPU operates to determine to which destination port of the router the packet should be sent out so that the packet gets closer to its final destination (i.e., the next hop in the network).

NPU Architecture

Figure 7A:
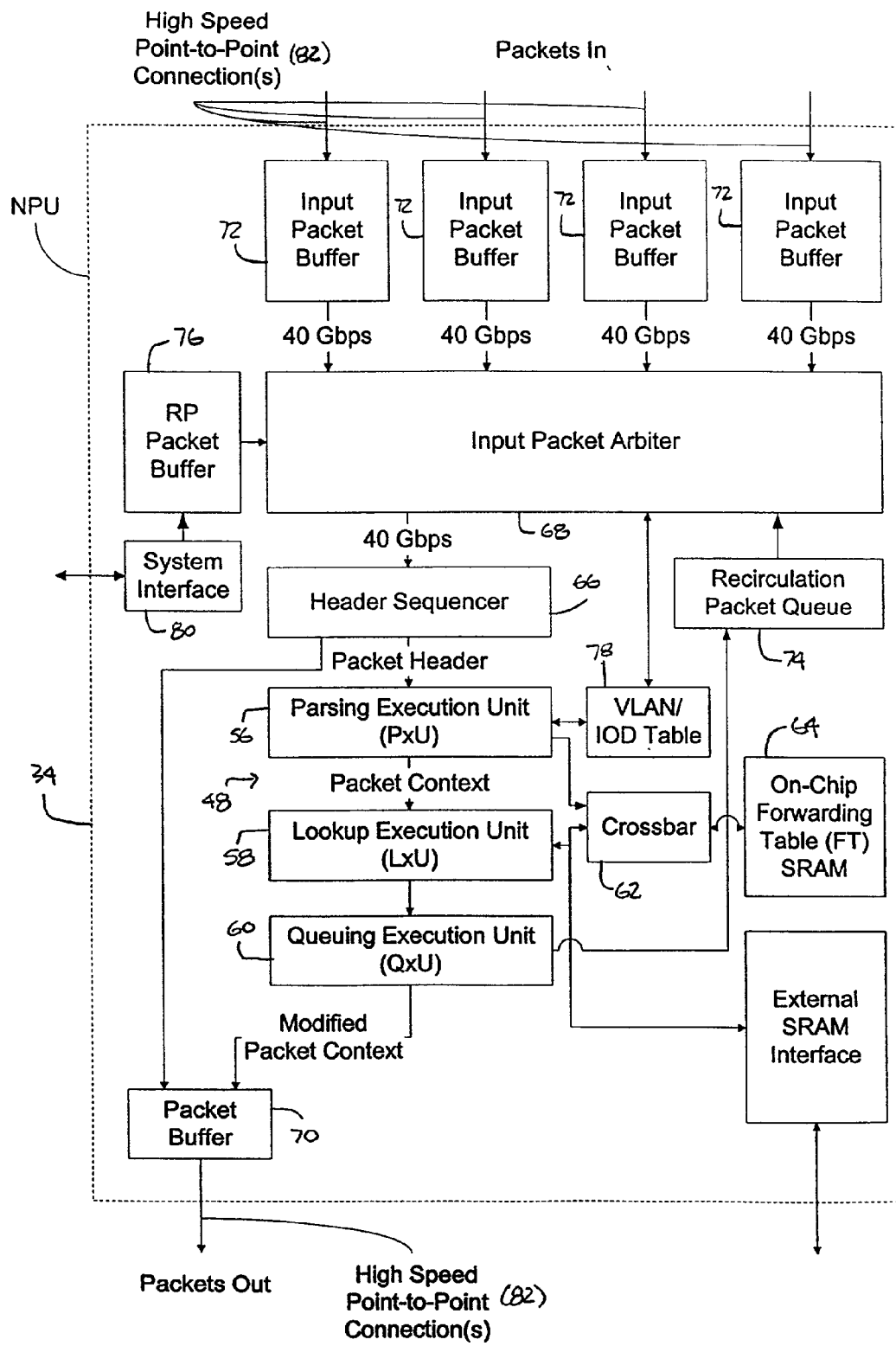
FIG. 7A illustrates a block diagram of a forwarding engine or network processing unit (NPU), in accordance with one embodiment of the present invention.

Referring now to FIG. 7A, a block diagram of a network processing unit 34 is shown in accordance with one embodiment of the present invention. The NPU is implemented using a plurality of execution units, including in one example a parsing engine or execution unit (PXU) 56 for forming a packet context which contains the destination address of the packet and other data descriptive of the packet; a lookup engine or execution unit (LXU) 58 for determining, based on routing data for the network, the destination port of the router (also referred to herein as the output port) to which the packet should be routed; and a queuing engine or execution unit (QXU) 60 for queuing the packet to the proper output queue (maintained outside of the NPU) corresponding to the output port of the router to which the packet should be sent. In one embodiment, each execution unit is implemented using one or more programmable stages of a systolic array, wherein the operations of the execution units are under dynamic program control. The LXU accesses, through a dynamically configurable crossbar 62, an on-chip memory 64 containing a forwarding table (FT) or route information for the network.

In one example, when a packet is received by the NPU, a header sequencer 66 extracts the packet header from the packet and passes the packet header to the PXU 56. The PXU forms a packet context which is a collection of information relating to and describing the packet that corresponds to the context. As described above, the packet context includes data such as the destination address specified in the packet header, and is derived in part from the packet header and other information in the packet or about the packet. After the packet context has been formed in the PXU 56, the packet context is passed to the LXU 58 and QXU 60 which perform their operations on the packet context. As the packet context is passed through the LXU and QXU and processed therein, portions of the packet context are modified so as to reflect the results of the operation performed by the LXU and QXU.

The input packet arbiter (IPA) 68 also passes the packet (in one example, the entire packet) to a packet buffer 70 where the packet is stored. As the LXU 58 and QXU 60 perform their operations using the packet context and as they modify the packet context, the packet remains in the packet buffer 70 until the QXU completes its operations. Generally, after the LXU has determined the destination port to which the packet should be sent and the QXU has modified the packet context to specify the destination port and the queue to which to send the packet, unification logic merges the packet context with the respective packet stored in the packet buffer. In one example, both the packet context and the packet are passed out of the NPU 34 to other portions within the router 20 where the switching functions of the router are performed and the packet is transmitted out of the router to the appropriate output port, using the appropriate data formatting and encapsulation associated with the appropriate output port.

Figure 18:
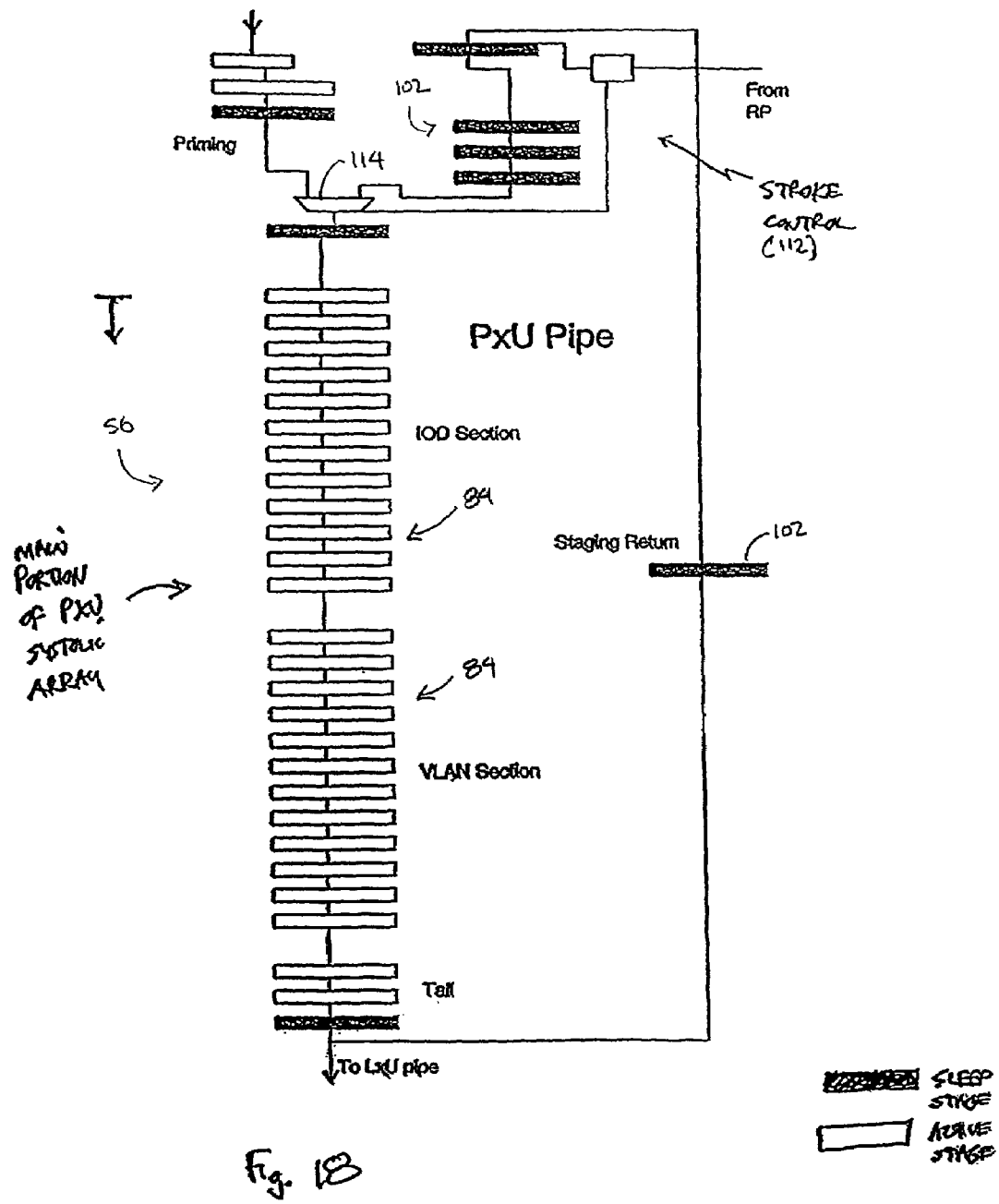
FIG. 18 illustrates an example of a parsing execution unit (PXU) including systolic array stages, in accordance with one embodiment of the present invention.

Referring again to FIG. 7A, the PXU 56 processes a packet by programmatically extracting information from the packet such as the source address, the destination address, the source port number, the destination port number, the packet type, quality of service (QOS) data, and other data which is needed by the LXU 58 and QXU 60 to perform their operations. It is understood that since the PXU is under program control, the data extracted by the PXU to form the packet context is a matter of choice depending on the particular implementation chosen and how the software is written to process packets. The PXU 56 stores this extracted information into a register file which is accessible throughout the processor, and passes the context of the packet to the LXU 58 for processing therein. One example of the PXU architecture is shown in FIG. 18, wherein the PXU is comprised of various systolic array stages.

Figure 19:
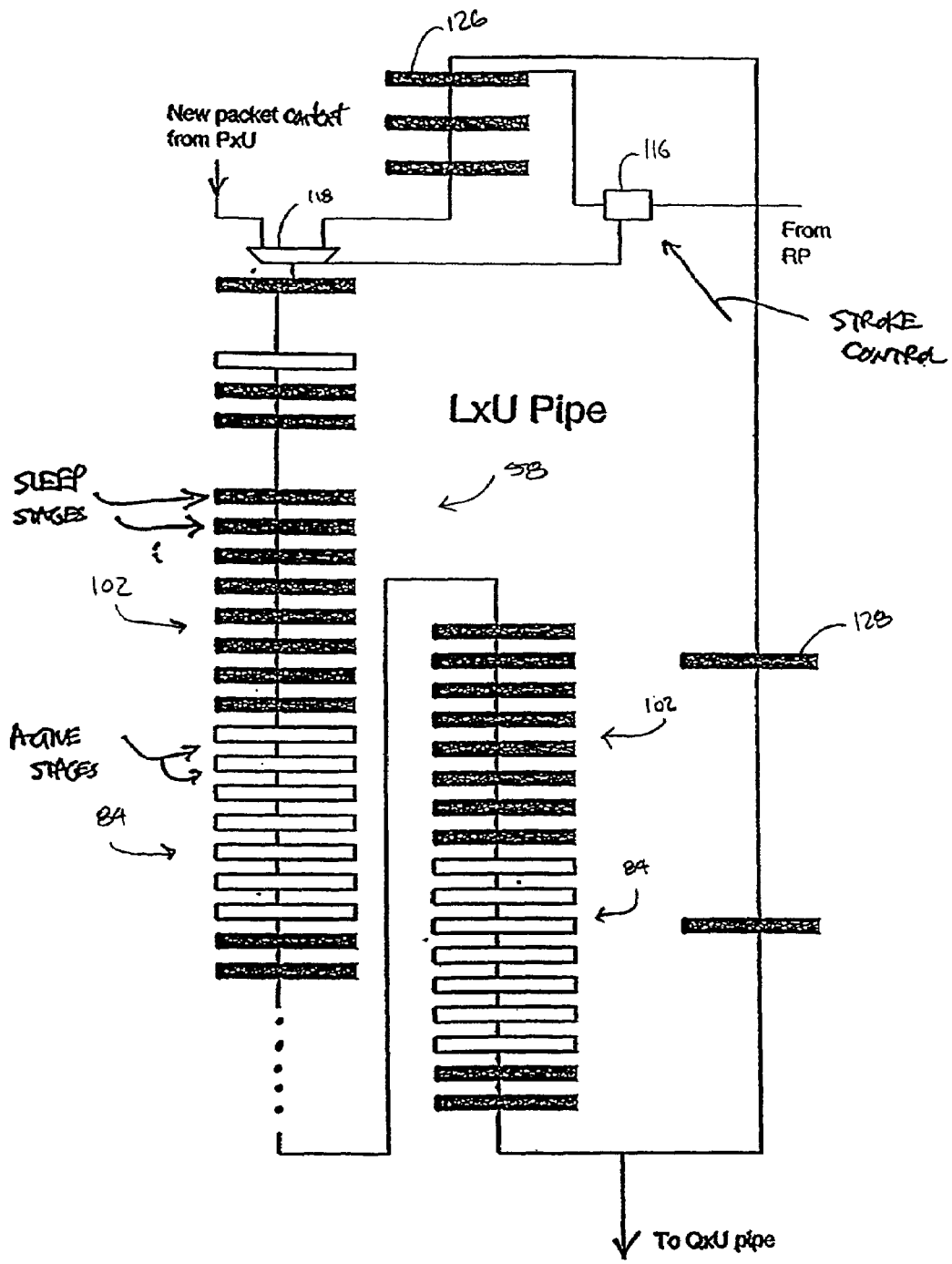
FIG. 19 illustrates an example of a lookup engine or execution unit (LXU) including systolic array stages, in accordance with one embodiment of the present invention.

Using the context of the packet, the LXU 58 performs the necessary table lookup for forwarding the packet to the proper output port of the router 20, as well as to perform any quality of service (QOS) or filtering functionality. One example of the LXU architecture is shown in FIG. 19, wherein the LXU is comprised of various systolic array stages. It is understood that since the LXU is under program control, the operations performed by the LXU to determine the proper output port to which to send the packet, or to perform other functions within the LXU, are a matter of choice depending on the particular implementation chosen and how the software is written to process packets.

As will be described below, in one embodiment, the LXU 58 is formed using one or more stages of a systolic array 48 which can be represented, conceptually, as having 12 major stages, with each major stage having eight active minor stages and 10 inactive (sleep) minor stages therein. In accordance with embodiments of the present invention, the packet's context is passed, on every cycle of the NPU 34, from one minor stage to the next minor stage in the systolic array.

After determining the destination queue/port in the router 20 to which to send the packet, the LXU 58 attaches the forwarding information to the context for the packet, and passes the context of the packet to the QXU 60. Using the context, the QXU removes the corresponding packet from the packet buffer 70 and passes the packet and the context to the striper 38 for writing to the appropriate output queue in the router 20 so that the packet can be transmitted out of the router on the appropriate output port.

In one example of the NPU 34 shown in FIG. 7A, the NPU has a set of input packet buffers (IPBs) 72, wherein each IPB is coupled with a media adapter 32. Each input packet buffer is also coupled with the IPA 68, which, in general, arbitrates between the input packet buffers to select packets to forward into the header sequencer 66 of the NPU for processing by the PXU 56, the LXU 58, and the QXU 60. The input packet buffers are FIFO buffers and accumulate an entire packet from the media adapter before transmitting the packet to the input packet arbiter. Each input packet buffer has a 10 Gbits/sec connection with the media adapter, and a 40 Gbits/sec connection with the input packet arbiter, in one example.

The input packet buffers 72 account for rate mismatches between the media adapters 32 (10 Gbits/sec) and the input packet arbiter 68 (40 Gbits/sec) by aggregating four 10 Gbits/sec packet streams to a 40 Gbits/sec packet stream. The input packet arbiter 68, being coupled with the input packet buffers 72 and the header sequencer 66, selects an input packet buffer for obtaining a packet, and passes the packet to the header sequencer 66 and packet buffer unit 70. The input packet arbiter cycles between the various input packet buffers to obtain packets therefrom, and in this manner, the input packet arbiter creates a 40 Gbits/sec stream of packet data which is passed to the header sequencer of the NPU 34.

In one example shown in FIG. 7B, there are six sources of packets into the IPA 68; four from the media adapters 32, one from the route processor 26, and one from a recirculation packet queue (discussed in more detail below). The IPA selects one source at a time for transmission to the header sequencer 66. The IPA uses a weighted round robin arbitration scheme that allows each input packet buffer 72 and an RP packet buffer 76, which stores packets from the route processor 26, to send, in one example, up to 10 Kilobyte (KB) packets to the IPA before being deselected by the IPA. This allows transmission of one maximum transmission unit (MTU) size packet, which is 10 KB in one example, or a continuous stream of smaller packets to be transmitted without interruption, to the header sequencer. In one example, only entire packets are sent from an input packet buffer 72 to the IPA 68, and each input packet buffer checks if the packet about to be transmitted to the IPA has arrived in its entirety from the media adapter 32, and if not, then the next input buffer is selected for transmission to the IPA. Accordingly, in one embodiment, the input packet buffers provide at least 10 KB of storage.

Further, the IPA 68 accesses a VLAN/IOD 78 table which provides data relating to the format of the packet, which the PXU 56 uses in forming the packet context. The IPA 68 performs a lookup in an interface ordinal descriptor (IOD) table portion of the VLAN/IOD table and adds the appropriate IOD to the packet header before transmission to the header sequencer 66. The IOD specifies the type of the input port/media adapter upon which the packet was received (i.e., Ethernet). The IOD can be used for controlling metering, for example, and for use by the PXU to determine how to parse the packet, as different packet data formats may require different parsing rules.

In addition, the IPA 68 counts the length of the incoming packet, and then in one example adds the length information to the packet header. In one embodiment, the IOD and the length are prepended to the packet, i.e., added to the beginning of the packet. The IPA also examines a checksum to determine if the packet was transmitted correctly from the media adapter 32.

The IPA 68 may also receive, from the RP packet buffer 76, packets originating from the route processor 26 (these packets are referred to herein as "RP generated packets"). The RP generated packets are encoded to pass through the NPU 34 with minimal processing, and bypass the IOD lookup because the routing protocol software (running in the route processor) adds the correct 10D to the packet before forwarding to the RP packet buffer.

The IOD 78 table is implemented using a static random access memory (SRAM) and stores information about each type of port that the router is servicing, e.g., 1 gigabit Ethernet, 10 gigabit Ethernet, etc. The route processor 26 communicates with the media adapters 32 via a system interface 80 to determine which type of ports 28 are presently configured in the router, and then assembles the IOD table 78 to reflect the ports 28 that are presently configured. Accordingly, the media adapters may be dynamically connected or disconnected to/from the router 20 to support various types of ports, and the router will be able to reconfigure itself to support the new media adapters.

In one embodiment, RP generated packets are handled differently than packets transmitted from the media adapters 32 to the input packet buffers 72. RP generated packets are stored in the RP packet buffer 76 until there is a break in the stream of packets entering the IPA 68 from the input packet buffers 77, or in one example, until a time-out before being serviced by the IPA and sent to the parsing engine 56. If the time-out (which can be programmatically set) occurs, then the RP generated packet is prioritized over all packets and the RP generated packet is transmitted to the parsing engine 56.

Figure 7B:
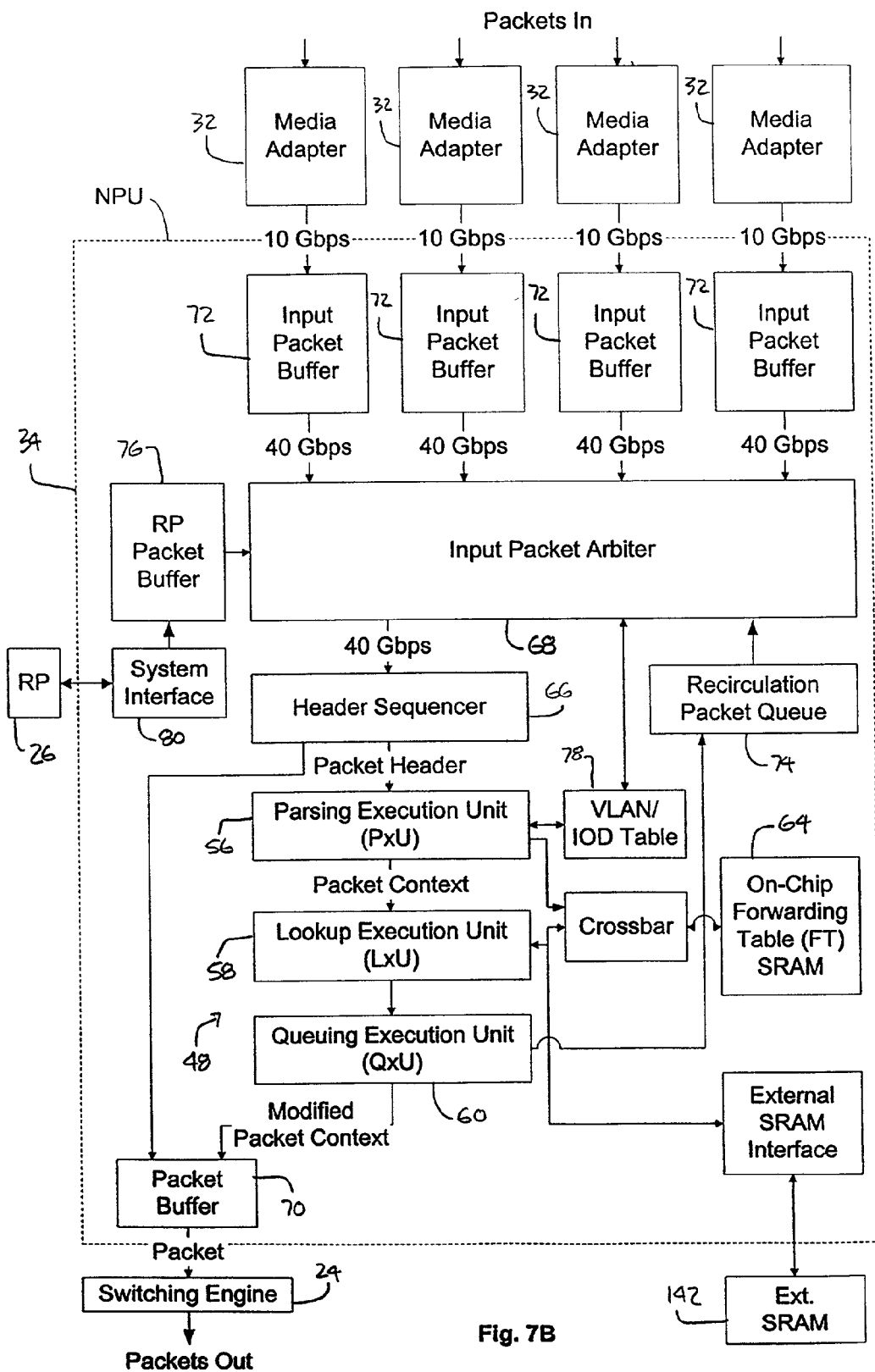
FIG. 7B illustrates another block diagram of the network processing unit coupled to various components of a router, including media adapters, a route processor, and a switching engine, in accordance with one embodiment of the present invention.

Referring to FIG. 7B, a block diagram shows one example of the NPU 34 coupled with various components of a router 20, including the set of media adapters 32, wherein each media adapter is connected to a physical line or link of the network; a route processor 26, which provides updated route information for use in the forwarding table 64; and a switching engine 24 which is responsible for switching the packet to the proper destination port of the router for transmission therefrom, in accordance with one embodiment of the present invention.

As shown in FIG. 7B, the output portion of the NPU 34 passes the packets to the switching engine 24 of the router 20 which is responsible for switching the packet to the proper destination port of the router for transmission therefrom. In one example of a router 20 conforming to the present invention, the router has a number of destination queues in which packets are temporarily stored before the router transmits the packets on the appropriate outgoing link. In one embodiment, each queue corresponds to a port 28 of the router (the appropriate outgoing link), and has a priority which can be programmatically assigned thereto.

In accordance with one embodiment of the present invention, the destination queue for a packet is assigned by the NPU 34 before the packet is transmitted to the switching engine 24. Once the packet is provided to the switching engine of the router 20, the switching engine divides the packet into a set of cells and stores the cells in the queue specified by the NPU and associated with the proper output port 28 of the router.

As mentioned above, the NPU 34 execution units—the PXU 56, LXU 58, and QXU 60—may be implemented using systolic array pipeline architectures, in one embodiment, so that operations (such as the lookup operation and memory reads) can be performed at the line rate, which eliminates the need for input-striping as with conventional routers. The NPU thereby permits the packets to be stored in memory of the router as a function of the router's output port associated with the packet, which thereby permits the orderly and efficient storage and extraction of the packets to and from memory, such as by using round-robin output striping.

As shown in FIG. 7A, in one embodiment of the invention, high speed serial links 82 ("point-to-point connections") are used to connect signal lines of the NPU 34 to signal lines of another integrated circuit within the router 20. In one example, the NPU includes one or more signal lines and a second integrated circuit in the router also includes one or more signal lines. Each signal line 82 of the NPU 34 is connected with a signal line of the second integrated circuit to form a high speed interface between the integrated circuits. In one embodiment of the invention and as shown in FIG. 3B, point-to-point I/O interfaces are implemented using differential pairs between the NPU 34 and striper 38; between the striper 38 and the MCUs 40; and between the MCUs 40 and the LCUs 36. For instance, the striper IC has approximately 466 integrated high speed serial links, in one embodiment (full scale router) as shown in FIG. 3B. It is understood that other interfaces could also use point-to-point connections, depending on the particular implementation.

These connections are used in place of traditional bus interfaces between integrated circuits, as these point-to-point connections provide a higher data rate on a per pin basis, and therefore require fewer pins of an integrated circuit to meet data rate and bandwidth requirements of interfaces between integrated circuits. For instance, an interface between integrated circuits requires a bandwidth of 8 Gbits/sec, then eight pins at 1 Gbits/sec can be used in the point-to-point connections for the interface, as opposed to a bus running at 200 Mbits/sec, which would require 40 pins to provide to 8 Gbits/sec bandwidth for the interface. In this sense, the point-to-point connections are "narrow" (i.e., require fewer pins) when compared with traditional bus structures.

In one embodiment, point-to-point connections 82 are implemented using differential pairs of conductors to form I/O channels for the integrated circuits used in the router 20 of the present invention. These point-to-point I/O channels provide the interfaces between integrated circuits used in the router. For example, in one embodiment, the outputs of the NPU 34 integrated circuit can be configured using the point-to-point connections to form an output channel from the NPU to the striper 38 integrated circuit. Likewise, the inputs of the NPU integrated circuit can be configured using the point-to-point connections to form an input channel coupled with the integrated circuits on the front-end of the router (such as the ICs that reside in the media adapters 32).

In one embodiment, these high speed, narrow (reduced pins) point-to-point connections 82 are integrated on-chip as part of each integrated circuit which is part of the interface. For instance, the high-speed serial point-to-point differential pair links are integrated within the output portion of the NPU 34, and are also integrated within the input portion of the striper 38. Where the core of the integrated circuit uses signal lines arranged in parallel, a parallel-to-serial conversion is provided on-chip, and error-correction encoding/decoding can be used to ensure data accuracy through the conversion operation.

In one example of the NPU 34, the outputs of the NPU can be configured using the point-to-point connections 82 to form an output channel from the NPU to the striper 38 integrated circuit.

Systolic Array

The systolic array 48 structures of an embodiment of the NPU 34 will now be described with reference to FIGS. 8A-17, in accordance with one embodiment of the present invention. Referring to FIGS. 8A and 8B, various embodiments of a systolic array pipeline 48 are illustrated. In the embodiment of FIG. 8A, a systolic array pipeline is shown as an interconnected series of stages 50, wherein each stage has a functional unit 54 and an associated register file 52, and data/program context moves from one stage to a next stage of the systolic array. As data/program context is processed by a first functional unit of a first stage, the results of the operations are written to a register file so that they are accessible by one or more subsequent stages. In one embodiment, a stage may have multiple functional units such as arithmetic logic units (ALUs), adders, shifters, edge detectors, zero detectors, condition code registers, status registers, and the like. In another embodiment, a stage of the systolic array of the NPU can be either an active stage—which has programmable functionality for performing various operations on the data/program context passed into the active stage—or a sleep stage which is in effect a delay stage such as a flip-flop or other similar configuration, which is provided for timing.

FIG. 8B illustrates a systolic array pipeline 48 for handling very long instruction words, wherein each stage 50 comprises a register file 52 and a plurality of functional units 54 to perform various functions or instructions on data/program context received from a prior stage. Again, as with FIG. 8A, as data/program context is processed by a first stage, the results are passed onto and made available for subsequent stages.

Figure 9:
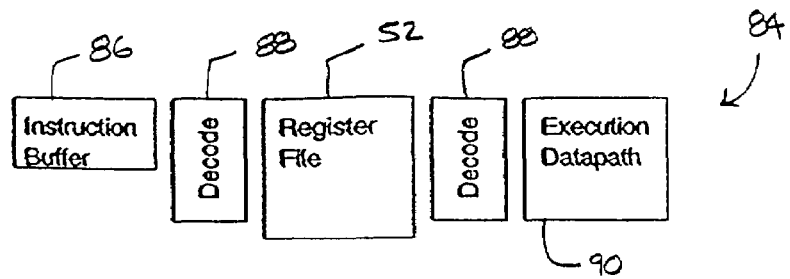
FIG. 9 illustrates an example of a stage of a systolic array, in accordance with one embodiment of the present invention.

FIG. 9 illustrates an example of an active stage 84 of a systolic array 48, in accordance with one embodiment of the present invention. As shown in FIG. 9, an active stage of a systolic array includes, in one example of the invention, an instruction buffer 86, decode logic 88, a register file 52, and an execution data path 90. The instruction buffer provides instructions to be fed, dynamically if desired, into the instruction buffer SRAM for the particular stage of the systolic array, so that the instruction can be fetched and used within the active stage of the systolic array.

Figure 10:
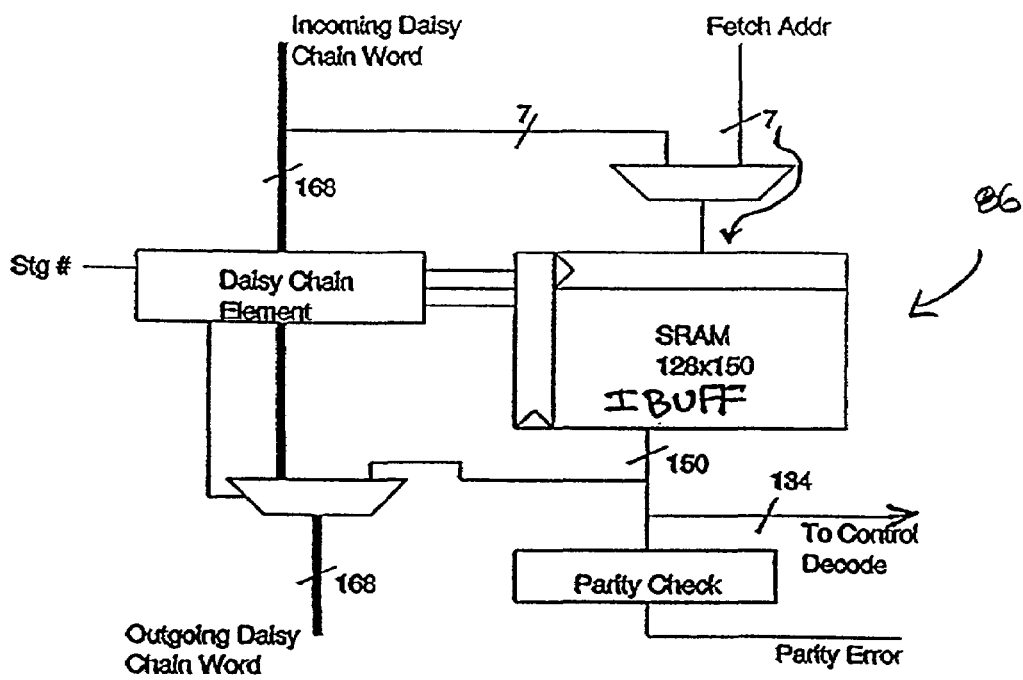
FIG. 10 illustrates an example of an instruction buffer of a stage of a systolic array, in accordance with one embodiment of the present invention.

As shown in FIG. 10, the instruction buffer 86 receives a program image, in one example from the route processor 26, containing one or more instructions for a particular stage 50 for storage within the SRAM instruction buffer. During a particular instruction cycle, the fetch address is used to extract an instruction from the instruction buffer of the stage 84 of the systolic array 48, and upon extracting the instruction from the instruction buffer, the instruction is passed to decoding logic of the stage so that the instruction can be processed by the arithmetic logic unit (ALU) (or other element of the execution datapath 90). By providing an instruction buffer as shown in FIG. 10, the software for one or more stages of the systolic array can be modified dynamically by changing the microcode in each stage or of any stage of the systolic array, at any time, without pausing the operations of the systolic array. In one example, an instruction buffer is provided for each active stage 84 of a systolic array in the NPU 34. In one example, the instruction buffer supports 128 entries, each 142 bits wide, with 136 data bits and six parity bits.

Figure 11:
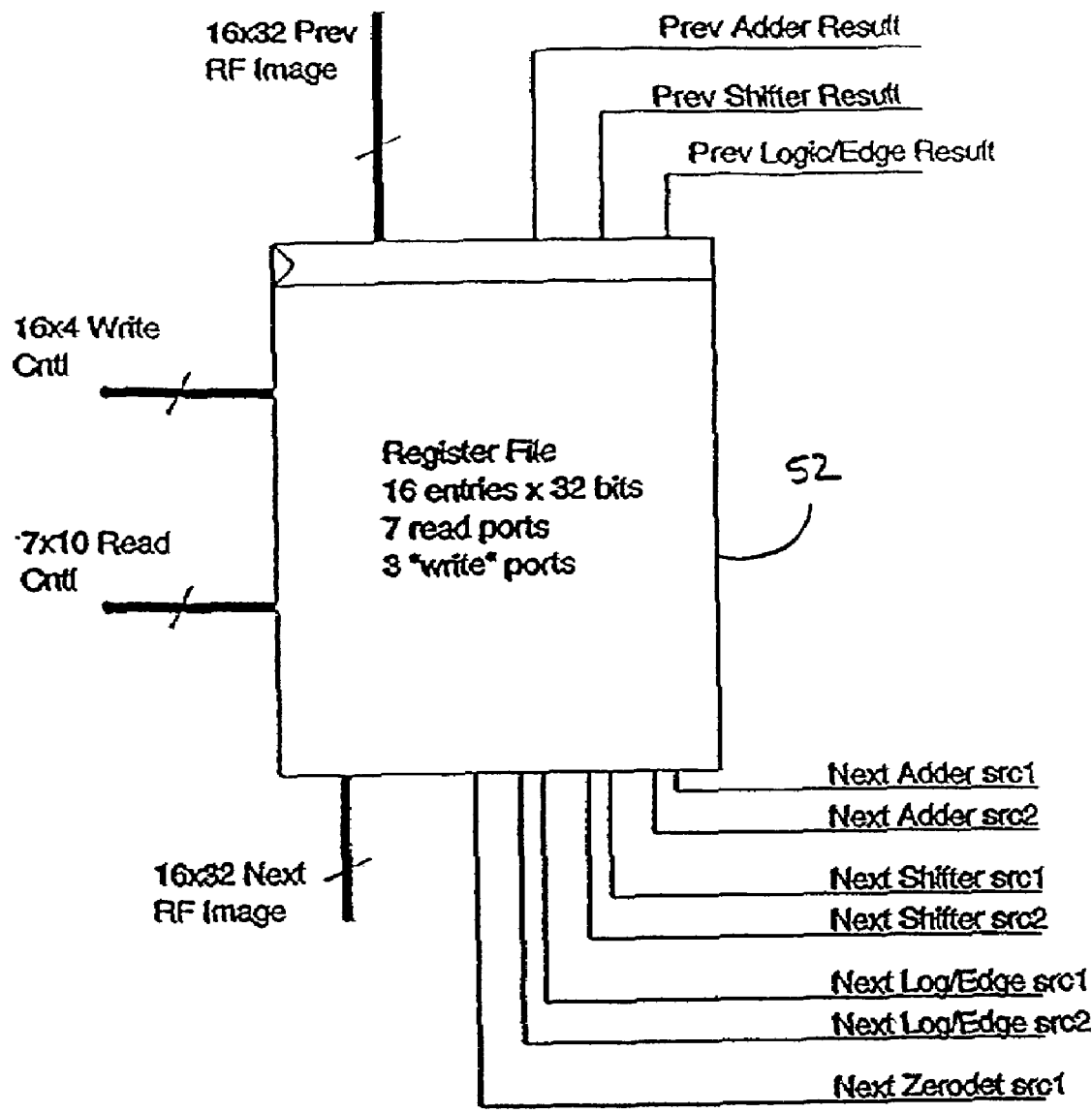
FIG. 11 illustrates an example of a register file of a stage of a systolic array, in accordance with one embodiment of the present invention.

Referring now to FIG. 11, a register file 52 of an active stage 84 of the systolic array 48 is illustrated, in accordance with one embodiment of the present invention. As shown in FIG. 11, the register file for a particular stage receives inputs, such as program context, from the execution data path 90 of the prior stages (i.e., results from the previous adder, shifter, etc.), or from the previous stage's register file. The register file 52 of a stage 50 also provides data/program context to the register file of the subsequent stage in the systolic array, as well as making data/program context available to the next stage's execution data path (i.e., the source registers of the next stage's adder, shifter, etc.). In one embodiment, the register file of a stage can support 16 entries, each of 32 bits, and has seven read ports and three write ports.

Figure 12A:
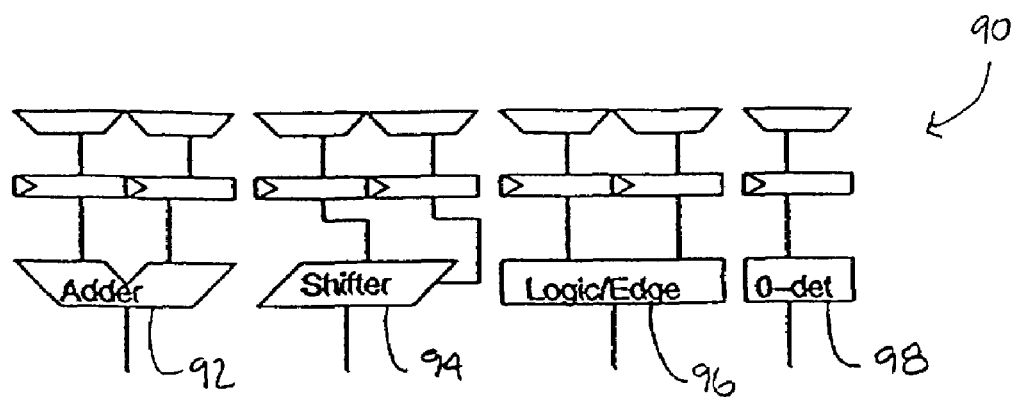
FIG. 12A shows one example of the functional units of a stage of a systolic array, in accordance with one embodiment of the present invention.
Figure 12B:
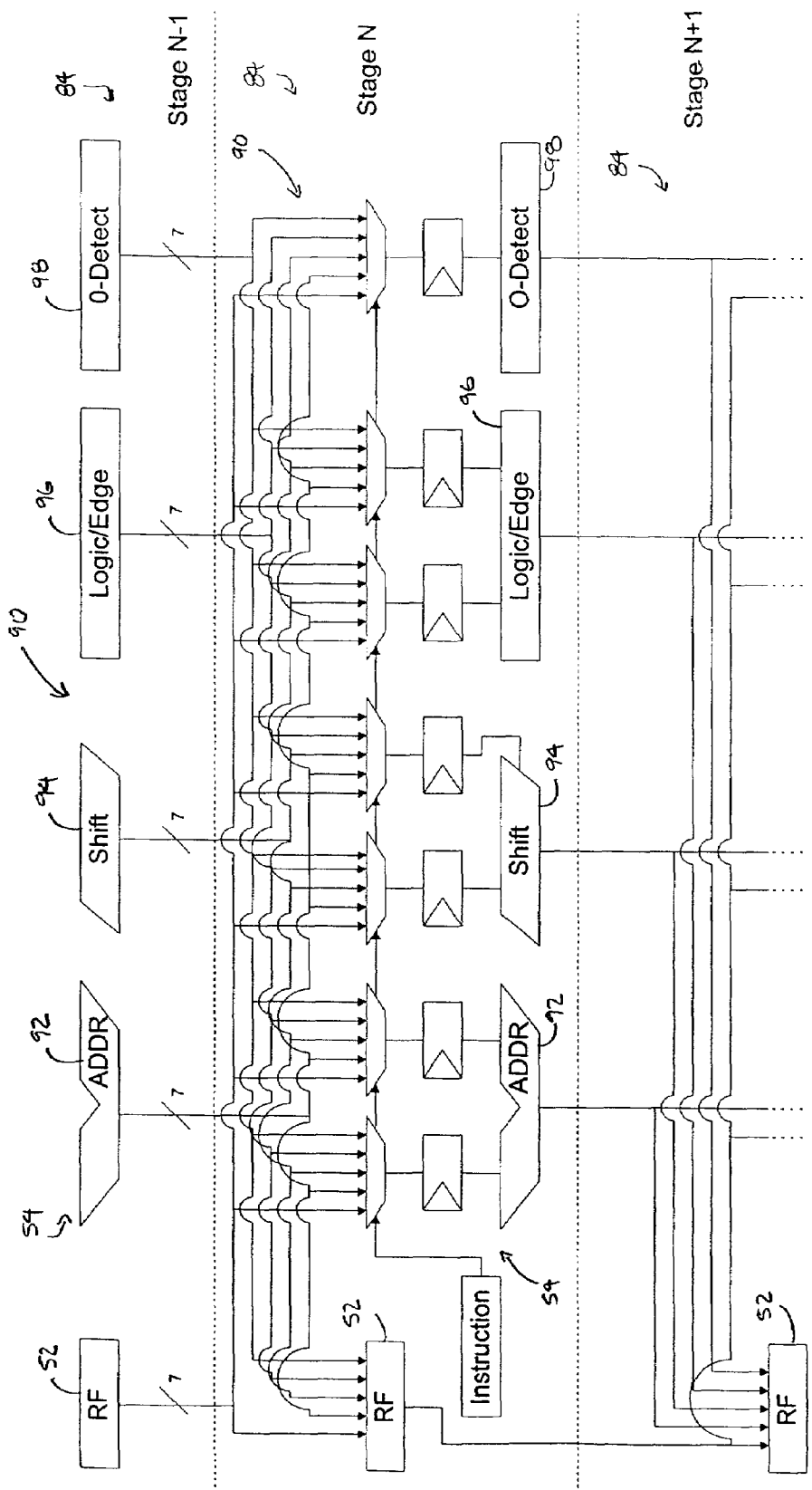
FIG. 12B shows one example of the interactions between functional units for stages N−1, N, and N+1 of a systolic array, in accordance with one embodiment of the present invention.

Referring now to FIGS. 12A-12B, the execution data path 90 of an active stage 84 of the systolic array 48 is illustrated, in accordance with one embodiment of the present invention. As shown in FIG. 12A, the execution data path of the active stage may include an adder 92, a shifter 94 (i.e., a barrel shifter), logic 96 for detecting a leading edge or "1" of a trie, a zero detector 98, and other elements such as a branch unit, a condition code register stack, a status register, load data registers, and specialized units used in the trie walk. The edge detection logic, in one example, locates a leading "1" of a trie, so that the results of the edge detection logic can be used by the systolic array to search the trie, as will be described below with reference to the lookup operation.

Since each active stage 84 in the systolic array may have multiple functional units 54, the stage can be programmed to perform simultaneous operations using more than one of the functional units in the stage—such as add, shift, XOR for example—to implement very long instruction words.

FIG. 12B shows the interrelation of the functional units 54 and the register files 52 of a series of adjacent active stages 84 of a systolic array 48, in accordance with one embodiment of the present invention. With reference to Stage N, it can be seen that each component of the execution data path 90 receives, as inputs, the results (i.e., program context) from each of the units of the prior stage's execution data path, in one embodiment of the invention. For instance, the adder 92 of Stage N receives the results from the adder 92, shifter 94, logic/edge detection 96, and zero detect units 98 of the execution data path 90 of Stage N−1. Further, the units of the execution data path of Stage N also receive as inputs the image from the register file 52 of the prior Stage N−1. The register file image from Stage N−1 is also made available to the register file of Stage N, and the image of the register file of Stage N is made available to the register file of Stage N+1.

Also, it can be seen in FIG. 12B that the results from the execution data path 90 of Stage N are made available both to the register file 52 of stage N+1, as well as to the inputs of the execution data path 90 elements of Stage N+1, in accordance with one embodiment of the present invention.

Figures 13A, 13B:
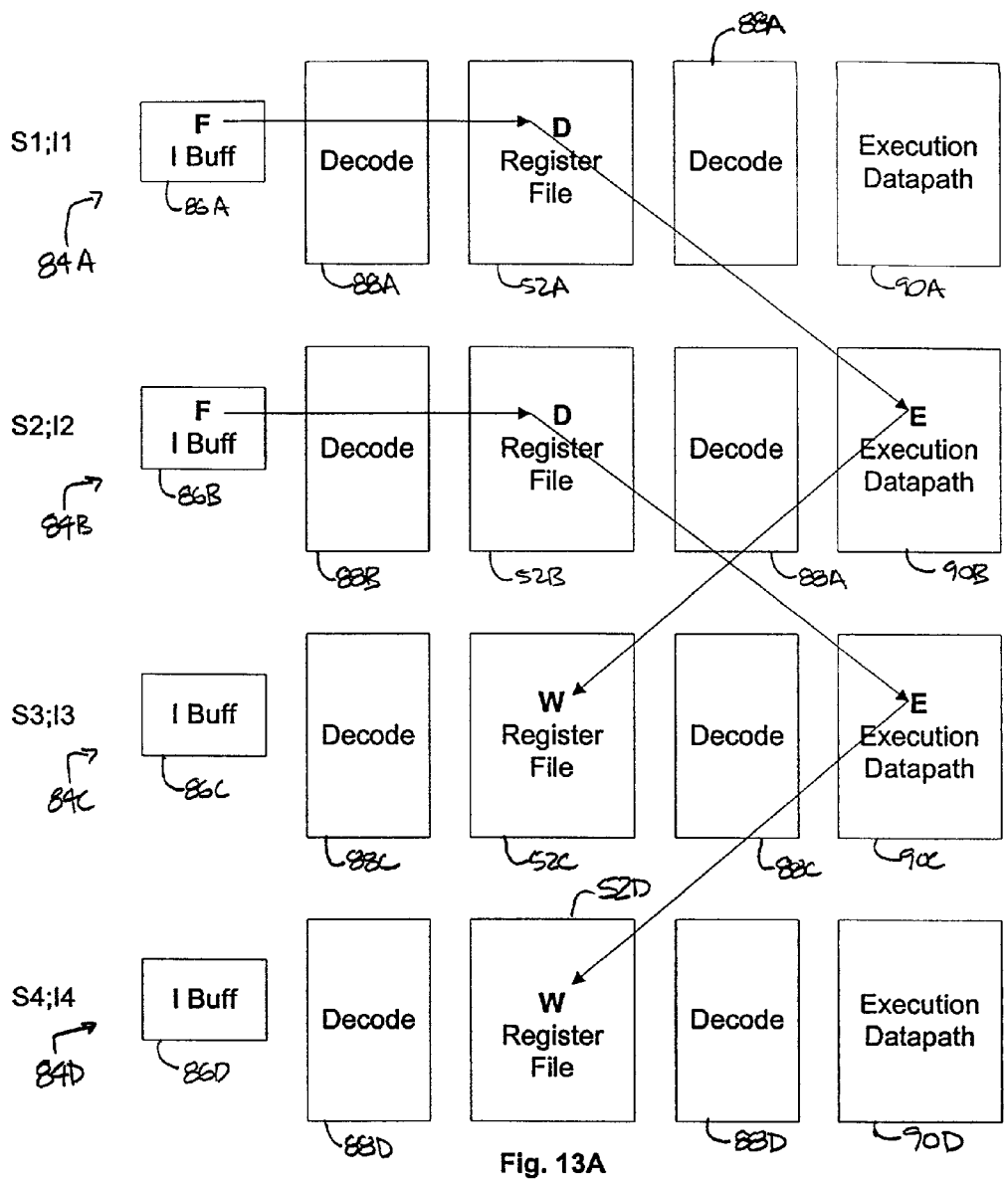
FIG. 13A illustrates an example of processing of instructions through a plurality of stages in a systolic array, in accordance with one embodiment of the present invention.
FIG. 13B illustrates an example of processing of instructions through a plurality of stages over various cycles in a systolic array, in accordance with one embodiment of the present invention.

FIGS. 13A and 13B illustrate the interaction of instructions and the register files 52 through the cycles of an instruction within a systolic array 48, in accordance with one embodiment of the present invention. Referring to FIG. 13A, four stages (84A-D) are shown as S1, S2, S3, and S4, and each stage has an instruction associated therewith, shown as I1, I2, I3, and I4. Each stage is shown with an instruction buffer (86A-D), decode logic (88A-D), a register file (52A-D), and an execution data path (90A-D), as shown in FIG. 9, and it is assumed that the stages are arranged so that stage 2 (S2) follows stage 1 (S1), stage 3 (S3) follows stage 2 (S2), etc. FIG. 13B illustrates the fetch, decode, execute and write operations of the instructions I1 to I4 of FIG. 13A, as phase operations are distributed over cycles of the systolic array. As can be seen, for instance, with instruction 1 (I1), the fetch operation occurs in the first cycle of stage 1 (S1), the instruction is decoded with decode logic 88A and the register file 52A is read in the second cycle (i.e., the source operands are read), the instruction is executed in the execution data path 90B of the next stage (S2) of the systolic array during the third cycle; and, the results of the operations performed at the execution data path are written to the register file 52C of stage 3 (S3) during the fourth cycle.

Similarly, for instruction 2 (I2) at systolic array stage 2 (S2), the instruction is fetched and decoded with decode logic 88B, executed in the execution data path 90C of stage 3 (S3), and the results are written to the register file 52D of stage 4 (S4), in accordance with one embodiment of the present invention. Accordingly, it can be seen that at steady state, the execution data path 90 of each stage is capable of executing an instruction per each clock cycle, and writes the results of the execution to the register file 52 of the subsequent stage during the next cycle.

Figure 14:
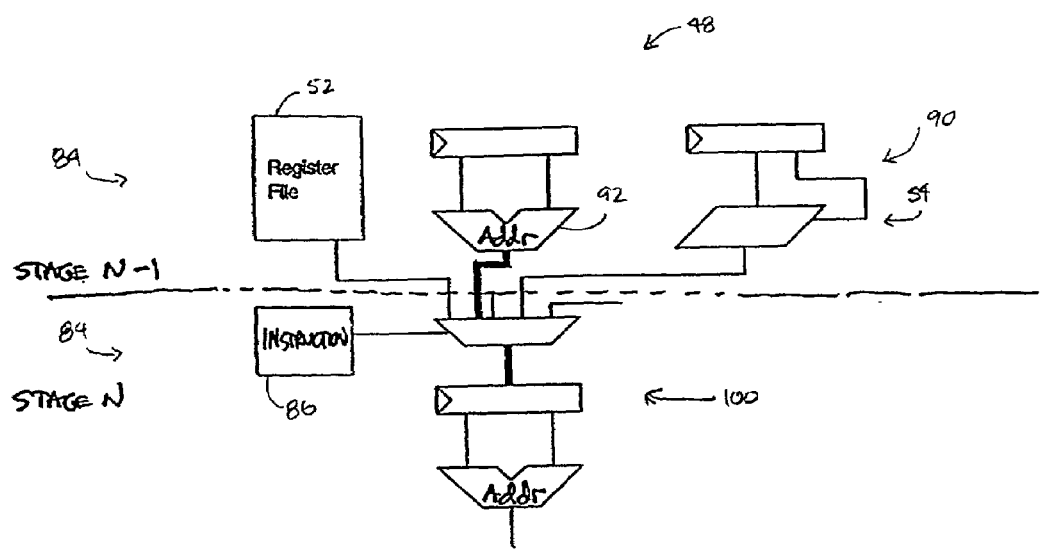
FIG. 14 illustrates named bypassing for handling register dependencies in a systolic array, in accordance with one embodiment of the present invention.

FIG. 14 illustrates named bypassing 100, which can be performed with the systolic array 48 in accordance with one embodiment of the present invention. Named bypassing is used to handle instances where a registered dependency exists in the software (i.e., where a subsequent stage needs, as an input, the results from the immediately preceding stage). In one embodiment of the invention, each active stage 84 of the systolic array is capable of accepting an instruction which specifies, as a source operand, the direct results from the execution data path 90 of the immediately preceding stage of the systolic array. In other words, as shown in FIG. 12B, the adder 92 of Stage N could receive, as a source operand specified in software, either a register from the register file 52 of Stage N–1, or the data provided by one of the elements of the execution data path 90 of the prior Stage N–1. In effect, named bypassing permits a stage of the systolic array to request a result from a functional unit 54 of a preceding stage, instead of waiting one or more cycles to read the results from the register file.

Figure 15A:
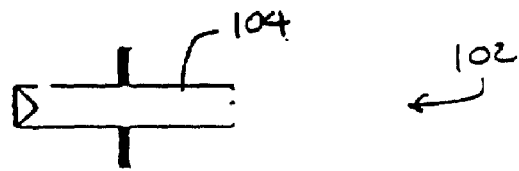
FIGS. 15A-C illustrate various types of sleep stages of a systolic array, in accordance with one embodiment of the present invention.
Figure 15B:
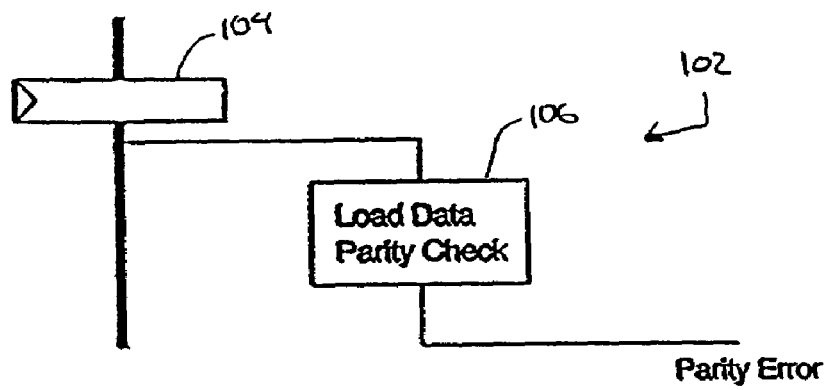
Figure 15C:
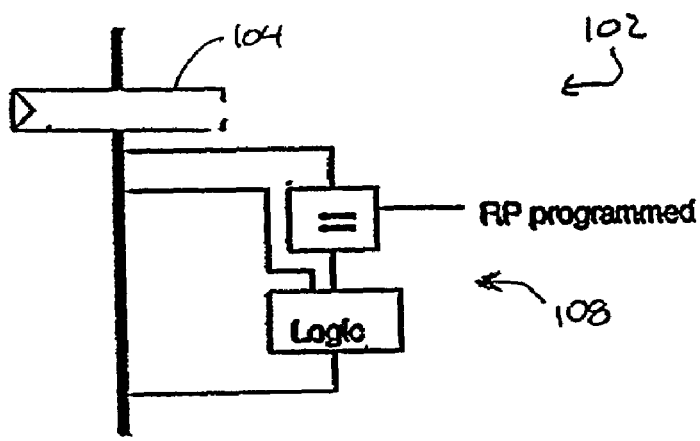

In addition to active stages, the systolic array, in one embodiment, contains inactive or "sleep stages" 102 which in effect provide delay periods within the systolic array. FIGS. 15A-15C illustrate various examples of sleep stages used in accordance with one embodiment of the present invention. In FIG. 15A, a sleep stage 102 is shown comprising a flip flop delay 104, which provides a one cycle delay within the systolic array in one embodiment of the invention. FIG. 15B illustrates a sleep stage 102 which provides parity checking 106 on previously received load data and can generate a parity error if appropriate. This sleep stage is useful, for example, for stages which follow the receipt of data from, for instance, the forwarding table SRAM. FIG. 15C illustrates a sleep stage 102 having logic 108 for controlling the stroking of data within an execution unit of the systolic array, which will be described below. The logic determines whether a packet context should be processed again by a set of stages within the systolic array of an execution unit of the NPU 34, for purposes of "stroking" as will be described below.

Figure 16:
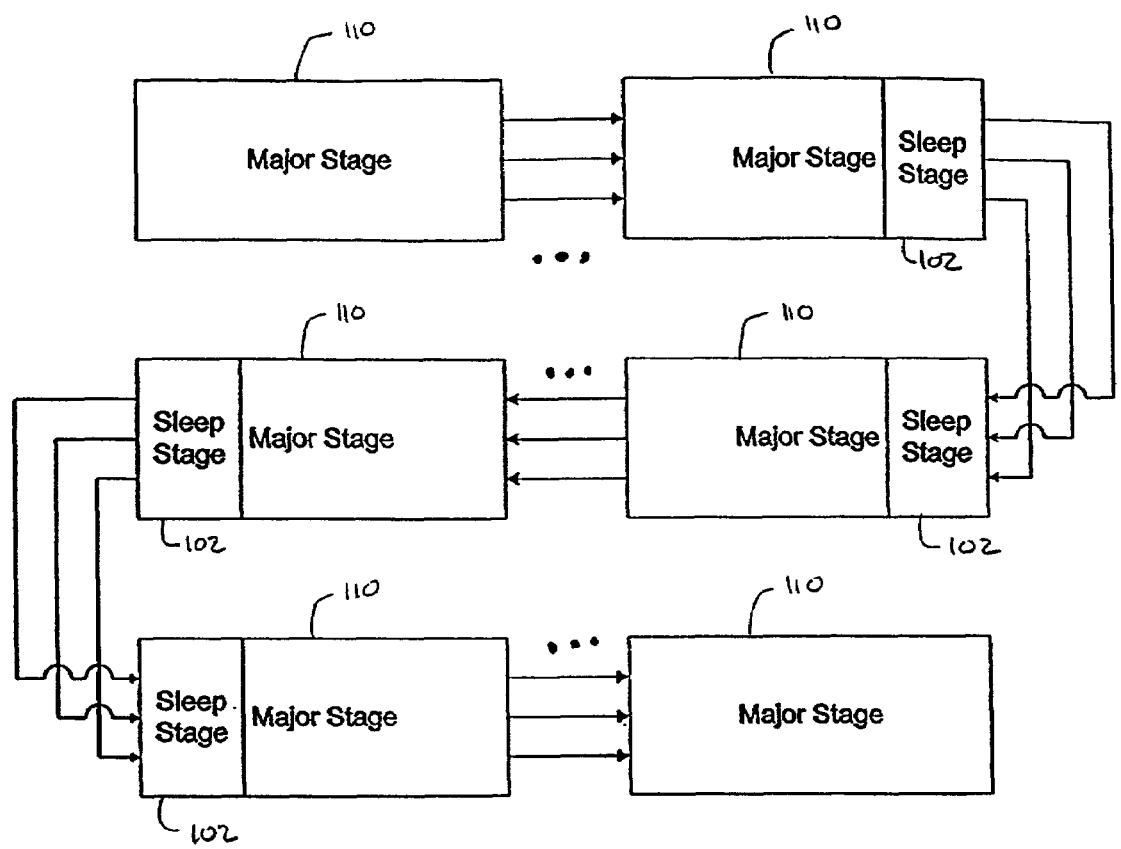
FIG. 16 illustrates an example of a physical layout of series of major stages of a systolic array, in accordance with one embodiment of the present invention.

FIG. 16 illustrates one example of a physical arrangement of a plurality of major stages 110 in the NPU 34, in accordance with one embodiment of the present invention. Because the systolic array pipeline is comprised of a variety of stages (both major and minor stages) with numerous interconnections between each stage, it is beneficial to arrange the major stages as shown in FIG. 16, wherein at the turns between two stages, as shown in FIG. 16, a sleep stage 102 or flip flop is provided between the output of a prior stage to the input of a subsequent stage, as shown in FIG. 16. Such a direct connection between flip flops improves performance along that turned path. For instance, a turned path may include over a thousand wires in a VLIW embodiment, and accordingly, performance is improved if there are flip flops provided between the connections of the turn.

Figure 17:
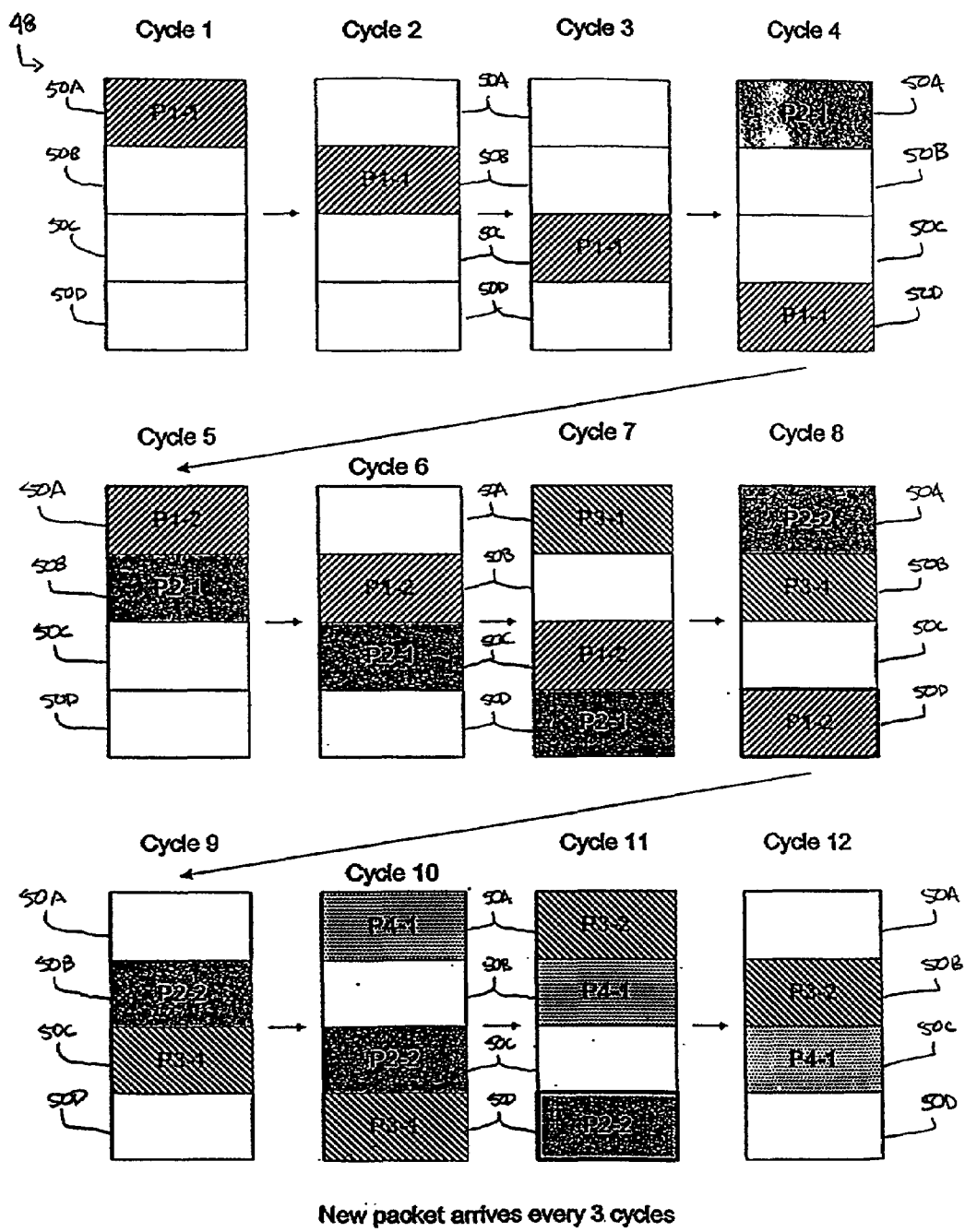
FIG. 17 illustrates an example of processing of a packet context through twelve cycles of an example four stage pipeline, in accordance with one embodiment of the present invention.

Referring now to FIG. 17, packet contexts can be stroked (processed multiple times within the systolic array of an execution unit) within the PXU 56, LXU 58, or QXU 60 of the NPU 34, in accordance with one embodiment of the present invention. In the stroking process, the packet contexts are sent through a particular execution unit (the PXU, LXU, or QXU) more than one time so that the packet's context can be further processed within a particular execution unit. Each time a packet context is passed through an execution unit for processing, the packet context is said to be "stroked." By passing a packet context multiple times (i.e., once stroked; twice stroked; thrice stroked, etc.) through the stages of an execution unit of the NPU, the stroking process also allows the efficient reuse of the particular execution unit, and thereby permits the physical size of the systolic array for an execution unit of the NPU to be reduced.

Recall that each execution unit is programmatic so that the stages 50 can perform different operations on the packet context as the packet context is passed through the particular execution unit multiple times. In this manner, as the packet context is stroked or passed through the execution unit, the stages of the execution unit perform different operations on the packet context each time the packet context is processed therein. For instance, depending on how the LXU 58 is programmed, in a three stroke process through the LXU, during the first pass of the context through the LXU, the stages of the LXU can be programmed to perform processing operations 1-8; during the second pass of the context through the LXU, the stages of the LXU perform program processing operations 9-16; and during the third pass of the context through the LXU, the stages of the LXU perform program processing operations 17-24. Since the stages of an execution unit are efficiently re-used by stroking, such a stroking process reduces the need for a larger systolic array execution unit, which can save space on the integrated circuit.

In one example, the NPU 34 receives a new packet from the network every three cycles, and accordingly, the packet contexts being stroked (in one example, a packet context is passed a total of three times through an execution unit) can be stroked through an execution unit of the NPU during the available cycles between the cycles when another packet is received. In this way, the stroking of packet contexts within an execution unit would not affect the NPU's ability to accept and process new packets received from the network at line rate, while affording each packet context the needed amount of processing within the execution unit. Further, the resources of the execution units of the NPU are efficiently used and the sizes of the execution units of the NPU are reduced.

Referring to FIG. 17, an example is shown of a four stage (50A-D) systolic array pipeline 48 wherein each packet context is stroked twice. Assuming that a new packet context arrives every three cycles for processing, it can be seen that at cycle 4, packet 1 (shown as P1-1) is completing processing in the fourth stage 50D of the systolic array during its first stroke, as packet 2 (shown as P2-1) is arriving in the first stage 50A of the systolic array. After stage 1 completes its operations on packet 2 (P2-1) at cycle 5, packet 2 moves to stage 2 (50B), and packet 1 (now shown as P1-2) can be introduced into stage 1 (50A) to begin its second stroke through the systolic array. At cycle 7, a new packet 3 (P3-1) is introduced into the systolic array (50A), and at cycle 8, packet 1 (P1-2) is processed in the fourth stage (50D) on its last stroke in this example. In cycle 8, packet 2 (P2-2) is also introduced into stage 1 (50A) to begin its second stroke. At the completion of cycle 8, packet 1 has completed processing in the systolic array. At cycle 10, a new packet 4 (P4-1) is introduced into the systolic array (50A), and at cycle 11, packet 2 (P2-2) is processed in the fourth stage (50D) on its last stroke in this example. in cycle 11, packet 3 (P3-2) is also introduced into stage 1 (50A) to begin its second stroke.

In the example of FIG. 17, it can be seen that packet context data can be stroked within the systolic array 48 while new packet contexts are introduced into the systolic array without contention. It can also be seen that at steady state (i.e., after the systolic array has been filled with packet contexts), the systolic array of FIG. 17 can accept a new packet every three cycles and can output a processed packet every three cycles. In this example, if the operating frequency of the systolic array and the number of stages of the systolic array and number of strokes therein is set to permit sufficient time to perform the lookup operation for a packet within the systolic array, then the systolic array would then also produce a processed packet at the line rate during steady state operations. It is understood that FIG. 17 represents an example of a systolic array in accordance with one embodiment of the present invention, and that the number of stages used in the systolic array and the number of strokes utilized therein is a matter of choice depending upon the particular implementation.

For instance, a 10 Gbit/sec line rate (e.g., OC192) where the shortest IP packet has 40 bytes, translates to 30 million packets/sec. In an embodiment with four media adapters per NPU (i.e., four packet streams of 10 Gbits/sec into the NPU), 30 million packets/sec translates to 120 million packets/sec into the NPU. If the NPU runs at a rate of 375 MHz, then [375 MHz/(120 million packets/sec)] means that the NPU would receive a new packet every three clock cycles of the NPU. If the NPU runs at a rate of 500 MHz, then the NPU would receive a new packet every four clock cycles.

Referring now to FIG. 18, one example of the PXU 56 systolic array pipeline is illustrated. As shown in FIG. 18 the PXU systolic array in one embodiment includes 25 active stages 84 (shown as unshaded blocks), and eight sleep stages 102 (shown as shaded blocks) in the main portion of the systolic array pipeline. As data moves through the PXU systolic array, the output of the PXU systolic array (i.e., the packet context being formed) can either be passed to the input of the LXU 58 systolic array, or can be run through ("stroked") again through the PXU pipeline if further processing of the context is needed. A stroke control 112 shown in FIG. 18 controls a multiplexer 114 of the PXU which is used to arbitrate or select packet contexts into the systolic array without collision.

As discussed above, the PXU 56 parses the packet header to extract the IP destination address and the QoS information for the packet, which form the first partial packet context. In one embodiment, the PXU also performs a pre-fetching function which launches a memory access to the forwarding table 64 to begin the lookup process, such that the results of the memory access will be available to the front end active stages of the LXU 58 systolic array. In one example, the PXU accesses the forwarding table memory with packet data (i.e., the first 12 bits of the packet's destination address) to determine the root node for the packet. The results of the root node are returned in time to be used by the front-end of the LXU. The first partial packet context from the PXU 58 is then transmitted to the LXU 58, which performs a forwarding table lookup using the packet context (in its current form) to determine which base queue to assign the packet to. Accordingly, the packet context generated from the LXU includes the assigned base queue for the packet.

FIG. 19 illustrates one example of a systolic array for the LXU 58, in accordance one embodiment of the present invention. As shown in FIG. 19, the LXU has in one example a plurality of sleep stages 102 (shown as shaded blocks) followed by a plurality of active stages 84 (shown as unshaded blocks), with this structure repeating throughout the systolic array of the LXU. Again, the LXU receives the packet context data from the PXU 56, or receives the packet context from its stroke control 116 within the LXU. The LXU systolic array output either provides the processed context to the QXU 60 systolic array, or continues to process the context by passing the context to the top of the systolic array of the LXU (stroking). The stroke control shown in FIG. 19 controls the multiplexer 118 of the LXU which is used to arbitrate or select packet contexts into the systolic array without collision.

The LXU 58 is implemented as a systolic array pipeline that provides pipelined processing of a packet context. In one embodiment, multiple packet contexts may be in process within the systolic array at the same time. One advantage of the systolic array is that the forwarding table lookup is performed at the line rate. Therefore, the forwarding table lookup operations are performed without first cellifying the packets and storing the cells in memory, which provides for higher throughput of packets through the router 20 than previous designs would allow.

Figure 21:
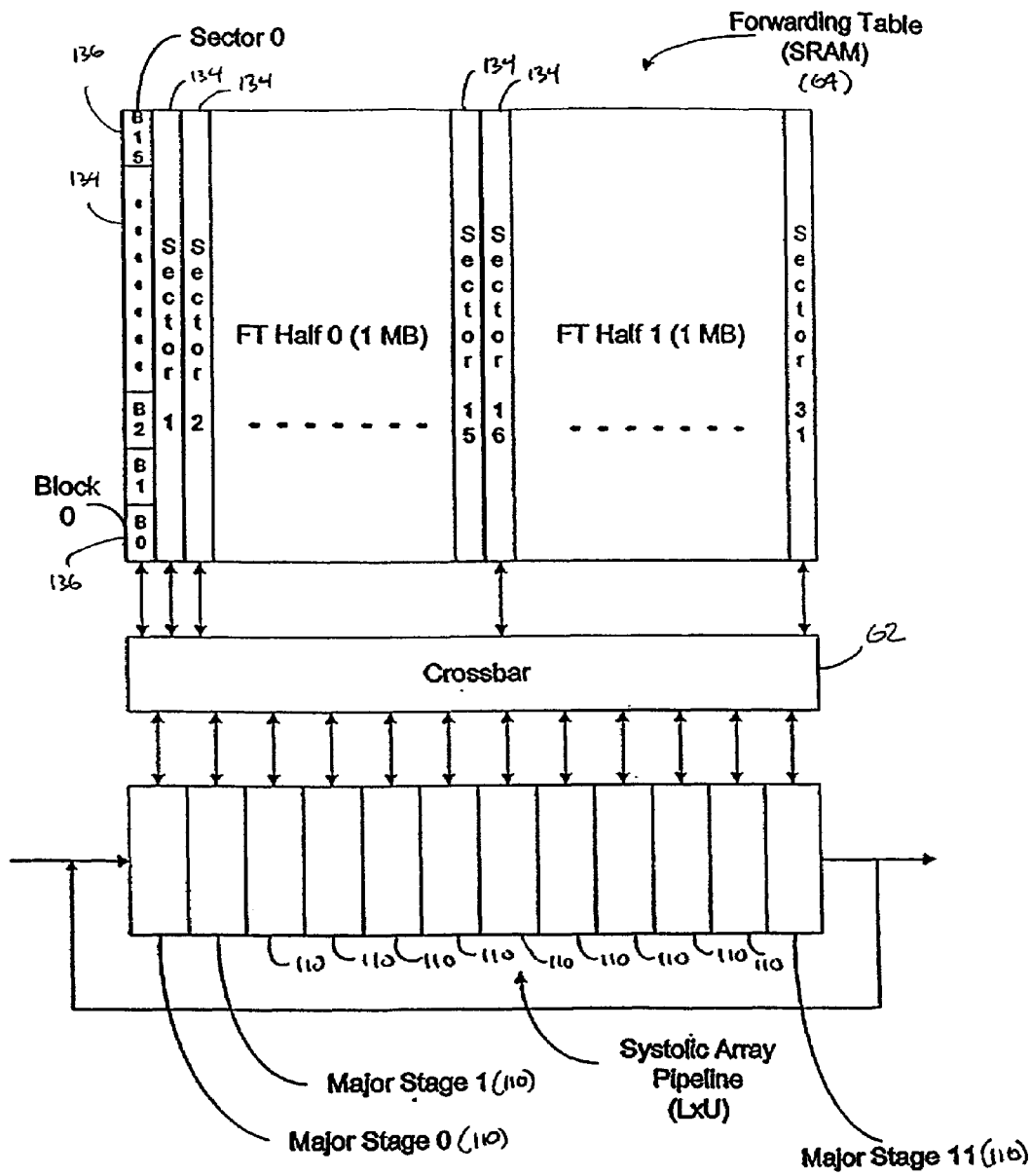
FIG. 21 illustrates a lookup topology including a lookup engine, a forwarding table crossbar, and a forwarding table, in accordance with one embodiment of the present invention.
Figure 22:
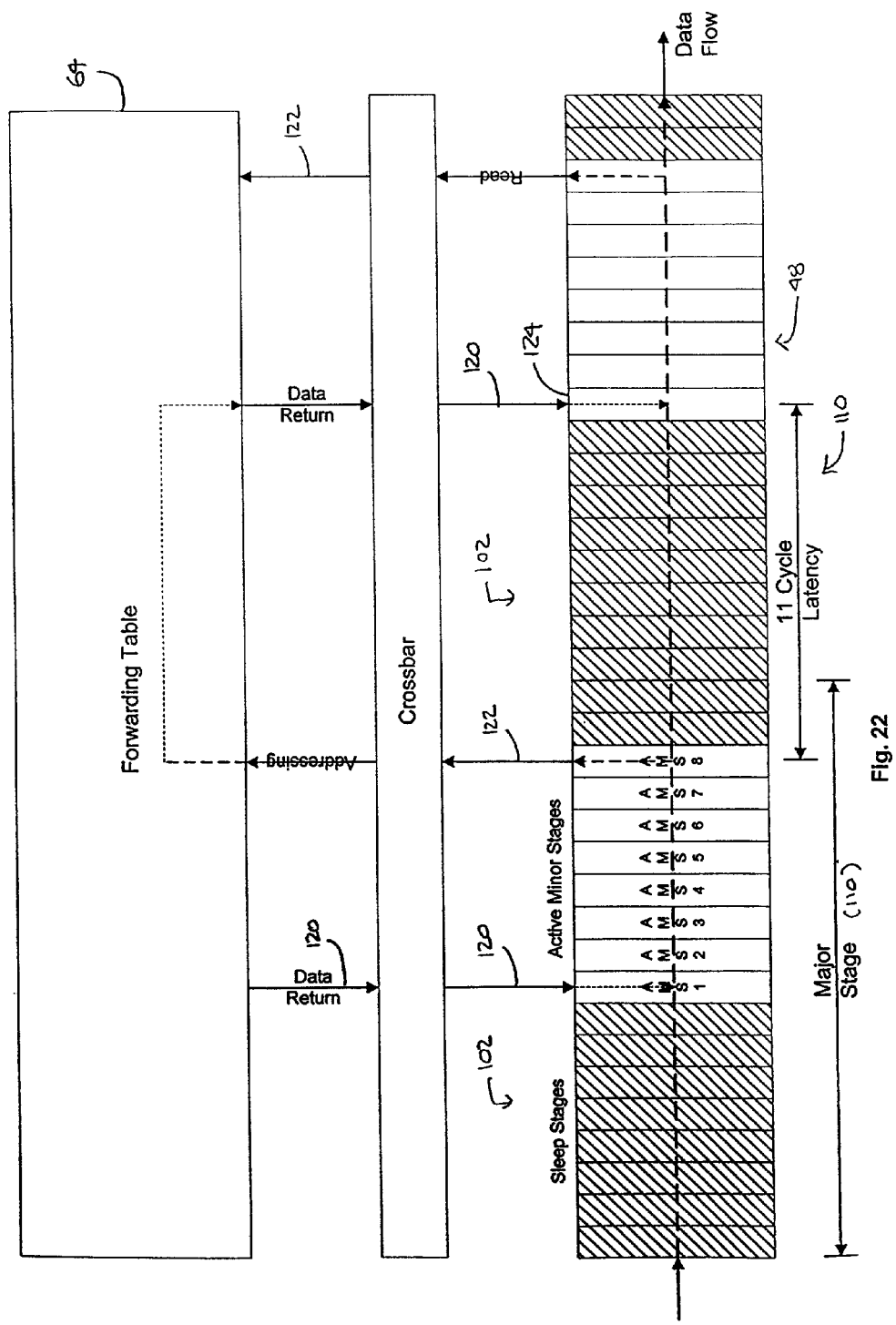
FIG. 22 illustrates an embodiment of a lookup engine and communication paths between a lookup engine and a forwarding table, the lookup engine being a systolic array pipeline having at least a first major stage and a second major stage, with each major stage having at least one inactive minor stage and at least one active minor stage, in accordance with one embodiment of the present invention.

In processing the packet context and referring to FIGS. 21-22, a major stage 110 of the LXU includes a data return 120 from the forwarding table 64 that was generated from a read in the preceding major stage, operations on the data returned, and a read 122 of the forwarding table that will result in a data return to the next major stage. As shown in FIG. 22, a first active minor stage (AMS1) receives the data return 120 from the forwarding table generated by the preceding major stage. Following the first active minor stage (AMS1), are six minor stages (AMS 2-7) that determine the address of the next read of the forwarding table, i.e., which node of the trie to examine next). An eighth active minor stage (AMS8) then generates the read via an addressing line 122 of the correct memory address in the forwarding table 64. In one embodiment, there is a latency of 11 cycles between when a read request is sent to the forwarding table from the systolic array, i.e., from the eighth active minor stage (AMS8), and when data is returned from the forwarding table to the systolic array, i.e., to the first active minor stage 124 of the following major stage. Accordingly, ten inactive minor sleep stages 102 are placed between the minor stage (AMS8) where the read request is sent to the forwarding table 64 and the active stage 124 where data is returned. Two of the inactive minor stages are arranged at the end of a major stage, and eight of the inactive minor stages are arranged at the beginning of a major stage.

The inactive minor stages 102 move data from the preceding minor stage into the next minor stage, and move data from the inactive minor stage to the subsequent minor stage during each cycle. The inactive minor stages are implemented in the systolic array pipeline to keep data moving through the array every cycle, even if no operations are being performed on the data during the cycle, moving from stage to stage every cycle. The systolic array is scaleable to allow adjustments for changes in the forwarding table 64 lookup latency, either in the forwarding table itself or in getting data to and from the forwarding table, by adjusting the number of inactive minor stages to adapt for the latency. As discussed above, in one example the latency is 11 cycles, and therefore 10 inactive minor stages are located between the active major stage performing the read operation (AMS8) and the active minor stage 124 receiving the data corresponding to the read.

Stroking is possible within the systolic array because a new packet does not have to be accepted each cycle to maintain the line rate. Rather, as discussed above, a packet enters the systolic array every third cycle at 375 Mhz for the three-stroke embodiment (or every four cycles at 500 Mhz in a four-stroked embodiment). Therefore, in one embodiment, there are two slots open every three cycles for first partial packet contexts passing through the systolic array on the second and third strokes, and one stroke open for new first partial packet contexts entering the pipeline. The number of strokes is set in the lookup engine 58 by the route processor 26, with the default being three strokes.

In one embodiment, packets can arrive into the systolic array of the LXU 58 from the parsing engine 56 at any time. Since contexts may already exist in the systolic array, scheduling logic and additional buffering is provided to support variable context entry in the systolic array and prevent collisions between existing contexts and a new context. In one embodiment, to optimize packet entry, the parsing engine 56 schedules packets to enter the systolic array on fixed three or four cycle boundaries (variable under route processor 26 control, as with the stroke count). This provides for simplified systolic array stroking because contexts will enter the systolic array on a fixed schedule. Therefore, stroked contexts reenter the beginning of the systolic array on the cycles that new contexts are not entering the systolic array. Accordingly, in the one embodiment there is a scheduling buffer for temporarily buffering contexts for two cycles before entry into the systolic array.

In addition to the 12 major stages, the LXU 58 systolic array includes a plurality of staging inactive minor stages 102 (sleeps) where the number of staging sleeps provides a total number of cycles in the stroke that is not divisible by 3 or 4 (the number is prime), in one example. The number of staging sleeps is a function of the number of total cycles in the pipeline as well as the rate at which new packets can arrive (for the three-stroke embodiment, 1 new packet every three cycles).

Referring again to FIG. 19, in one embodiment, the beginning of the systolic array pipeline of the LXU includes a first staging sleep 126 that receives the context from a return staging sleep 128 at the end of the pipeline, i.e., a packet context being processed on the second or third stroke. The return sleep and the first staging sleep are implemented for timing isolation.

Figure 20:
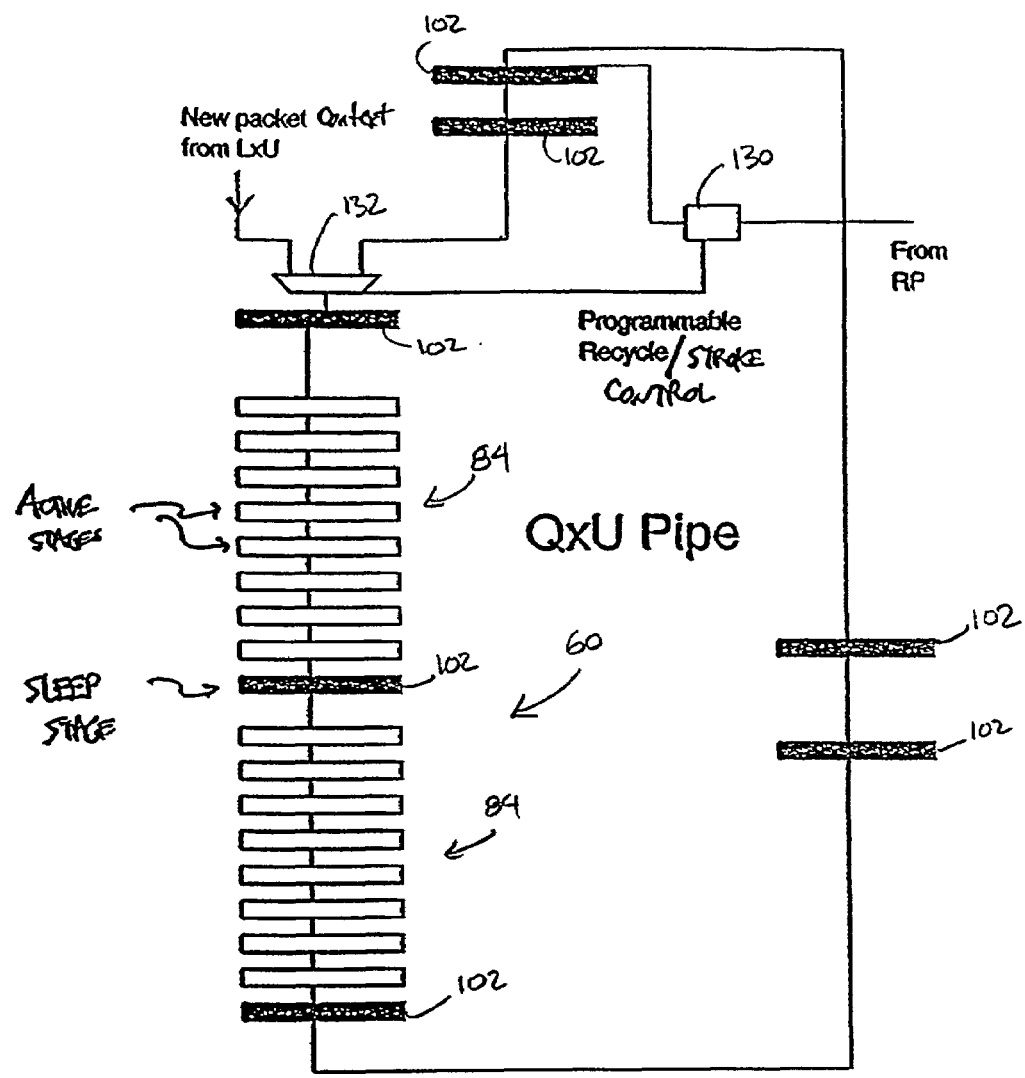
FIG. 20 illustrates an example of a queuing execution unit (QXU) including systolic array stages, in accordance with one embodiment of the present invention.

Referring now to FIG. 20, one embodiment of the systolic array for the QXU 60 is illustrated, in accordance with one embodiment of the present invention. As shown in FIG. 20, the QXU's systolic array receives processed context data from the LXU 58, or receives context to be further processed within the QXU pipe from the QXU's stroke control 130. The stroke control shown in FIG. 20 controls the multiplexer 132 of the QXU which is used to arbitrate or select packet contexts into the systolic array without collision.

The QXU 60 completes the generation of the packet context, and unifies the context with the packet from the packet buffer 70, so that the packet and the packet context can be processed by the remaining portions of the router 20. In one embodiment, a packet context makes three strokes through the QXU. During the first stroke, the metering function can be performed for packets that use metering, in one embodiment. During the second stroke, metering computations are completed, and the meter time stamps and other data can be stored.

Further, a table can be accessed to determine the absolute value of the queue in the router to which the packet will be sent. In one example, a table is accessed which takes an index and 64 possible values which map to an offset number which, when added to the base queue number (provided by the LXU 58), will return the absolute value of the queue in the router 20 to which the packet will be sent. The index can be derived from the context as received from the LXU 58, as well as the value of the meter computed during the first stroke, in one embodiment. The queue offset is added to the base queue number from the context register, and the result obtained is placed in the context register for downstream consumption within the router.

During the third stroke within the QXU 60, packets may receive an adjustment to the length field of the context register. Further, the context may contain flags indicating whether the packet header is an IP or MPLS header. An NPU check sum may be written to the end of the packet so that the striper 38 can verify the NPU check sum when receiving the data, in one embodiment.

It can be seen that because the stages of the PXU 56, LXU 58, and QXU 60 process data sequentially, in one embodiment, the packets are processed and maintained in correct order relative to one another.

Forwarding Table Memory

Referring now to FIG. 21, the forwarding table (FT) 64 is a memory array including the IP destination addresses serviced by the router 20. Generally, each router or other device in the network that is connected with the router has its IP destination address, or at least a portion of its IP destination address, stored in the forwarding table. The FT is, in one embodiment, implemented in a 2 MB on-chip SRAM organized as 32 sectors 134 having 16 4096-byte blocks 136 or 1024 32-bit words, with each word corresponding to a node of the trie. The 2 MB on-chip SRAM is placed on the same chip as the systolic array, which results in less latency between when a memory address in the FT 64 is read and when data from that memory address is returned to the systolic array 48. Further, an on-chip FT allows multiple concurrent accesses to the FT, thus allowing multiple lookups to proceed in parallel. Prior art forwarding tables are generally located off-chip, which creates a greater latency between forwarding table reads and forwarding table data returns, and also severely limits the available bandwidth.

In one example, each major stage 110 of the LXU 58 systolic array uses its own address space. To facilitate the address space requirements of the systolic array, the FT is partitioned into a plurality of sectors 134 defining a plurality of blocks 136. The amount of memory needed by each stage, however, is dynamic, because the IP destination addresses stored in the FT 64 change as the network topology changes. Accordingly, the sectors 134 and blocks 136 are mapped to each stage with shared, differential low swing buses 62 (the "crossbar") to facilitate communication between the stages and all of the sectors and blocks.

The FT 64 as illustrated in the example of FIG. 21 is divided into two halves, each containing 16 read ports, in one example. This facilitates a high read bandwidth between the systolic array 48 and the FT. In one embodiment, the FT is implemented as a Double Data Rate SRAM. Each major pipeline stage 110 drives a read address to both halves of the FT, and a mutliplexor connects a first data bus from the first half and a second data bus from the second half to each major stage. In one embodiment, one of the systolic array major stages sends a 19-bit read address to the FT, the 19 bit read address including a 5-bit sector select, a 4-bit block select, and a 10-bit entry select. The read address maps to a memory segment (i.e., node) of each half of the FT 64, with each memory segment returning a 17-bit data return (i.e., the pointer to the next node of the trie to search) that are muxed together resulting in a 34-bit data input into the following major stage.

The 16 FT read ports communicate with sectors 134 using a plurality of shared, differential, low swing buses. Collectively, the buses are called the crossbar 62, because they connect all sectors to all FT read ports. Read address ports drive onto shared crossbar buses terminating at sectors. Each FT read data port has its own dedicated crossbar bus that is shared by the sectors. The write address and data are transported with a full swing bus.

Each 64 KB sector 134 includes two read ports and one write port, in one example. One FT read address crossbar bus 62 is dedicated to each sector read address port. Within a sector, addresses and data are transported to blocks 136 as full swing signals, and read output data is returned over shared, differential, low swing buses. Each 4 KB block contains 1024 34-bit (includes 2 parity bits) entries, in one example. The 4 KB granularity is a function of the trade-off between the maximum number of blocks that can access the sector's low swing bus and the amount of memory that is unused by blocks using only one of their entries. The blocks are implemented as a standard SRAM block, and can perform one read or one write per cycle. FT writes take precedence over reads. If a read address and write address select the same block, the write is performed. In this situation, the read operation will return the data just written.

In one embodiment, each FT read port is controlled by one major LXU pipeline stage 110, and each of the 64 sector read ports is mapped to one of the FT's 16 read ports. Within a sector 134, each block 136 is mapped to one of the sector's two read ports. All sector write ports are connected to the FT write port, and all block write ports are connected to their sector's write port in one example.

As illustrated in FIG. 22, the FT read and data return operations have an 11 cycle latency with 2-cycle latency for transmission of the FT read address, 7-cycle latency for the reading of the FT 64, and a 2-cycle latency for the data return. Accordingly, there are 11 cycles between when the first major stage makes a read request and the data is returned to the following major stage corresponding to the two sleep stages 102 at the end of the preceding major stage 110 and eight cycles at the beginning of the succeeding major stage.

In one embodiment, the FT 64 communicates with the systolic array 48 through the crossbar 62, which connects all FT read ports to sector read ports. The FT has an address crossbar and a data crossbar. A high-speed bus may be used to communicate between the systolic array and FT. In addition, dynamic mapping requires that any stage can be assigned to any sector port; therefore, the buses are muxed. In one example, the FT delivers 34 bits of data to each pipeline stage every cycle at 375 Mhz. In one embodiment, the crossbar is implemented as a tristate, differential, low swing bus. Alternatively, the crossbar can be implemented using static combinational logic.

In one embodiment, particular stages 110 of the systolic array 48 are adapted to launch memory accesses to the forwarding table SRAM 64 so that the results from the memory access will be available to stages downstream in the systolic array. These stages which may be dedicated to memory accesses can be spaced throughout the systolic array so that the intermediate stages can perform other operations while the memory access is in flight. The different stages may access the forwarding table SRAM through multiple ports to the forwarding table SRAM.

Lookup Procedure

The LXU 58 performs a trie search of the forwarding table 64 to make a longest prefix match between the IP destination address from the first partial packet context and from a plurality of IP destination prefixes stored in the forwarding table. For a large packet-switched network, such as the Internet, not every final destination for a packet is stored in the forwarding table. Accordingly, the router 20 seeks to transmit the packet to a connected router that will have the final destination for the packet in its forwarding table or have the address of another router in the path to the final destination. This is achieved by making a longest prefix match between the IP destination address of the packet and the various IP destination prefixes stored in the forwarding table. For example, if the IP destination address for the packet is 99.123.99.90, and the forwarding table defines queues for IP destination prefixes 99.123.0.0/16 and 99.123.99.0/24, where the /16 and /24 define the length of the corresponding prefix, then the longest prefix match will determine that the packet 99.123.99.90 should be assigned to the queue corresponding to 99.123.99.0/24. One lookup-process is described with reference to FIGS. 23-25, in accordance with one embodiment of the present invention.

The IP destination prefixes serviced by the router 20 are stored in the forwarding table 64 of the NPU 34 as a trie 138, which is a data structure used to perform the longest prefix match. In general, the forwarding table lookup operations include searching the trie to obtain the longest-prefix match between the IP destination address associated with the packet and the address of a node 140 in the trie. The address of the node in the trie associated with the longest prefix match provides, in one embodiment, an index into an off-chip SRAM 142, which includes the base destination queue of the outgoing interface and the encapsulation identification (EID) for the packet. Hence, the on-chip SRAM 64 is used to quickly complete the lookup, while the off-chip SRAM 142 is used to obtain the related data for the packet once the destination has been determined.

Accordingly, the nodes 140 of the trie 138 are searched by the LXU 58, to find the node with an IP destination prefix that most closely matches the IP destination address for the packet being routed, and the port 28 of the router 20 associated with that node is assigned to the packet.

Each trie 138 includes one or more nodes 140 connected together by a series of branches 144. For instance, in the example of FIG. 23, there are two root nodes 146 shown (there may be many more root nodes in an actual implementation), and from each root node emanates various branches, depending on the data received from the RP regarding the real-time topology of the network.

The forwarding table lookup process generally involves a search of the trie 138 to find a node 140 that best matches the IP destination address for the packet (i.e., the longest prefix match). The search includes an analysis of the node to determine which branch 144 to take. The search continues until the longest prefix match is found, and the queue associated with that node is assigned to the packet. To provide for increased efficiency in searching the trie (i.e., to consume more bits at each node), one embodiment includes both a variable text string feature and multiple branches (2, 4, 8, and 16) per node.

Each node 140 defines a text string, an R-bit, an IP destination address, and a B-field. The text string is variable and is the address of the node, and it is used to match with the IP destination address for the packet. The R-bit indicates whether or not the router 20 supports the route associated with the node (i.e., if the R-bit is set for a node, then a port of the router 20 is associated with this node). The B-field indicates the number of branches 144 associated with the node. In one embodiment, the forwarding table 64 includes nodes with 2, 4, 8, and 16 branches. In one example, a 0-0 in the B-field indicates 2 branches, a 0-1 in the B-field indicates 4 branches, a 1-0 in the B-field indicates 8 branches, and a 1-1 in the B-field indicates 16 branches. A trie 138 can be used that looks at one character per node, two characters per node, etc. All the nodes of the trie of the FT can have a fixed number of braches (i.e., 2-way, 4-way, 8-way, and 16-way), or the nodes can be hybrid with different nodes having different branching factors. In one embodiment, a hybrid trie is used.

Figure 23:
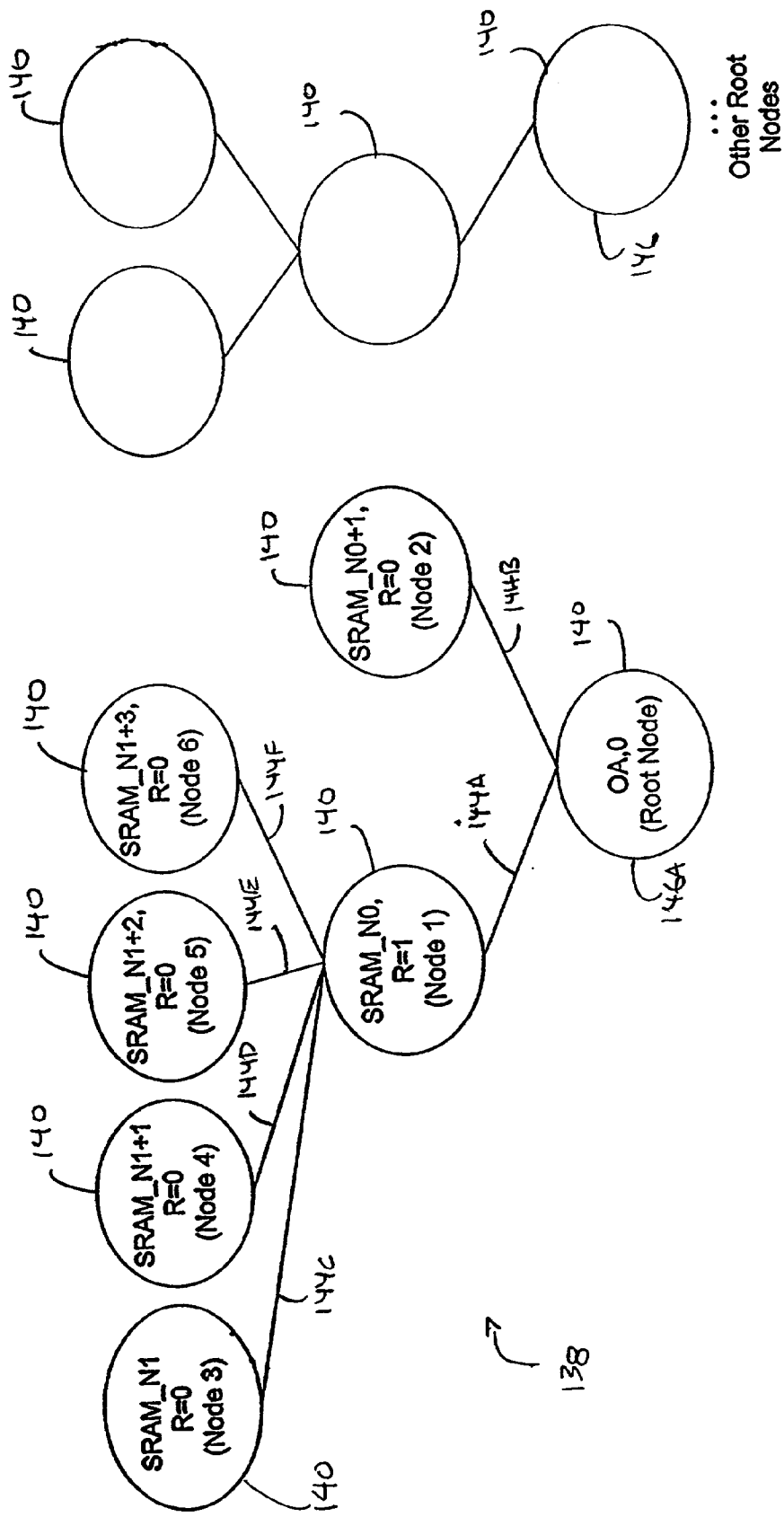
FIG. 23 illustrates an example of a trie used in a lookup process, in accordance with one embodiment of the present invention.

FIG. 23 conceptually illustrates a portion of an exemplary trie according to one embodiment of the present invention. In this example, the base or root node 146A is a 12 bit address 00001010.0000 (0A.0) having a first branch 144A connected with node 1 and a second branch 144B connected with node 2. The address of the node 1 is SRAM_N0, and because the root node 146A has only two branches, the address of the second node is SRAM_N0+1. The R bit for node 1 is set to 1, which indicates that there is an output port associated with node 1. Node 1 has four branches, the first branch 144C being connected with node 3 (address=SRAM_N1), the second branch 144D being connected with node 4 (address=SRAM_N1+1), the third branch 144E being connected with node 5 (address=SRAM_N1+2), and the fourth branch 144F being connected with node 6 (address=SRAM_N1+3).

Figure 24:
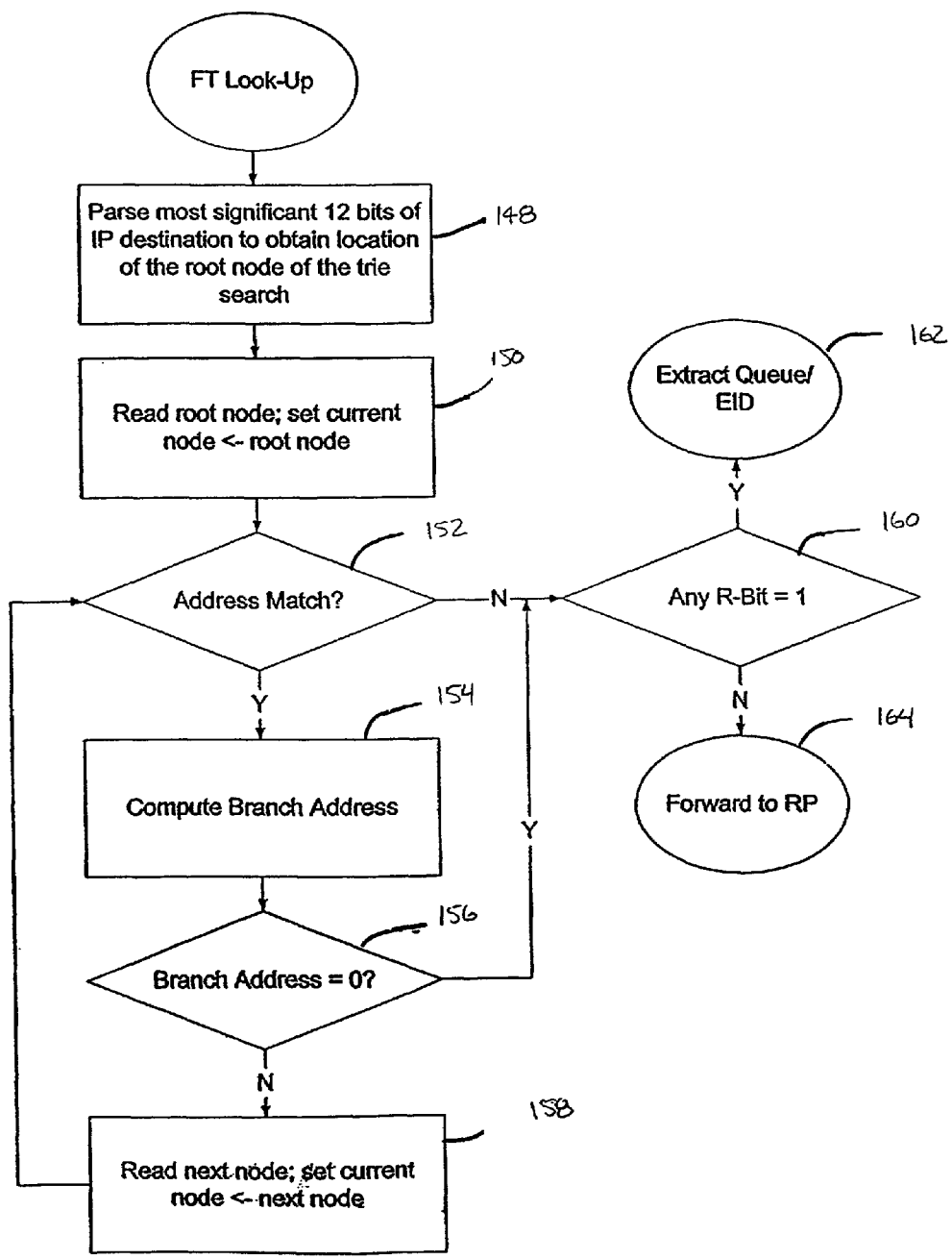
FIG. 24 illustrates an example of logical operations for performing a lookup operation, in accordance with one embodiment of the present invention.

FIG. 24 illustrates one method of searching the trie to obtain the longest prefix match. In operation 148, the most significant 12 bits are parsed from the IP destination address to obtain the location of the root node 146 of the trie search. In one example, the PXU 56 generates the first read (of the root node) into the FT SRAM, which returns the next node to search to the first major stage of the LXU 58.

In operation 150, the root node 146 is read. Initially, the root node is marked as the current node for subsequent operations. In operation 152, it is determined whether there is a match between the IP destination address for the packet and the contents of the current node. If there is a match, then, in operation 154, the current node is read to obtain a branch address, which is the address of the next node in the trie search. Generally, there is only one branch address for a node. The next most significant bit(s) is used to determine which branch to take. For example, in a two branch node with no text string embedded in it, the 13th bit is examined to determine which branch to take. If the 13th bit is zero, then the branch address points to the next node to search; and, if the 13th bit is one, then the branch address for the next node to search is branch address+1. By providing multiple branches per node, more than one bit is consumed per node, which makes the trie search more efficient by requiring less steps. Multiple branches per node are provided when the trie beneath the node is fairly dense. For example, consider the root node with no text string, if there is a node for the 13th and 14th bit, (00, 01, 10, and 11), then it is beneficial to define a four branch node for the root node in order to move forward in the trie search in one step rather than in two steps if there were only two branches (13th bit 0 and 1).

In operation 156, it is determined whether the branch address is zero. An address of zero indicates that the node is a leaf node and there are no nodes deeper in the trie to search, i.e., there are no branches connected with a node having a branch address of zero. If the branch address is zero, then, in operation 160, it is determined whether any node searched during the trie search is mapped to a physical port, which is indicated by the R-bit being set to 1. If such a node exists, then, in operation 162, its address is used to find the base destination queue and the EID for that IP destination address. Otherwise, in operation 164, the packet is forwarded to the RP 26 to decide how that packet should be handled.

Beginning with the root node 146, each node searched thereafter matches some portion of the IP destination address. For example, the root node matches the first 12 bits of the IP destination address. In operation 160, if at least one of the nodes searched includes an R-bit of 1, then the address of the node having the longest prefix match is assigned to the packet. The node with the longest prefix match is the node having an address wherein the most bits, from left to right, match the IP destination address for the packet. The assigned address for the packet provides an index into the off-chip SRAM 142 wherein the memory space associated with the index has a base destination queue and an EID for the packet, which are read and incorporated into the context for the packet.

In operation 156, if the branch address is non-zero, then in operation 158 the branch is taken, and the next node is read. The node is marked as the current node, and the trie search continues at operation 152. In operation 152, if there is no match, then in operation 160, as previously discussed, it is determined whether any of the nodes searched have an R bit=1.

Figure 25:
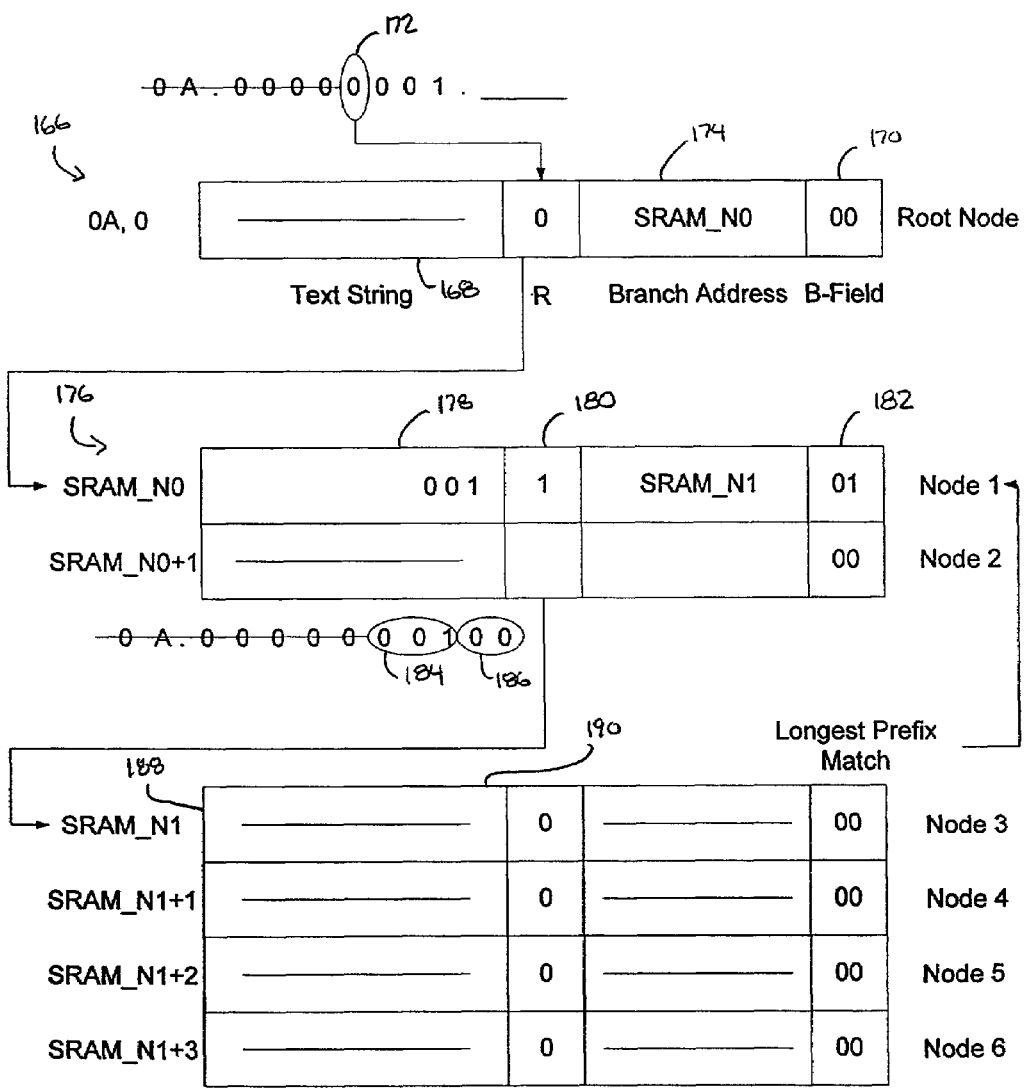
FIG. 25 illustrates an example of a trie search corresponding with the trie illustrated in FIG. 23, in accordance with one embodiment of the present invention.

Referring to FIG. 25, an illustrative exemplary trie search is presented, which corresponds with the conceptual trie illustrated in FIG. 23. In this example, the IP destination address for the packet is 0A.01.02.03 (Hex) or (00001010.00000001.00000010.00000011 Binary). Accordingly, the first node 166 searched in the trie, i.e., the root node, is 0A.0 (00001010.0000) corresponding with the first 12 bits of the IP destination address. In this example, the text string 168 for the root node is null, and it is a two-branch node indicated by 0-0 in the B-field 170. Accordingly, only the 13th bit 172, i.e., the next most significant bit is checked for the next branch. In this example, the 13th bit is 0; accordingly, the address 174 of the next node in the trie is SRAM_N0. Had the 13th bit been 1, then the address of the next node to search in the trie would be SRAM_N0+1.

The next node 176 (SRAM_N0) has a text string 178 of 001, the R-bit 180 is set to 1, and there is 01 in the B-field 182 indicating it is 4-branch node. Accordingly, in this example, the next three bits 184, bits 14-16 of the IP destination address are compared with the text string 178, which is a match. Next, the following two bits 186 of the text string, bits 17 and 18, are used to determine which branch of the node to take, in this example bits 17 and 18 are both 0, accordingly SRAM_N1 is the address of the next node. Had, for example, bit 17 been 1 and bit 18 been 0, "10" in binary (corresponding with decimal 2), then the SRAM_N1+2 would be the address of the next node. SRAM_N1 188 has a zero, or null pointer 190, in the address portion of the node. Accordingly, this node is the last node, or leaf node, in the trie to search. The node, however, is not mapped to an output port, i.e., R=0. Accordingly, the longest prefix match, in this example the preceding node 176 SRAM_N0, is assigned to the packet. The address of this node maps into the off-chip SRAM 142, in one example, to extract the base destination queue for the packet and the EID for the packet.

Recirculation within the NPU

Within the NPU 34, and referring now to FIG. 7A, recirculation of packets allows a variable amount of processing of the packet context within the processor using the systolic array, and such recirculation is performed under program control. In one example, a recirculation packet queue 74 is provided which stores the context of a packet to be recirculated so that, in view of the current network traffic being received at the front end of the NPU, the packet can be inserted into the NPU pipeline at the appropriate moment for further processing. As shown in FIG. 7A, the recirculation packet queue is coupled with the IPA 68, and the IPA selects recirculated packet contexts for introduction into the systolic array in a manner similar to that described above with reference to RP generated packets.

For example, a packet can be recirculated within the NPU 34 if the packet is a "tunnel" packet which has layers of formatting data encapsulated about the packet. In one example, the NPU processes the outer layer of the context of the tunnel packet during a first pass through its stages, and the NPU recognizes that the packet is a tunnel packet with multiple layers of data thereabout. The packet context is then recirculated—by placing the packet context in the recirculation packet queue 74—so that the packet context can be further processed in the NPU to examine the next layer of the tunnel packet. These operations can be repeated until all of the needed information about the packet has been obtained and analyzed by the NPU. In this manner, the NPU can process tunnel packets (or other packets which need variable amounts of processing) without substantially affecting the rate at which other packets are processed by the NPU. Recirculation of packets through the NPU may also be useful for packets which are of the IPV6 type.

Hence, in accordance with embodiments of the present invention, the network processing unit 34 determines the destination of a received packet by using the systolic array architecture, which supports packet processing at the line rate.

C. Route Processor (RP)

As shown in FIGS. 2-3B, the router 20 of the present invention includes at least one route processor 26 that provides the overall management function for the router, which includes running routing protocols that dynamically compute the forwarding table 64 to reflect changes in the topology of the network to which the router is connected with. Routing protocols are used to communicate between different routers in a network, and the protocols include BGP, MPLS, IS-IS, etc. In one example, the forwarding table contains one entry per destination network, specifying the IP address of the next router on the route to that destination network, and a queue corresponding to the output port on which the message is sent. Most network topologies are constantly changing due to the addition and deletion of network components. Generally, the route processor (RP) runs routing protocols that communicate with other devices connected to the network by sending and receiving packets having the necessary routing information to the other devices.

The route processor 26 communicates with devices on the network to track changes in the network and updates the forwarding table 64 to reflect these changes. For example, if a new router is added to the network, then it advertises a new route using routing protocols. In one example, the RP software deciphers the new router's IP address, MAC address, and the media adapter through which the new router can be accessed. The RP then sends information to the NPU 34 to create an entry in the forwarding table corresponding to the new router/new route.

In one embodiment, the RP 26 of the router 20 of the present invention includes a RP queue for temporarily storing routing protocol messages. This prevents the RP from being interrupted to service the routing protocol packets, which could affect the performance of the RP (and the router), if a very large number of RP-destined packets are received by the router.

In addition to running routing protocols, the RP 26 runs a real-time OS, and controls, examines, programs, and diagnoses the various subsystems of the router 20 of the present invention as discussed herein. In one example, the RP contains a conventional microprocessor and a variety of peripherals necessary to support the router, and the RP is implemented with a big-endian processor, i.e., where the leftmost bytes (those with a lower address) are most significant, such as a PowerPC, or a processor with similar performance characteristics, so that the network byte ordering will match the processor byte ordering. Furthermore, laptop market processors may be used because, in one example, the route processor is mounted on a board where there is limited available space.

In one embodiment, the router 20 includes a second route processor 26B that is a replication of the first router processor 26A. The second RP provides enhanced reliability for the router in the event that the first RP fails. The second RP communicates with the first RP in the system via a bi-directional 2 Gbps internal dedicated link.

In addition to the big-endian processor discussed above, the RP includes a stable boot device such as a flash memory, a DRAM for the processor to hold routing tables and other necessary data structures, two serial ports for console connections, and a 10/100 Ethernet port for connection to the out-of-band management network. The RP may also support a disk drive for accumulating accounting data, event logging, or crash dump support. In addition, the RP supports large internal flash disk for the primary boot and configuration device RP, and one removable PCMCIA flash slot for transferring configuration information and software images into the router when the network is not accessible.

IV. Switching Engine

The switching engine 24 primarily cellifies packets received from the NPU 34, and stores the cells in their assigned destination queue. The switching engine is connected between the NPU 34 on the input-side of the interface subsystem 22 and the LCU 36 on the output-side of the interface subsystem. The full-scale router of one embodiment of the present invention includes three switching engines, each of which includes a striper 38 connected with an array of 12 MCUs 40 that each control 16 banks of high speed memory units, in one example (FIG. 3B).

Figure 26:
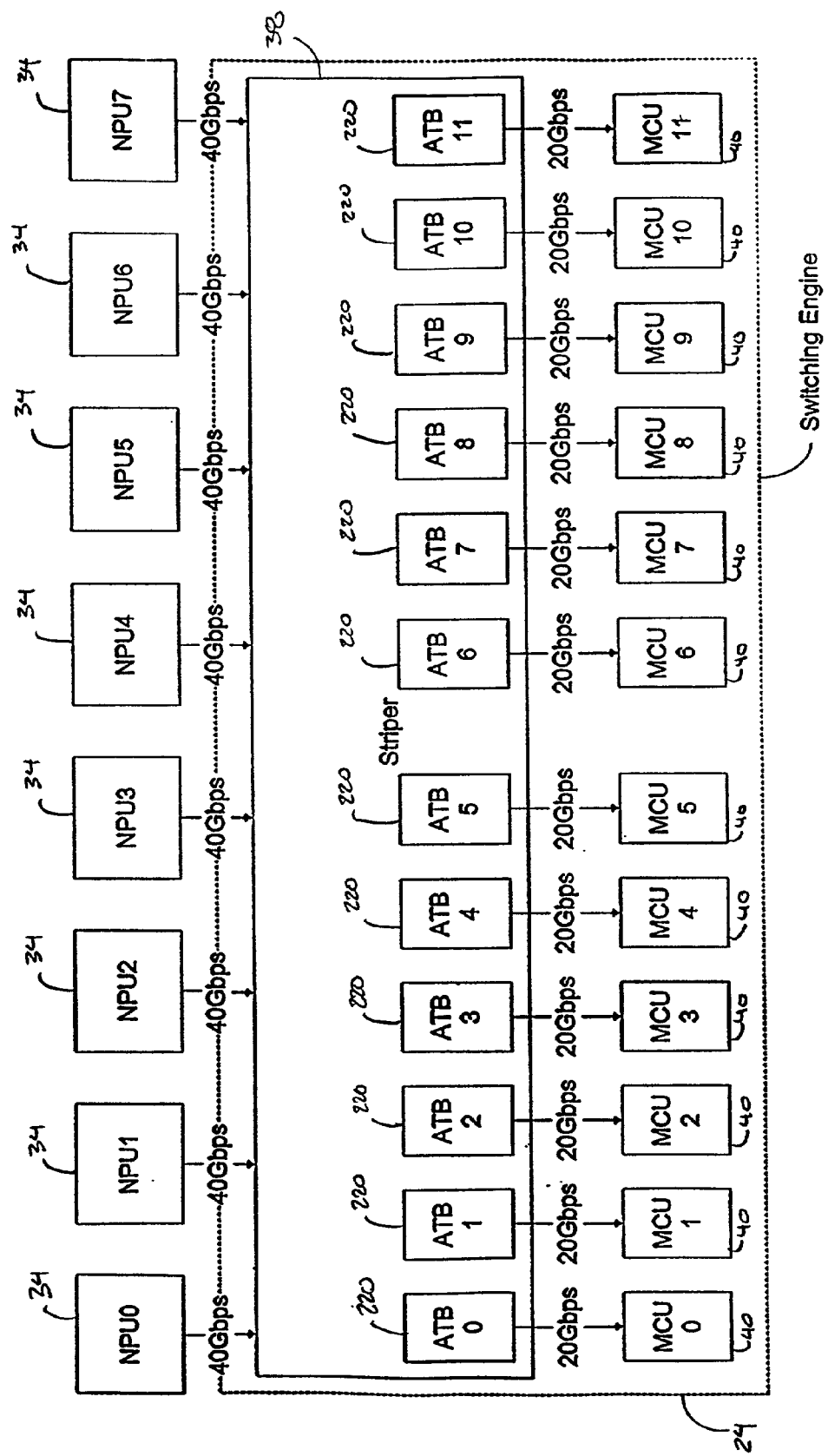
FIG. 26 illustrates a switching engine including a striper and a plurality of memory control units (MCUs), in accordance with one embodiment of the present invention.
Figure 27:
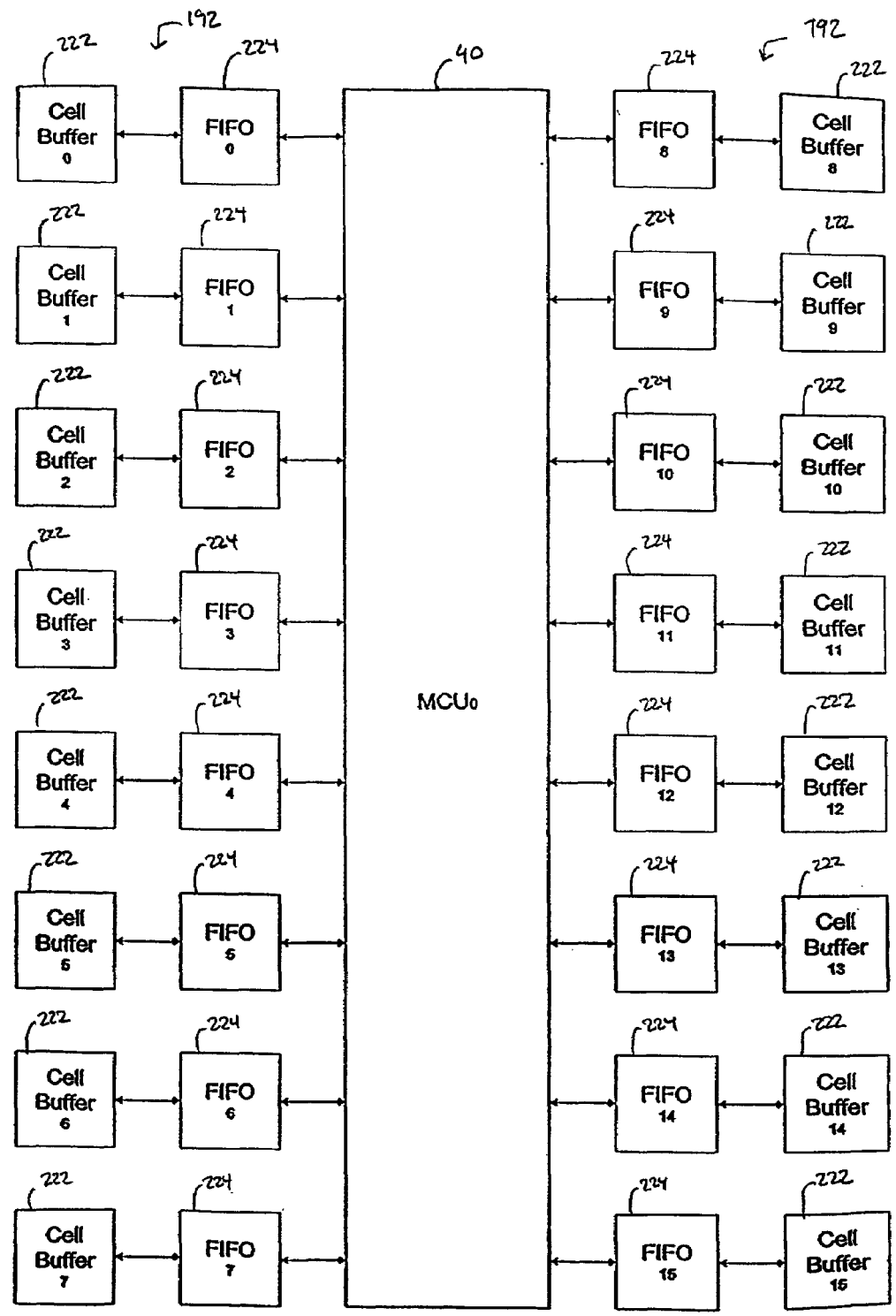
FIG. 27 illustrates a memory control unit (MCU) and associated cell buffers, in accordance with one embodiment of the present invention.

FIG. 26 illustrates one embodiment of a switching engine 24, and FIG. 27 illustrates one embodiment of an MCU 40 connected with 16 banks of high-speed memory units 192. As previously discussed, a packet is transmitted to the striper 38 from the NPU 34, after the packet has been assigned to a destination queue. In the full-scale embodiment, the striper includes six active inputs receiving packets from six NPUs. Each input supports a packet transmission rate of 40 Gbps for an aggregate bandwidth into the striper of 240 Gbps. In one example, eight total NPUs (NPU 0-NPU 7) are connected with the switching engine, however, only six of the inputs to the switching engine are active. This allows the active input ports to be changed in the event that a switching engine goes off-line.

After receiving a packet, the striper 38 cellifies the packet, which is the process of dividing the packet into discrete portions (cells) that are 34 bytes in size, including 30 bytes of data and 4 bytes of overhead in one example. Packets are cellified to distribute processing across resources. The "cell" as discussed herein is unrelated to an ATM cell. By dividing variable length packets into fixed sized 34-byte cells, the memory bandwidth that is used is reduced, and the fragmentation overhead. The first cell in a packet is called a head cell, which contains information about the packet including the total number of cells which form the packet. The remaining cells of the packet are body cells, with the last cell in the packet being a tail cell. As discussed below, "packet length" refers to the amount of the packet that is cellified, which may be less that the total length of the packet received by the striper 38 because some extraneous portions of the packet may be stripped off before cellification.

In order to determine the size of the payload of the penultimate (second to last) and the size of the payload of the tail cell, the following equation can be used:

For >2 cells:

(Packet Length÷30=(Quotient,Remainder)).

If the Remainder <15, then set the

| Penultimate Cell Size | = 15 (+ 4 overhead); and |
|---|---|
| Tail Cell Size | = Remainder + 15 (+ 4 overhead). |

If the Remainder >=15, then set the

| Penultimate Cell Size | = 30 (+ 4 overhead); and |
|---|---|
| Tail Cell Size | = Remainder (+ 4 overhead). |

In one example, penultimate and tail cells are >15 bytes for all packets >2 cells.

For 2 cells:

If the packet length ≧30 bytes, then the head cell contains 30 bytes of data (+4 bytes overhead), and the tail cell contains all remaining valid bytes (+4 bytes overhead). If the packet length <30 bytes, then the head cell contains all valid bytes of data (+4 bytes overhead), and the tail cell contains no valid data. The smallest entity in the router 20 is two cells, in one embodiment. The LCU 36 will discard any dummy cells.

Figure 28A:
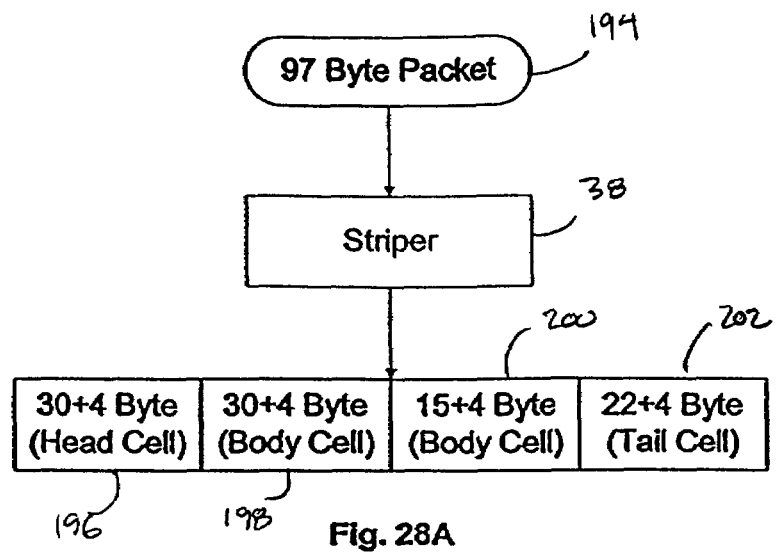
FIG. 28A illustrates one example of a cellified packet, in accordance with one embodiment of the present invention.
Figure 28B:
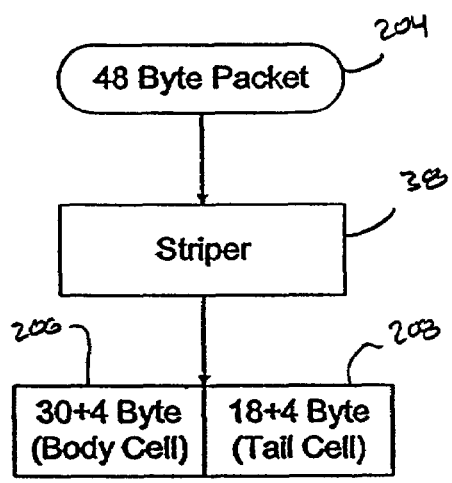
FIG. 28B illustrates another example of a cellified packet, in accordance with one embodiment of the present invention.

FIG. 28A illustrates the cell division for an example 97-byte packet 194. The head cell 196 and the first body cell 198 are each 34 bytes (30 bytes data each; 4 overhead bytes; total of 60 data bytes). The remainder of the packet length divided by 30 is seven (R=7) (37/30=1 with a remainder of 7); accordingly, the penultimate cell 200 is 15 bytes (+4 overhead bytes). The tail cell 202 is the remainder (7)+15=22, with 4 bytes of overhead. FIG. 28B illustrates a cell division for an exemplary 48-byte packet 204. The head cell 206 is 34 bytes (30 data bytes, 4 overhead bytes), and the tail cell 208 is the remaining 22 bytes (18 data bytes, 4 overhead bytes).

Figure 28C:
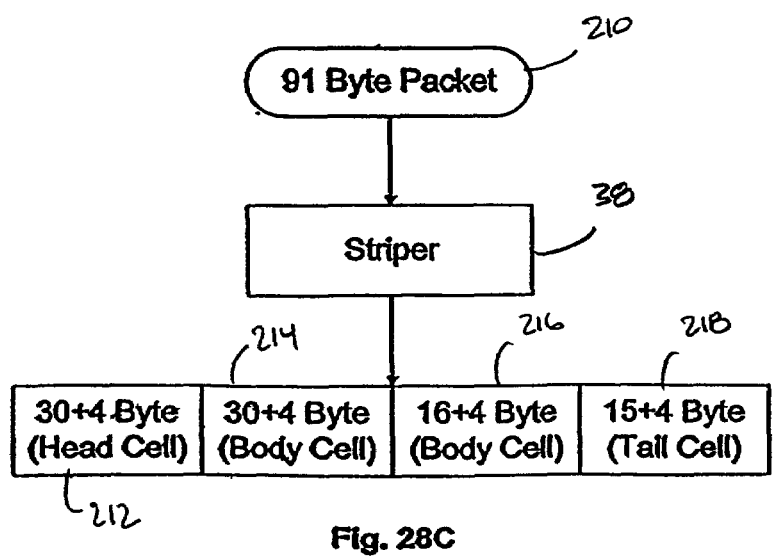
FIG. 28C illustrates another example of a cellified packet, in accordance with one embodiment of the present invention.

In an alternative embodiment, the cell size is optimized to match the bandwidth between the striper 38 and the MCUs 40. The cell size of the last two cells of the packet is divided across the total remaining number of bytes in the packet, rather than having the second to last cell be 34 bytes, and the last cell being equal to the remaining number of bytes in the packet. For example, referring to FIG. 28C, if a 91-byte packet 210 was received by the router 20, then it would be cellified into a 30+4 byte head cell 212, a 30+4 byte body cell 214, a 16+4 byte body cell 216, and a 15+4 byte tail cell 218, rather than having $cell_3$ equal 30+4 bytes, and $cell_4$ equal 1+4 bytes. This optimizes the bandwidth matching across MCUs on the switchcard because it ensures that the last cell is larger than 1 byte. In one embodiment, there is a 20 Gbps link connecting the striper 38 with each MCU 40. Without the last two cells of the packet being divided, the MCU would have to be designed to handle a worst case scenario of numerous 1 byte cells being sent to the MCU from various sources at 20 Gbps. Dividing the last two cells as in the alternative embodiment, however, allows the MCU to operate, in one example, with the worst case scenario being a contiguous stream of 15+4 byte cells. In another alternative embodiment, the tail-cell may simply be padded-up to 20 bytes, if it is less than 20 bytes, with the other cells of the packet being 34 bytes.

After cellification, the striper 38 transfers the cells of a packet to the array of MCUs 40, contiguously in one example, according to the packet's assigned destination queue. In one embodiment, the cells are transferred in strict round robin order beginning with the MCU for the next position in the destination queue, and the router supports 36,864 queues, allocated evenly between all interface subsystems 22, so that each LCU 36 services 3,072 unicast queues per LCU, 40 loop-back queues (480 in full-scale router), 1 drop queue (12 in full-scale router), and 8 RP queues. The loop-back queues are used for input rate shaped packets. The drop queues are dedicated for transferring information about dropped packets, for example due to RED or metering, from the striper to the MCU and to the LCU, which counts dropped packets. The RP queues are for packets destined for the RP. In one embodiment, there are 8 RP queues per LCU, but only one LCU is dedicated to routing RP packets. In addition, the router supports 512 multicast queues. The 512 multicast queues can map to more than one LCU (through a mask).

As mentioned earlier, each queue of the MCU 40 is mapped to a particular port 28 (i.e., an outgoing link) and each queue has a particular priority. For example, queue 1 and 2 may both be mapped to port 1, however, queue 1 has a higher priority than queue 2; therefore, queue 1 is serviced before queue 2. The MCU 40 and the LCU 36 manage the queues, with the MCU providing the memory management for the contents of the queue (i.e., strict round robin storage) and the LCU providing the queuing discipline. The queuing discipline determines which queue to service, and is a function of QoS in one example. In prior art systems, a stand-alone dedicated processor is typically used to execute the queuing discipline. In the router 20 of the present invention, there are 4056 total queues per LCU 36 and up to 32 queues per interface depending on the interface. For example, OC-12, OC-268, OC-192 interfaces can have 32 queues, in one example. The queuing discipline runs in the LCU on the fly, and individual queues are treated in a FIFO order but can be combined by the LCU into more complex structures using several queues for a single output interface or logical output interface. For example, the LCU can perform output traffic policing on a per queue basis, or on a group of queues. Therefore, several queues may be assigned to one customer, which the router can use to police the customer's overall traffic.

In one embodiment, the striper 38 maintains correct ordering of the cells in the destination queues via strict round robin input, which also provides the LCU 36 with an efficient way to extract the cells. Therefore, all the cells in any queue appear in a known order around the MCUs 40; and the striper, in response to a request from the LCU, issues commands to the MCUs in that order beginning with a command to the MCU which has the cell at the front of a particular queue. Alternatively, the LCU 36 may issue transmit commands directly to the MCUs 40 in strict round robin order beginning with a transmit command or cell request to the MCU having the cell at the beginning of the queue, which will in some instances be a head cell. In addition, the striper 38 notifies the LCU of how many cells the striper has sent to a particular queue, and the LCU thereby tracks the number of cells in a queue and the MCU associated with the first cell in the queue. Accordingly, when the LCU is ready to service a particular queue, it knows from which MCU to begin requesting cells.

As illustrated in FIG. 26, in one example, there are 240 Gbps (6 active links at 40 Gbps) of aggregate bandwidth between the NPUs 34 and the striper 38, and there is 240 Gbps of aggregate bandwidth between the striper 38 and the MCUs 40 on one switchcard (12 links at 20 Gbps). In normal operating circumstances, the output-striping round robin input of cells to the MCUs causes a match-up of bandwidth as packets stream into the striper, and cells stream out of the striper in round robin order to the MCUs. Occasionally, however, all of the tail cells in different queues may line up, i.e., the head cells may need to be sent to the same MCU. When this happens, the next cell transfer for all of the queues seeks to be sent to the same MCU, effectively causing 240 Gbps of aggregate bandwidth of cells to be directed toward a single MCU, which normally only receives cells at 20 Gbps. This creates a potential overflow condition.

To significantly reduce the probability that this may occur, one embodiment of the present invention includes twelve "all tails" buffers (ATB) 220, one per MCU 40, located within the striper 38 and the MCUs as shown in FIG. 26. The ATBs provide a means for buffering cells being transmitted to the MCU, in order to address the potential overflow condition. Additionally, the ATB provides for uniform distribution of cells in the memory system, which assist with proper output striping. In one example, each ATB includes 768 34-byte memory locations, which allows 768 cells to be stored per ATB. Accordingly, in all but the extremely unlikely circumstance where more than 768 tails line up in the ATB, no packets will have to be dropped because of the potential overflow condition.

In an alternative embodiment, each ATB 220 includes 36,864 34-byte memory locations. To completely eliminate any potential for dropped packets due to the potential overflow condition, each ATB 220 could be the same size as the total number of queues to account for every tail lining up (36,864 34-byte memory locations). However, with current memory technology, a large ATB of up to 36,864 memory locations uses a large amount of physical space, which is less advantageous for a practical implementation. In one example, the ATBs are FIFO, the striper 38 stores cells in the ATBs in round robin order, and cells stored in the ATBs drain out to their respective MCU 40 with minimal delay. Accordingly, the ATBs represent only a slight and insignificant time delay between when the cells are written to the ATBs and when the cells subsequently arrive at the MCUs.

FIG. 27 illustrates an MCU 40, with a plurality of cell buffers 222 and FIFOs 224 connected thereto, in accordance with one embodiment of the present invention. After the cells drain from the ATBs 220 into the MCUs (FIG. 26), the cells are then stored, (i.e., in output-striping strict round robin order), according to their assigned queue in the high speed memory units 222 ("cell buffers") associated with each MCU 40, as shown in FIG. 27. Output striping facilitates locating the entire packet, by knowing the MCU that contains the head cell, the number of cells in the packet, and the queue number that the packet is in. Thus, all of the cells of a packet can be sent to the LCU 36 by sending requests to the MCUs in round robin order beginning with the head cell. In one embodiment, a single cell is stored in a single bank of a cell buffer of the MCU, and the cell buffers are implemented in dynamic random access memory ("DRAM"). As each MCU 40 receives a cell, it places the cell into the cell buffer 222 corresponding to the assigned queue for the packet. A single cell buffer may correspond to one or more queues of the MCU. In one embodiment, a FIFO buffer 224, similar to an ATB 220, is located between the MCU and each cell buffer for substantially the same reasons that the ATBs are provided.

The switching memory provided by the cell buffers 222 connected with the MCUs 40 minimizes transient losses as traffic inadvertently congests on output interfaces of the router 20. In one example, the cell buffers are placed as close as possible to the LCU 36 so that the NPU 34 operations sustain line rate operations without congesting. The systolic array implementation of the PXU 56, LXU 58, and QXU 60 provides the functionality to sustain line rate of the NPU because each engine can sustain line rate without having to first cellify and store the packet. In addition, the cell buffers of the MCUs provide a traffic management function by allowing queues with a higher priority to be serviced before queues with a lower priority.

The MCU 40 is also responsible for providing information to each striper 38 regarding the amount of data presently in each queue, so that the striper can execute RED and tail drop to prevent the queues from overflowing. As described above, after storage in the cell buffers 222, the cells of the packet are transmitted from the MCUs 40 to the LCU 36 in round robin order when the queue is ready to be serviced by the LCU.

As illustrated in FIG. 3B, the output of each MCU 40 is connected with each LCU 36. Accordingly, if a queue has cells in MCU0 to MCU 11 (12 cells), then each MCU may transmit the cells to the LCU. In one example, the LCU sends a request to the MCUs via the striper 38 in round robin order, beginning with the MCU having the head cell. The MCUs then transmit the cells to the LCU.

In some circumstances a majority of the packets arriving at the router 20 have a destination related to one particular LCU 36. For example, assume the majority of the packets for some continuous period of time will be assigned to queue1 (Q1). In this event, to keep up with the number of cells being written to Q1 continuously, a very high speed connection is required between the striper 38 and LCU 36 so that the striper can notify the appropriate LCU of each cell it is sending to the LCU, which would require many pins on both chips and not be efficiently used. A lower speed connection between the striper and LCU is preferable.

Figure 30:
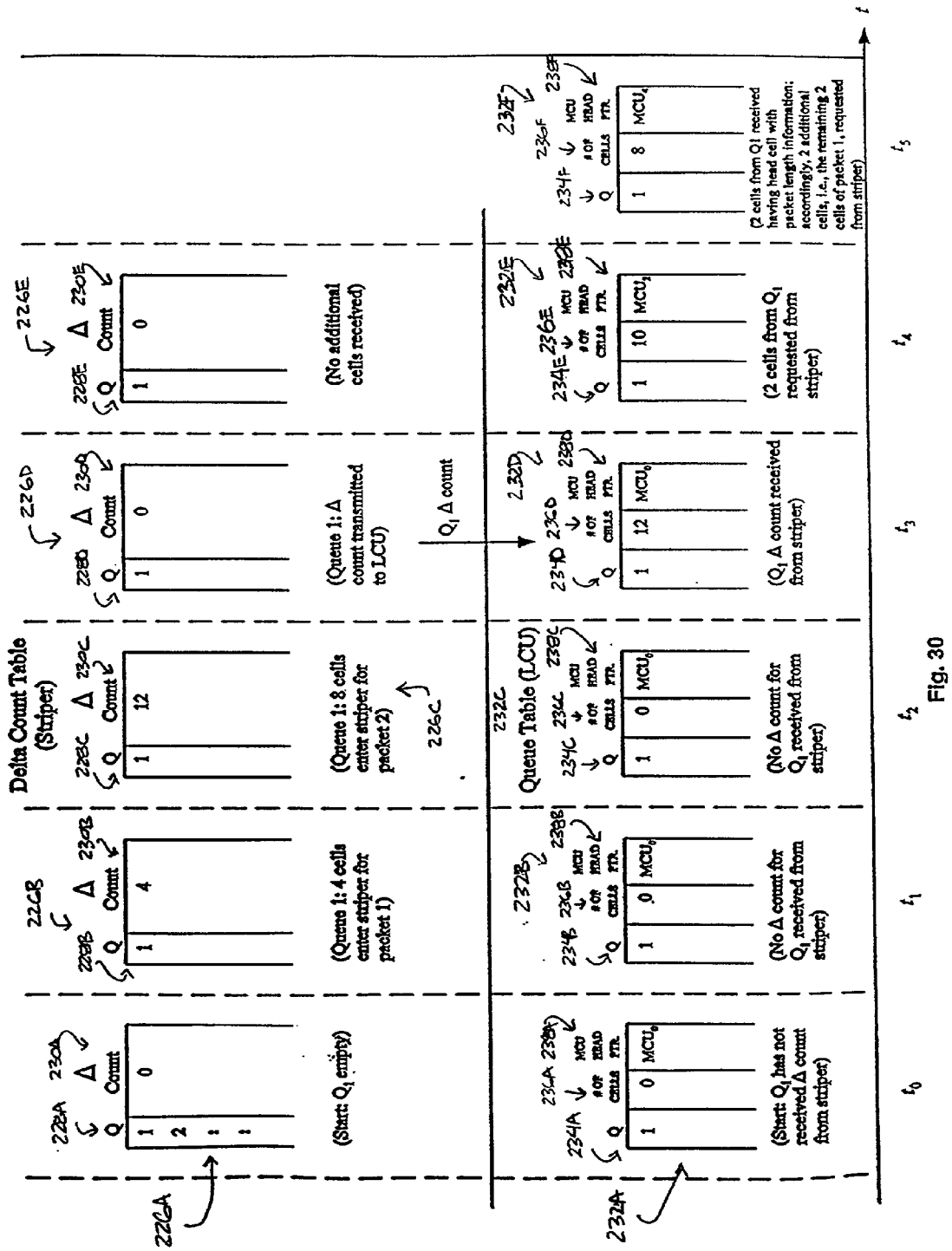
FIG. 30 illustrates an example of a delta count table and a queue table, in accordance with one embodiment of the present invention.

To use a lower speed connection, as generally shown in the example of FIG. 30, the striper 38 includes a delta count table 226, which includes a queue number column 228 and a delta count column 230; and the LCU 36 includes a queue table 232 in communication with the striper 38, the queue table including a queue column 234, a number of cells column 236, and a MCU head pointer column 238. In one example, the delta count table is implemented with two dual-port SRAMs, which reduced the area requirements of the striper 38 while maintaining rate. Alternatively, the delta count table 226 is implemented with one quad-port SRAM. In the queue table 232, the queue column 234 includes a designation for each destination queue; the number of cells 236 in each column tracks the delta counts received from the striper (as explained below) and also tracks the cell requests from the LCU 36 to the striper; and the MCU head pointer column 238 tracks the location of the head of the queue. In the delta count table 226, the queue number column 228 includes a designation for each destination queue; and the delta count column 230 tracks, on a per queue basis, the change in the number of cells destined for a particular queue between each time the delta count table contents are transmitted to the LCUs to update the LCU queue tables. During each cycle, one of the LCU queue tables 230 is updated from the delta count table.

Figure 29:
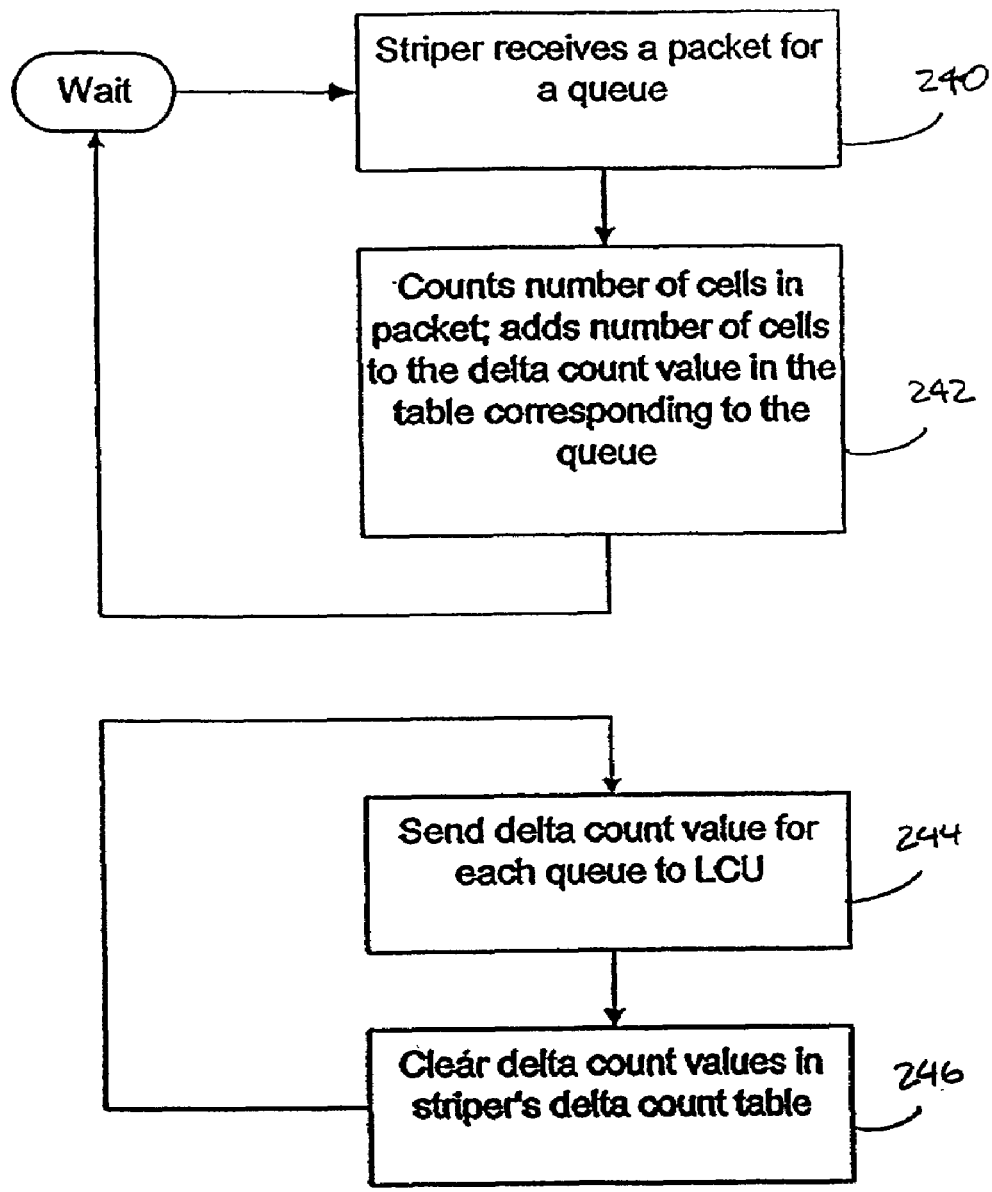
FIG. 29 illustrates a flowchart of an example of the operations for tracking the number of cells in each queue using delta counts, in accordance with one embodiment of the present invention.

FIG. 29 illustrates a method of updating the delta count table 226 in the striper 38, and periodically communicating the delta count information to the queue table 232 in the LCU 36. In operation 240, the striper receives a packet from the NPU 34. The packet includes a context defining the destination queue for the packet. In operation 242, the striper determines the number of cells the packet is to be divided into, and adds the number of cells for the packet to the delta count value in the delta count table corresponding to the destination queue for the packet. The striper periodically transmits the delta count information for each queue to the LCU. Generally, this transmission will occur in round robin order, for example beginning with the first queue and proceeding sequentially to the last queue, and then starting again with the first queue. In one embodiment, multiple deltas are put together or coalesced into a message. In operation 244, the current delta count is transmitted to the LCU, and the queue table is updated, and at operation 246 the delta count for the queue is cleared.

FIG. 30 illustrates an example of a delta count table 226 (striper 38) and an example of a queue table 230 (LCU 36) from time $t_0$ time $t_5$ for queue 1 (Q1). At time $t_0$ this example begins with Q1 empty (230A) and the queue table 232A in the LCU having not received a delta count for Q1 from the striper. The MCU head pointer 238A begins with $MCU_0$, which is the MCU where the first cell from the first packet destined for Q1 will be written. At time $t_1$ (226B) the striper receives from the NPU a 4-cell packet destined for Q1 (228B), and the delta count (230B) for Q1 is accordingly updated to indicate that four cells are or will be written to Q1. At time $t_1$ the delta counts for Q1 have not yet been transmitted to the queue table 230B. At time $t_2$ (226C) the striper receives an 8-cell packet destined for Q1, and the delta count 230C for Q1 is accordingly updated to 12 to indicate that 8 additional cells are or will be written to Q1 (228C). At time $t_2$ the delta counts for Q1 have not yet been transmitted to the queue table 230C. At time $t_3$ the delta counts for Q1 are transmitted from the striper to the queue table 230D of the LCU. Accordingly, the delta count 230D for Q1 is reset to 0, and the queue table entry 236D for Q1 (234D) now reads 12 for the number of cells. The MCU pointer 238D, however, remains at $MCU_0$ because no cells from Q1 have been requested by the LCU.

At time $t_4$ the LCU 36 issues a request to the striper 38 for two cells from Q1, and the LCU also indicates the MCU 40 holding the first cell. In this example, the MCU head pointer begins at $MCU_0$ (238D); accordingly, the LCU will request two cells beginning with $MCU_0$. The striper receives this request and issues a command to $MCU_0$ to transmit the first cell in Q1 to the LCU, and issues a second command to MCU, to transmit the second cell in Q1 to the LCU.

In one example, the striper 38 issues commands to the MCUs 40 in strict round robin order beginning with the MCU requested from the LCU 36, and the striper issues as many commands as the number of cells requested. The LCU requests an entire packet, by first requesting the first two cells in a queue, which will include a head cell having information about the length of the packet, which the LCU uses to generate a second request to the striper for the remaining cells in the packet.

Accordingly, in the example of FIG. 30, after the LCU 36 issues the request for the first two cells in Q1 at time $t_4$, the LCU receives the head cell for the 4-cell packet "packet 1", which was the first packet written into Q1 at time $t_0$. The head cell will indicate that the packet was divided into four cells; accordingly, at time $t_5$ the LCU will request two additional cells from Q1 beginning with $MCU_2$, which is the MCU associated with the third cell of 4-cell packet. At time $t_5$, the queue table 232F will reflect the remaining number of cells in Q1 236F (the 8-cell packet "packet 2" written to Q1 at time $t_2$), and the head of the Q1 ($MCU_4$) 238F. It can be seen that through the use of the delta count table 226 and the queue table 232, the LCU can extract the appropriate cells from the switching memory, so that these cells can ultimately be transmitted out of the router 20 on the appropriate port.

Alternatively, if a high speed connection provides communication between the striper 38 and the LCU 36, the delta count 226 information may be communicated to the LCU as packets arrive at the striper 38. Or, the queue table 232 may be maintained by the striper, with the LCU simply reading the information therefrom.

Figure 31:
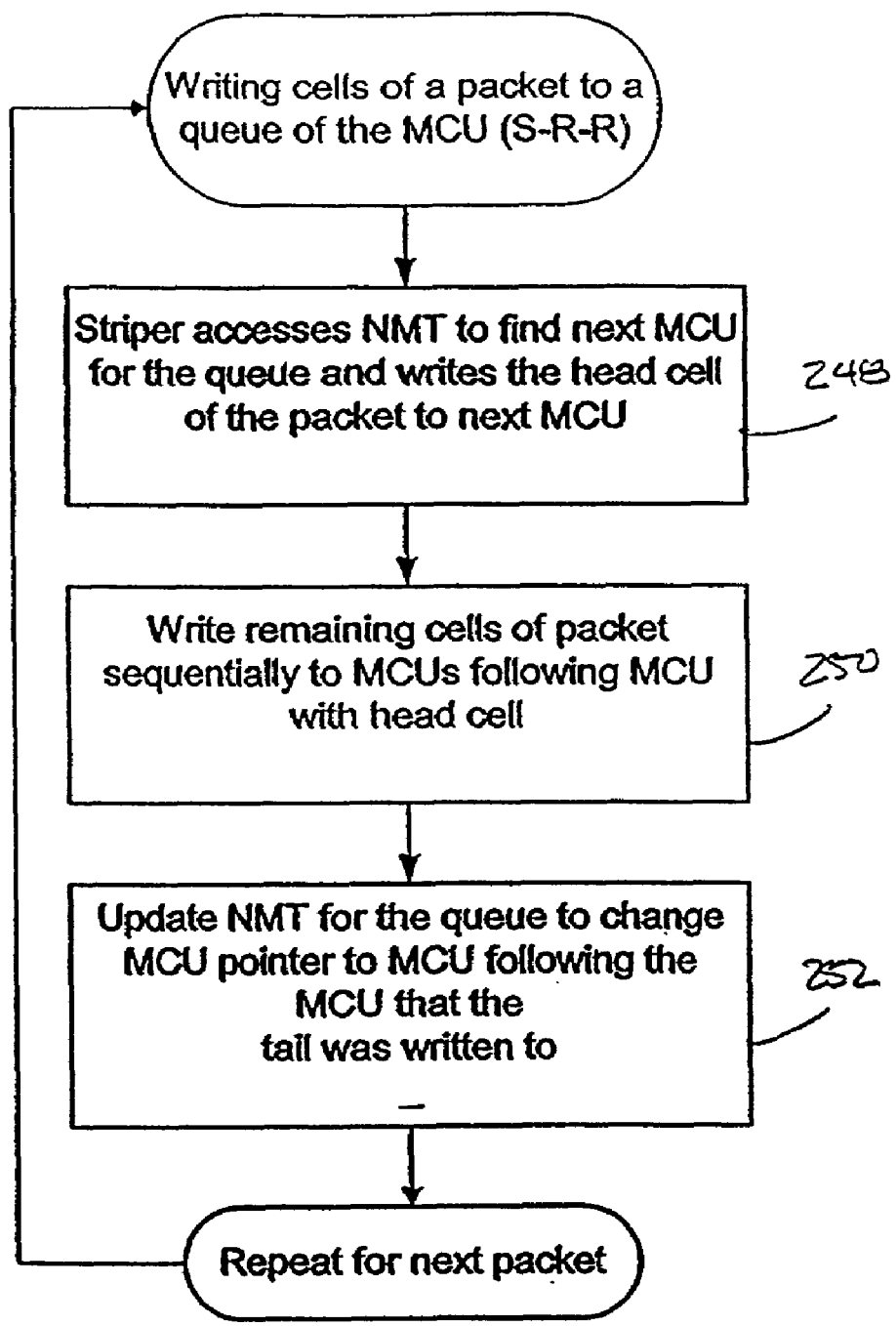
FIG. 31 illustrates a flowchart of an example of the operations for writing cells to the MCU, in accordance with one embodiment of the present invention.
Figure 32:
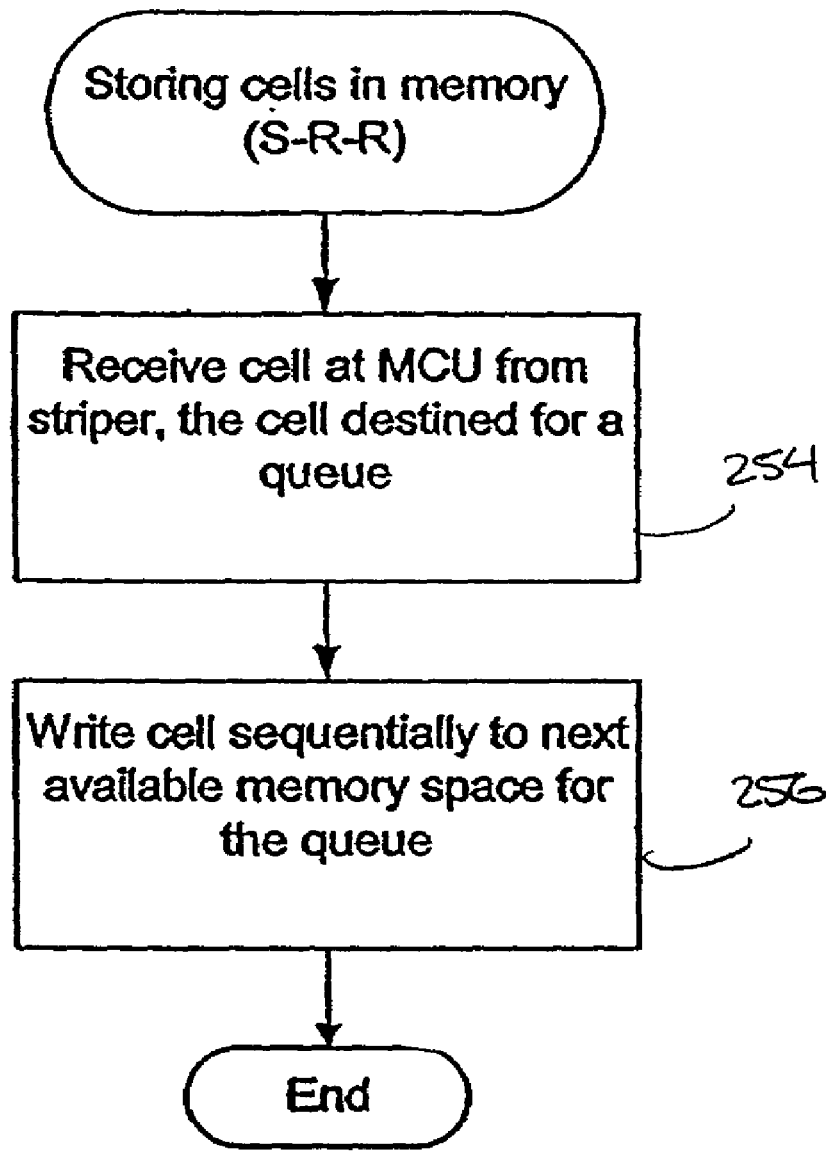
FIG. 32 illustrates a flowchart of an example of the operations for in storing cells in memory, in accordance with one embodiment of the present invention.

The various operations performed by the switching engine 24 were introduced earlier with regard to FIG. 4 (describing generally the primary operations performed by the switching engine including cellification and output-striping), FIG. 5C (describing in more detail the operations performed by the striper), and to FIG. 5D (describing in more detail the operations performed by the MCU). FIG. 31 illustrates one example of the operations performed by the striper 38 for writing cells to the destination queues of the MCUs 40 and FIG. 32 illustrates one example of the operations performed by the MCUs 40 to write the cells to the memories thereof, in accordance with one embodiment of the present invention. The operations performed by the striper 38 and the MCU 40 are described with reference to a logical example, shown in a series of related tables illustrated in FIGS. 33A-33C, of four packets being processed by the switching engine. Generally, the portion of the logical example illustrated in FIG. 33A is for the striper tracking the writing of cells to the MCU, the portion of the logical example illustrated in FIG. 33B is for writing cells to the MCUs in strict round robin order (corresponds with FIG. 31 flowchart); and the portion of the logical example illustrated in FIG. 33C is for strict round robin storage of cells in the memory coupled to each MCU (corresponds with FIG. 32 flowchart).

In the example of FIGS. 33A-33C, four packets are received sequentially in the striper 38 from the NPU 34. Packet 1 (P1) is destined for queue 2 (Q2), and is divided into seven cells; Packet 2 (P2) is destined for queue 6 (Q6), and is divided into 4 cells; Packet 3 (P3) is destined for queue 1 (Q1), and is divided into 6 cells; and Packet 4 (P4) is destined for queue 2 (Q2), and is divided into 8 cells. In the various tables illustrated in FIGS. 33A-33C, a cell is designated with a "C" followed by a first subscript, such as "1" (which indicates the packet corresponding to the cell) and a second subscript, such as "H" (which indicates the head cell) or "T" (which indicates the tail cell). For example, "$C_{1H}$" designates the head cell for packet 1.

After the striper 38 receives and cellifies the packet, the cells for the packet are stored in the destination queue for the packet, which includes writing the cells to the correct MCUs 40, and physically storing the cells in the destination queue. Referring to FIG. 31, in operation 248, the striper 38 writes the head cell of the packet to the next MCU 40 for the destination queue, which is determined from a next MCU table (NMT). FIG. 33A illustrates a set of NMTs for queue 1 to queue 6 at different times ($NMT_0$-$NMT_4$) corresponding to the receipt of P1-P4 by the striper. Each NMT has a column "Q" for each queue supported by the router, queues 0-36,864 although only queues 1-6 (Q1-Q6) are shown for purposes of this example. For each queue, the NMT also includes a column "MCU" designating a pointer to the MCU that the next cell written to the queue should be sent to (MCU pointer). When a set of cells are written to the MCUs for a particular destination queue, the cells are written across the MCUs sequentially, beginning with the MCU following the tail cell of the preceding packet that was written to the particular destination queue.

$NMT_0$ illustrates the MCU pointers at time $t_0$ for Q1, Q2, and Q6 before packets P1-P4 are received by the striper (Q1, MCU pointer $MCU_3$; Q2, MCU pointer=$MCU_4$; and Q6, MCU pointer $MCU_4$). The values shown in $NMT_0$ are arbitrarily initial values for this example.

To determine which MCU 40 to write the head cell of the packet to, the striper 38 accesses "MCU" column of the NMT for the destination queue for the packet. Each time all of the cells of a packet are written across the MCUs, the striper updates the NMT.

In operation 250 of FIG. 31, the striper 38 writes the remaining cells of the packet sequentially to the MCUs 40 following the MCU with the head cell. In operation 252, the striper updates the next MCU table. The receipt of packets 1-4 (P1-P4), and the writing of these packets to the MCUs is discussed hereafter with reference to FIGS. 33A-33C to illustrate the operations of the striper and MCU, as described thus far.

First, P1 is received by the striper 38 from the NPU 34, and it is destined for Q2. The MCU pointer for Q2 is initially at $MCU_4$ (see $NMT_0$). Accordingly, as shown in FIG. 33B at row tp1, the head cell for P1 is written to $MCU_4$ ($C_{1H}$), and the following body cells 1-5 are written to $MCU_5$-$MCU_9$ ($C_{11}$-$C_{14}$), with the tail cell being written to $MCU_{10}$ ($C_{1T}$). As shown in $NMT_1$ at time $t_{p1}$ after the cells for P1 have been written to the MCUs sequentially, the Q2 MCU pointer in $NMT_1$ is updated to $MCU_{11}$, which is the MCU following $MCU_{10}$ where the tail cell for P1 was written.

Second, at time tp2, packet P2 is received by the striper 38, and it is destined for Q6. The MCU pointer for Q6 is initially at $MCU_4$ (see $NMT_1$). Accordingly, as shown in FIG. 33B at row tp2, the head cell for P2 is written to $MCU_4$ ($C_{2H}$), and the following body cells 1-2 have been written to $MCU_5$-$MCU_6$ ($C_{21}$-$C_{22}$), and the tail cell is written to $MCU_7$ ($C_{2T}$). As shown in $NMT_2$, after the cells for P2 are written to the MCUs sequentially, the Q6 MCU pointer is updated to $MCU_8$, which is the MCU following $MCU_7$ where the tail cell for P2 was written.

Third, at time tp3, packet P3 is received by the striper 38, and it is destined for Q1. The MCU pointer for Q1 is at $MCU_3$ (see $NMT_2$). Accordingly, as shown in FIG. 33B at row tp3, the head cell for P3 is written to $MCU_3$ ($C_{3H}$), and the following body cells 1-4 are written to $MCU_4$-$MCU_7$ ($C_{31}$-$C_{34}$), and the tail cell is written to $MCU_8$ ($C_{3T}$). As shown in $NMT_3$, after the cells for P3 are written to the MCUs sequentially, the Q1 MCU pointer is updated to $MCU_9$, which is the MCU following MCU8 where the tail cell for P3 was written.

Finally, at time tp4, packet P4 is received by the striper 38, and it is destined for Q2, as was packet P1. The MCU pointer for Q2 is at $MCU_{11}$ (see $NMT_3$). Accordingly, as shown in FIG. 33B at row tp4, the head cell for P3 is written to $MCU_{11}$ ($C_{4H}$), and the following body cells 1-6 are written to $MCU_0$-$MCU_5$ ($C_{41}$-$C_{46}$), and the tail cell is written to $MCU_6$ ($C_{4T}$). As shown in $NMT_4$, after the cells for P4 have been written to the MCUs sequentially, the Q2 MCU pointer is updated to $MCU_7$, which is the MCU following $MCU_6$ where the tail cell for P4 was written. In one embodiment, as described earlier, the striper does not write directly to the MCU, but rather writes first to at least one FIFO buffer, such as the all tails buffer, and the packets drain in FIFO order therefrom into the corresponding MCUs.

Referring to FIG. 32, the operations of physically storing the cells in the destination queues are illustrated. In operation 254, as described in the example immediately above, the MCUs receive cells from the striper 38, and the cells are destined for a particular destination queue, which was assigned to the packet in the NPU 34. In operation 256, the cells are written into memory sequentially across MCUs 40, into the next available memory space for the destination queue.

FIG. 33C illustrates one embodiment of a logical memory structure for various queues within $MCU_4$-$MCU_6$, using the example of storage of cells for packets P1-P4 therein. As discussed above, the head cell for P1 was written to $MCU_4$ ($C_{1H}$), and it is destined for Q2. As shown in FIG. 33C, $MCU_4$ then writes the head cell to the first available memory for Q1 ($C_{1H}$), and each subsequent MCU ($MCU_5$-$MCU_{10}$) writes the cells to the first available memory space for Q2. Referring now to P4, which is also destined for Q2. The head cell for P4 was written to $MCU_{11}$ ($C_{4H}$), and the following cells were written to $MCU_1$-$MCU_5$, with the tail cell being written to $MCU_6$. As shown in FIG. 33C, $MCU_4$ then writes ($C_{45}$) into the next available memory space for Q2, which is directly behind the head cell ($C_{1H}$) of P1.

In the router 20 implementation shown in FIG. 3B, the connections between the MCUs 40 and the LCUs 36 can be viewed as a static mesh, wherein those connections and wiring therebetween are statically fixed. In contrast, the connections from the NPU 34 to the striper 38 to the MCUs 40 is a dynamic mesh, because the striper performs the function of distributing the packets from the NPU to the proper MCU on a dynamic basis. The use of the dynamic mesh between the NPU and the MCUs (through the striper) is beneficial because it permits a reduced number of pins to be used between the NPU and MCUs, which therefore reduces the number of backplane connections required by the router.

V. Output-Side of the Interface Subsystems

In one embodiment, the LCU 36 is a part of the interface subsystem 22, and is physically located on a line-card along with the NPU 34. Referring to FIG. 5E, the LCU performs the operations of requesting cells from the switching engine 24, receiving the cells, reassembling the packet from the cells, performing encapsulation and fragmentation, and sending the packet to the MAs 32 associated with the outgoing link to which the packet will be transmitted. The LCU determines the next destination queue to service, which in one example is a function of the media adapters that are available/ready to send packets, and the queuing discipline that is executing in the LCU 36. The LCU sends a request to the striper 38 to transmit cells from the destination queue. The requested cells are transmitted from the MCUs 40 to the LCU, and the packet is reassembled and encapsulated properly for the outgoing link. If the packet exceeds the MTU of the output interface or physical interface, such as in the case of an IPv4 packet, then the packet is fragmented into multiple smaller packets. Once the packet has been properly encapsulated, the packet is transmitted from the LCU to the media adapter having the port 28 from which the packet will be transmitted to the outgoing link, and the packet is then transmitted from the router. In one embodiment, all of the packets belonging to a single flow of packets remain in order relative to one another within the NPU, within the memory, with the LCU, and throughout the router.

The LCU 36 provides for packet transfer between the switching engines 24 and the MAs 32 in the router 20. On its input-side the LCU is connected with the switching engine, and on its output-side the LCU is connected with the media adapters 32. As discussed in detail above, in one embodiment, after a packet is received by the router, its route or outgoing link is determined by the NPU 34 and a destination queue is assigned to the packet, then the packet is cellified and output-striped across the MCUs 40 in the switching engine 24 and stored in the destination queue. The striper 38 notifies the LCU 36 of the packets in the destination queue, and the LCU requests and obtains the cells from the destination queue, reassembles the packet, and transmits the packet to the media adapter 32 associated with the output for the packet. Additionally, the LCU provides multicast replication support, queue rate-shaping support, and may generate accounting statistics on outgoing packets—such as the number of packet drops, the number of packets being transmitted, and the packet length.

Figure 34:
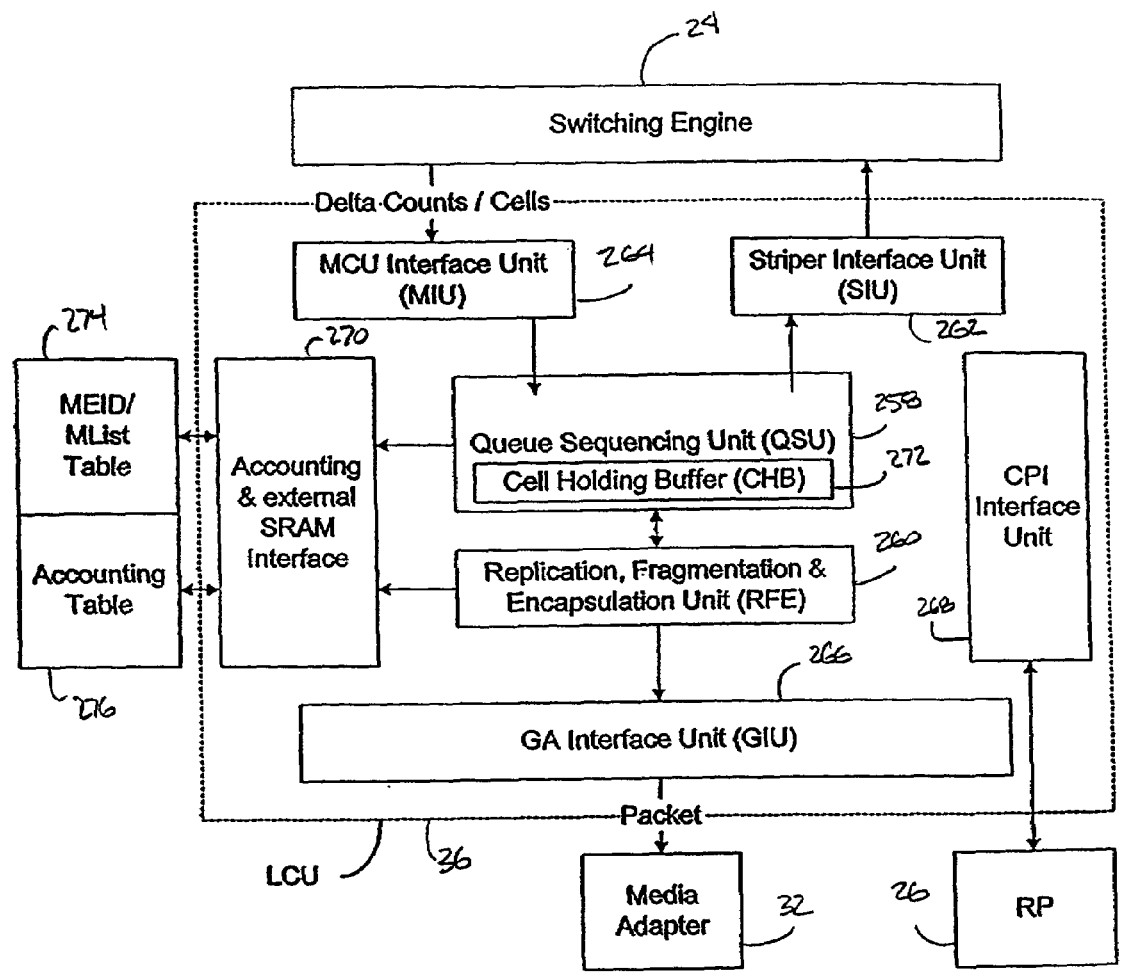
FIG. 34 illustrates a block diagram of a line card unit (LCU), in accordance with one embodiment of the present invention.

FIG. 34 is a block diagram of one embodiment of the LCU 36, which includes two primary processing units—the QSU 258 and the RFE 260—and five interface units—the SIU 262, the MIU 264, the GIU 266, and interface units (268, 270) to the CPI 230 and external SRAM 220. A queue sequencing unit (QSU) 258 determines which queue of the MCU to service and to select for receiving packets. In one example, the QSU uses the delta count information (also referred to as queue depth information) from the striper 38 to determine which queues have packets. The delta count information is accumulated in the LCU queue table 232 (also referred to as a queue depth table). The queue depth table includes, on a per queue basis, the delta counts 234, 236 received from the striper 38 (i.e., the number of cells accumulated in the queue) and a MCU pointer 238 to the head of the queue. In one embodiment, the QSU also implements queuing disciplines and queue rate-shaping that are also used to determine which queue should be selected for transmitting packets to the LCU. Once the LCU 36 receives cells of a packet, the cells are collected in a cell holding buffer (CHB) 272 of the QSU 258 of FIG. 34, then the cells are forwarded to the replication, fragmentation & encapsulation unit (RFE) 260 to be reassembled into the packet, and the packet encapsulation information for the packet is generated and prepended to the packet so that it can be transmitted to the proper physical interface or Phy 44.

The RFE 260 assigns a layer 2 encapsulation header to the packet based on the encapsulation ID (EID) of the packet, and prepends the encapsulation header to the packet before forwarding it to the proper outgoing MA 32. In the case of a multicast packet, the RFE replicates the packet for different output ports 28 and schedules the multicast replicated packets for transmission within the existing unicast packet traffic. If a packet exceeds the MTU of the outgoing port, the packet is fragmented unless fragmentation is programmatically disabled.

As shown in FIG. 34, a striper interface unit (SIU) 262 is connected between the switching engine 24 and the QSU 258 in one embodiment. The SIU issues a request to one of the switching engines 24 that cells from a particular destination queue be transmitted to the LCU 36, under the control of the QSU which generates the destination queue request. The QSU tracks the queue depth information for the queues in both switching engines. Recall, the queues are redundantly implemented in the two switching engines of the full-scale embodiment of the present invention. When a queue is selected by the queuing discipline, the switching engine for the queue is also selected, alternating between active switching engines.

As shown in FIG. 34, a MCU interface unit (MIU) 264 is also connected between the switching engines 24 and the QSU 258 for receiving queue information, such as the delta counts, from the striper 38, and for transmitting cells from the MCU 40 to the QSU. For outgoing packets, a GA interface unit (GIU) 266 is coupled to the output-side of the RFE 260 and sends assembled packets to the appropriate MA 32. In one embodiment, four GIUs 266 may be supported in the LCU 36, and each is capable of supporting, for example, a 10 Gbps bandwidth to the media adapter it is connected with. Additionally, each LCU may include an accounting & external SRAM interface 270 for connection to two external SRAMs, a 16 MBit (512×36) external SDR SRAM, which may be expanded to 32 MBit, for storing EID information (Table 274) and accounting statistics (Table 276). MEID and MList tables 274 are stored in one external SRAM, and the accounting statistics are stored in the other external SRAM 276. The stored accounting statistics include UEID access, MEID access, RED drop statistics, metering drops, multicast head drops, multicast replication drops, and fragmentation drops, which are useful for billing, analysis, and the like.

Each LCU 36 communicates with the route processor 26 via a CPI Interface unit 268 (CPII) at 2 Gbps full duplex, in one example. A low speed link is available between the LCU 36 and the RP 26 as well. Packets that are destined for the RP are decellified, and sent to the RP through the CPII. In one example, the CPII 268 is also used for communication of interrupt information and accounting statistics, various LCU table configurations and microcode engine updates in the LCU. For example, the unicast EID (UEID) table 274, multicast EID (MEID) table 274, and multicast list (MList) table 274 in the LCU are configured by the RP 26 via the CPII 268. Additionally, the encapsulation engines are programmable, with the RP updating the encapsulation engine program code in the LCU via the CPII.

Figure 35:
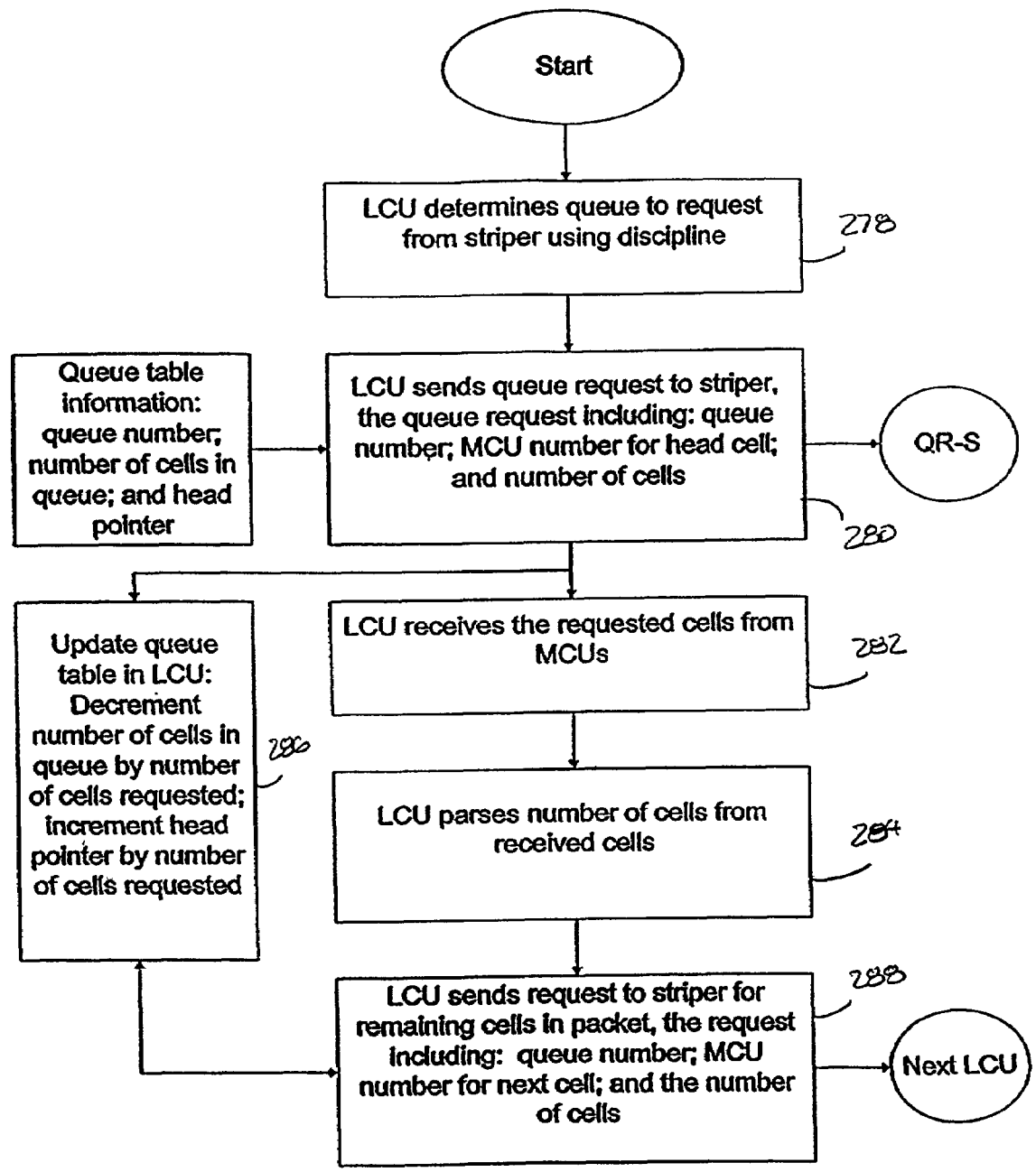
FIG. 35 illustrates a flowchart of an example of the operations for the LCU requesting a queue from the striper, in accordance with one embodiment of the present invention.

FIG. 35 illustrates the operations of the LCU 36 requesting a packet from the striper 38, in accordance with one embodiment of the present invention. In operation 278, the LCU determines which destination queue to request from the striper. The queuing discipline running in the LCU determines which queue to select. Exemplary queuing disciplines include: round robin, which selects queues sequentially from the first queue to the last queue and then begins anew with the first queue; priority, which assigns priorities to different queues and selects the queues based on the assigned priority; deficit round robin (DRR), and deficit weighted round robin (DWRR).

The DRR queuing discipline uses the notion of quanta. In DRR, each queue is assigned a quanta, and when the queue is selected the quanta is decremented by some amount. When the quanta for a particular queue reaches zero, then the DRR discipline selects the next queue, and the quanta for the prior queue which reached zero is recharged. The DWRR queuing discipline uses weighted quanta, which are assigned to each queue. In contrast, in DRR, each queue has the same quanta value. Additionally, the LCU 36 supports priority round-robin for a group of queues assigned to a physical interface. Each physical interface 44 may have a maximum of 32 queues assigned to it, in one example. These 32 queues may be partitioned into groups of priority. Within each priority group, a round-robin queuing discipline is implemented. The size of the priority groups may vary.

In operation 280, the LCU 36 sends the destination queue request to the striper 38. The queue request includes the destination queue, the MCU 40 associated with the head of the queue, and the number of cells to request. Alternatively, in one example, the MCU associated with the head cell of the queue is stored in a table in the striper 38. The queue request is determined from the queue table stored in the QSU 258. As discussed earlier, the delta count table 226 in the striper tracks the number of cells being written to each queue maintained by the striper and the switching engine(s) 24. The delta count information from the striper is transmitted to the MIU 264. The delta counts are then used to update the information in the queue table or queue depth table 232, which is maintained by the QSU 258. The LCU maintains the queue table that includes, for each queue, the number of cells in the queue 236, and the MCU associated with the head pointer 238.

In operation 282, the LCU 36 receives the requested cells from the MCUs 40. Typically, the LCU will only request two cells from the beginning of the queue, wherein one or both cells will be a head cell containing packet length information. From the first two cells that are received, in operation 284, the LCU then parses the length of the packet from the received cells (i.e., the total number of cells the packet was divided into) to generate a request for the remainder of the cells to receive a whole packet from the destination queue. After the LCU 36 sends the request to the striper 38 in operation 286, the LCU updates the queue table 232. In one example, updating the queue table includes decrementing the number of cells in the queue by the number of cells requested from the striper 38, and incrementing the head pointer by adding the number of cells requested from the striper to the current head pointer location. For example, if the head of Q1 is currently at $MCU_0$, and two cells are requested, then the head pointer is updated to $MCU_2$. In operation 288, the LCU sends a second request to the striper for the entire packet relating to the first two cells that were received. As with the request described in operation 280, the second request includes the queue number, and the MCU for the head cell of the queue. However, unlike the first request, the second request typically requests the number of cells in the packet less the two cells that were requested in operation 280, whereby an entire packet is requested from the striper.

Figure 36:
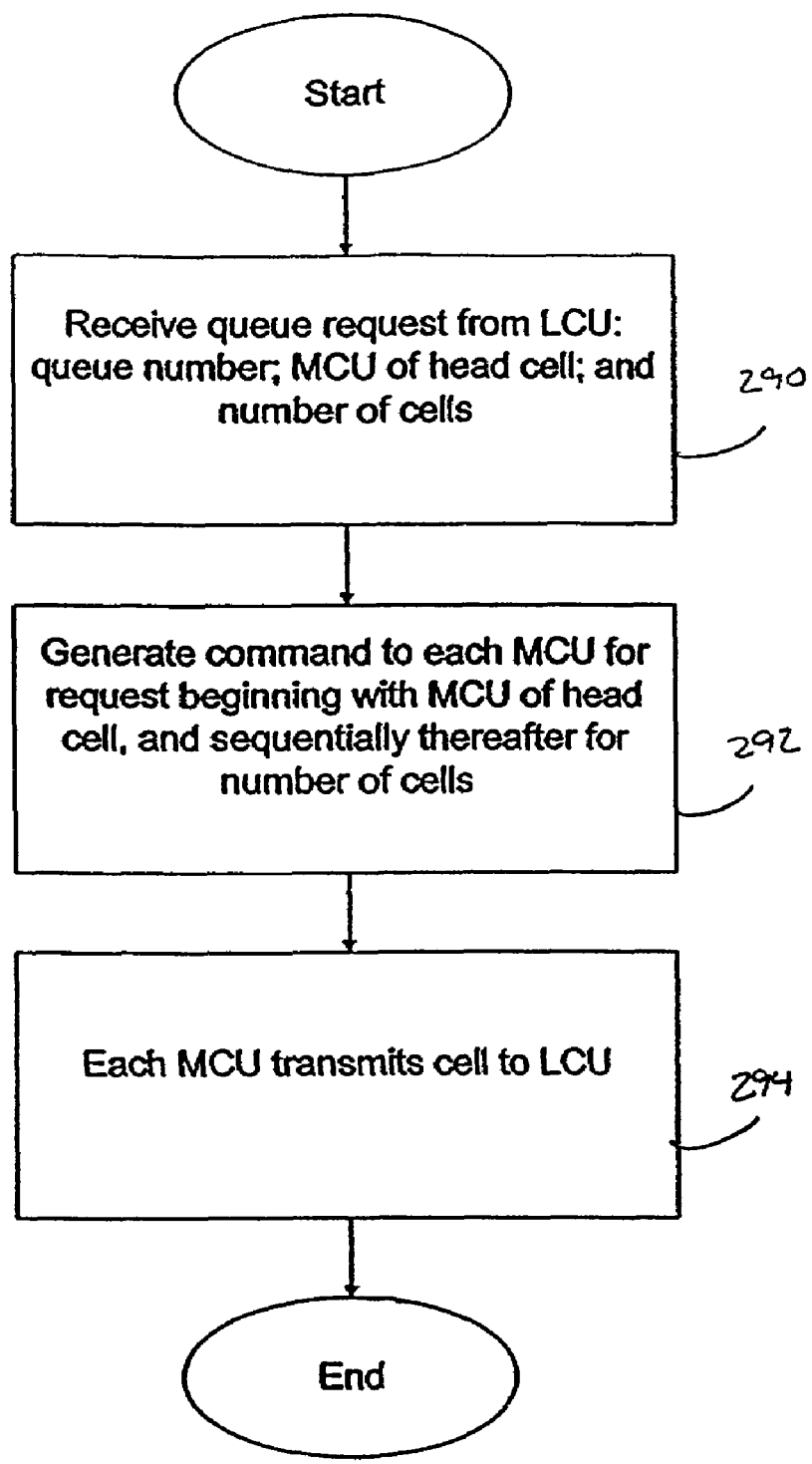
FIG. 36 illustrates a flowchart of an example of the operations for processing of a queue request by the striper, in accordance with one embodiment of the present invention.

FIG. 36 illustrates the operations performed in the switching engine 24 to service a request from the LCU 36 for a destination queue. In operation 290, the striper 38 receives a request from the LCU 36. As discussed above, the request includes the queue number, the MCU location of the head cell, and the number of cells requested. In operation 292, the striper 38 generates commands to the MCUs 40 to transmit the appropriate cells for the request from the LCU. The striper sequentially generates a command to each MCU associated with a cell for the request, beginning with the MCU for the head cells. After receiving the command, in operation 294, each MCU transmits the appropriate cell to the LCU.

Figure 37:
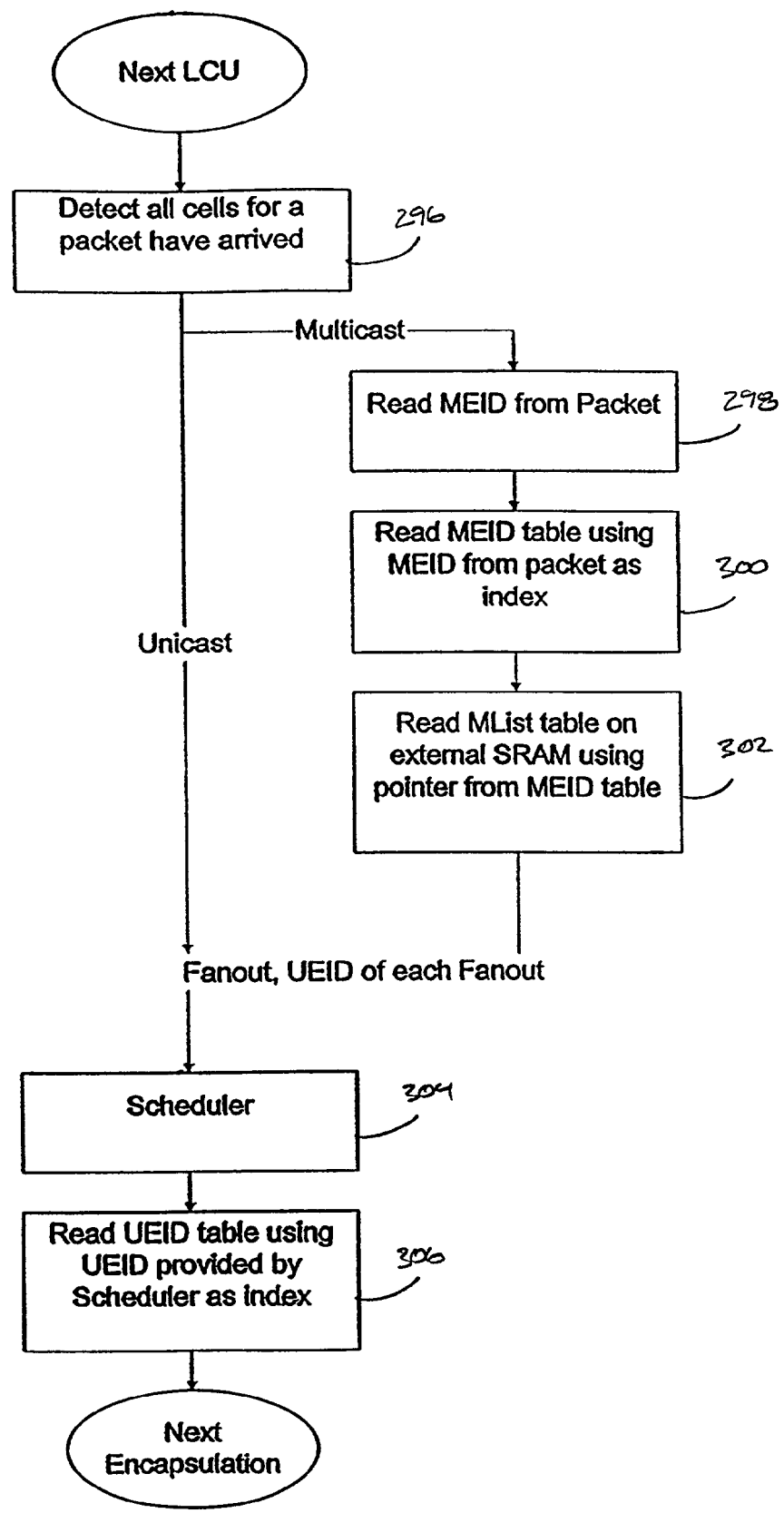
FIG. 37 illustrates a flowchart of an example of the operations for reading a unicast encapsulation identification (UEID) table, in accordance with one embodiment of the present invention.

Referring now to FIG. 37, the operations performed by the LCU 36 after the cells are received from the switching engine are illustrated. In operation 296, the LCU detects the arrival of all of the cells corresponding to a packet. For a multicast packet, in operation 298, the LCU parses the header/context to extract the multicast encapsulation identification (MEID) for the packet, which was determined by the NPU 34. The MEID provides an index into the MEID table, as shown in operation 300, to obtain a pointer into a MList table. The MList table contains the number of replications required for the multicast packet (fanout), along with the unicast encapsulation identification (UEID) for each fanout. In operation 302, the MList table is read using the pointer from the MEID table; the MLIST table is in one embodiment implemented in the external SRAM connected with the LCU.

In operation 304, a scheduler determines the next packet to service, and generates a UEID for unicast packets. The UEID provides an index into a UEID table, which is a table of the various encapsulations for the different physical interfaces (e.g., Ethernet) supported by the router 20. Generally, for a unicast packet one UEID is generated, and for a multicast packet a UEID is generated for each fanout. For a unicast packet, the scheduler parses the header/context to extract the UEID for the packet, which was determined by the NPU.

In operation 306, the LCU 36 reads the layer 2 encapsulation information for the packet from the UEID table. In the case of a multicast packet, the LCU reads the layer 2 encapsulation information for each physical interface that the multicast packet will be transmitted to. For example, the multicast packet may be routed to four outputs or physical interfaces, so the MEID would point to the MList entry having four UEIDs, which would read the four layer 2 encapsulations for the packet in this example.

Figure 38:
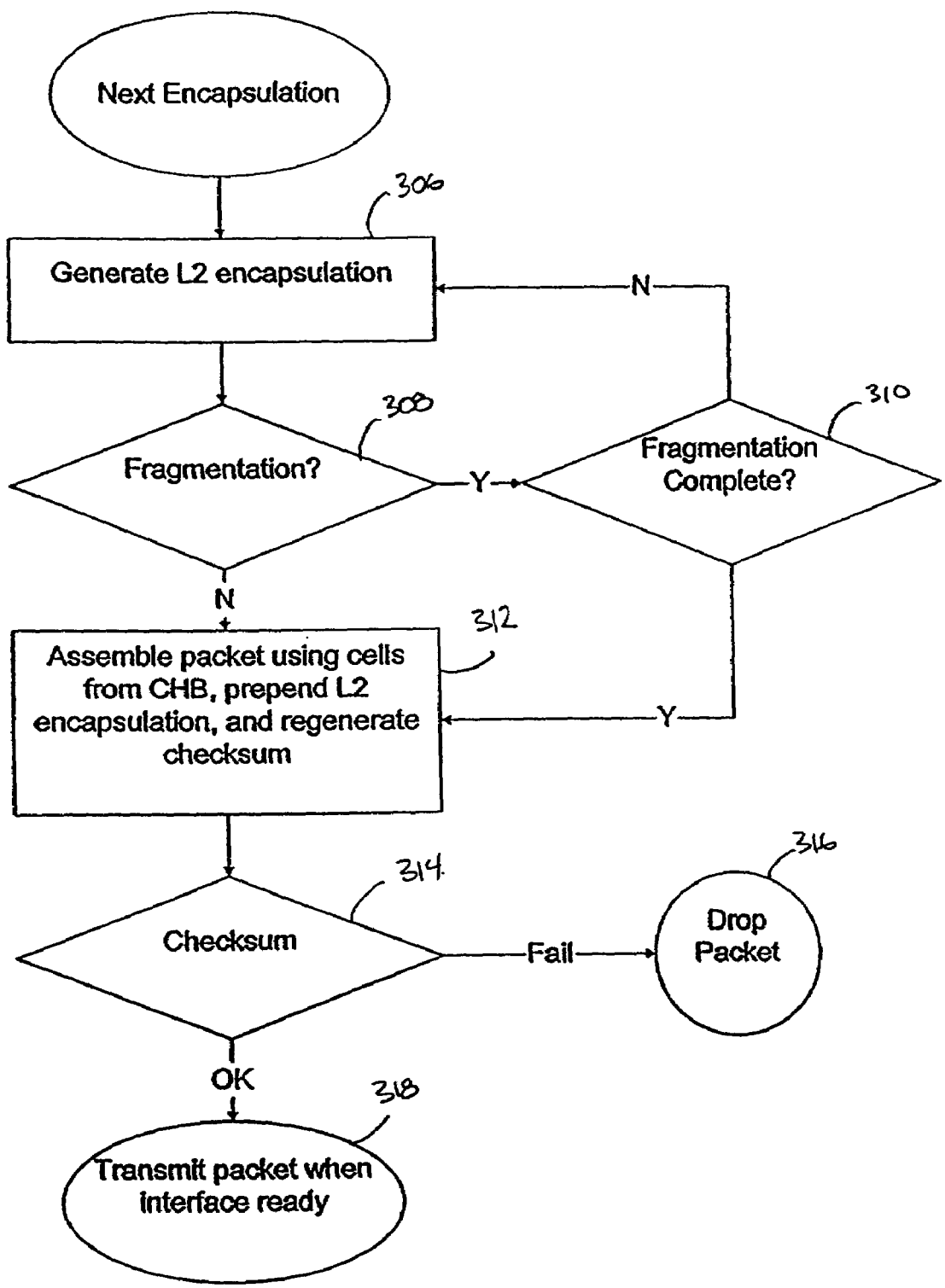
FIG. 38 illustrates a flowchart of an example of the operations for encapsulating, fragmenting, and reassembling a packet, in accordance with one embodiment of the present invention.

Referring now to FIG. 38, in operation 306, the LCU 36 generates the layer 2 encapsulation for the packet, which is generally the media specific access control and link layer control information. Recall that in one example on the input-side of the router, the layer 2 encapsulation information is removed from the packet before transmission to the NPU 34. The incoming packet includes the original layer 2 header for the incoming link and media formats, whereas the LCU needs to prepend the layer 2 information for the outgoing link and media format.

After generating the encapsulation for the packet, it is determined whether the packet is a multicast packet. If so, then replication is performed. In operation 308, it is determined whether fragmentation is required for the packet. Fragmentation is the process of dividing a large packet into smaller size packets. Each physical interface has a specified maximum transmission unit (MTU), ranging from about 512 bytes to about 9180 bytes depending on the physical interface. The MTU size information for each physical interface is accessed during the encapsulation operations, and is a part of the encapsulation information for the packet. A packet that exceeds the MTU size for the output interface generally requires fragmentation before encapsulation begins, which can include breaking up the packet into pieces that are less than or equal to the MTU size. After fragmentation, in operation 310, it is determined if the fragmentation is complete, and if not then operation 306 is returned to.

If fragmentation is complete, or fragmentation was not required in operation 308, then in operation 312, the packet is reassembled from the cells and encapsulated with the layer 2 encapsulation information for the packet in one example. Before transmission of the packet, in operation 314, the packet is checked to verify that all of the data is complete and accurate. If the packet is complete and accurate, then in operation 318, the packet is transmitted to the media adapter 32 associated with the interface that the packet will be transmitted on; otherwise the packet is dropped (operation 316), in one example.

The LCU 36 also manages input rate-shaping and output rate-shaping, which generally refer to the management of packet flow into and out of the router. Rate-shaping can be used to smooth out bursts in the traffic flow to a particular output port 28, or to regulate the quality of service delivered thereto. In prior art routers, in order to perform rate-shaping on incoming packets before routing, a large amount of memory is placed on the input-side of the router, and packets are stored there for varying periods of time to manage the output of packets from the router. In one embodiment of the router according to the present invention, however, the main memory buffering on the router is located in the switching engine 24, and rate-shaping is performed at the LCU. In one example, input rate-shaping is provided by looping the packets through the router again, referred to as "loop-back," wherein the packet is sent from the LCU/GA to the GA/NPU.

For input rate-shaping, on the first pass, packets that require input rate-shaping will pass through the NPU 34 without lookup/routing processing and will be directed to the switching engine 24. The packet then goes through the regular cellification process, but is stored in a rate shape queue, as directed by the NPU 34, as opposed to, for example, a unicast queue. After some delayed period of time, the LCU 36 retrieves the packet from the rate shape queue and then loops the packet through the router 20. Unlike other packets, loop-back packets will bypass the encapsulation and fragmentation operations, and loop back to the media adaptor 32 and to the NPU. To ensure enough bandwidth for rate-shaped packets on the second pass, half of the media adaptor ports are disabled when rate-shaping is enabled in the router, in one embodiment.

During the second pass of the packet through the router 20, normal lookup/routing operations are performed at the NPU 34 and normal switching and encapsulation/fragmentation operations are performed at the LCU 36, and the packet is shipped out to the proper media adapter 32. The NPU identifies packets for input rate-shaping/loop-back under program control, in one example.

Output rate-shaping is also controlled at the LCU 36, in one example, and each queue of the MCU(s) 40 is assigned a rate-shaping value (i.e., a value proportional to a transmission rate for the queue). Each time the LCU requests a packet from a particular queue, the LCU examines whether the data rate for the particular queue exceeds the rate-shaping value, and if so, the LCU will service other queues in order to reduce the effective data rate of the particular queue.

Figure 39:
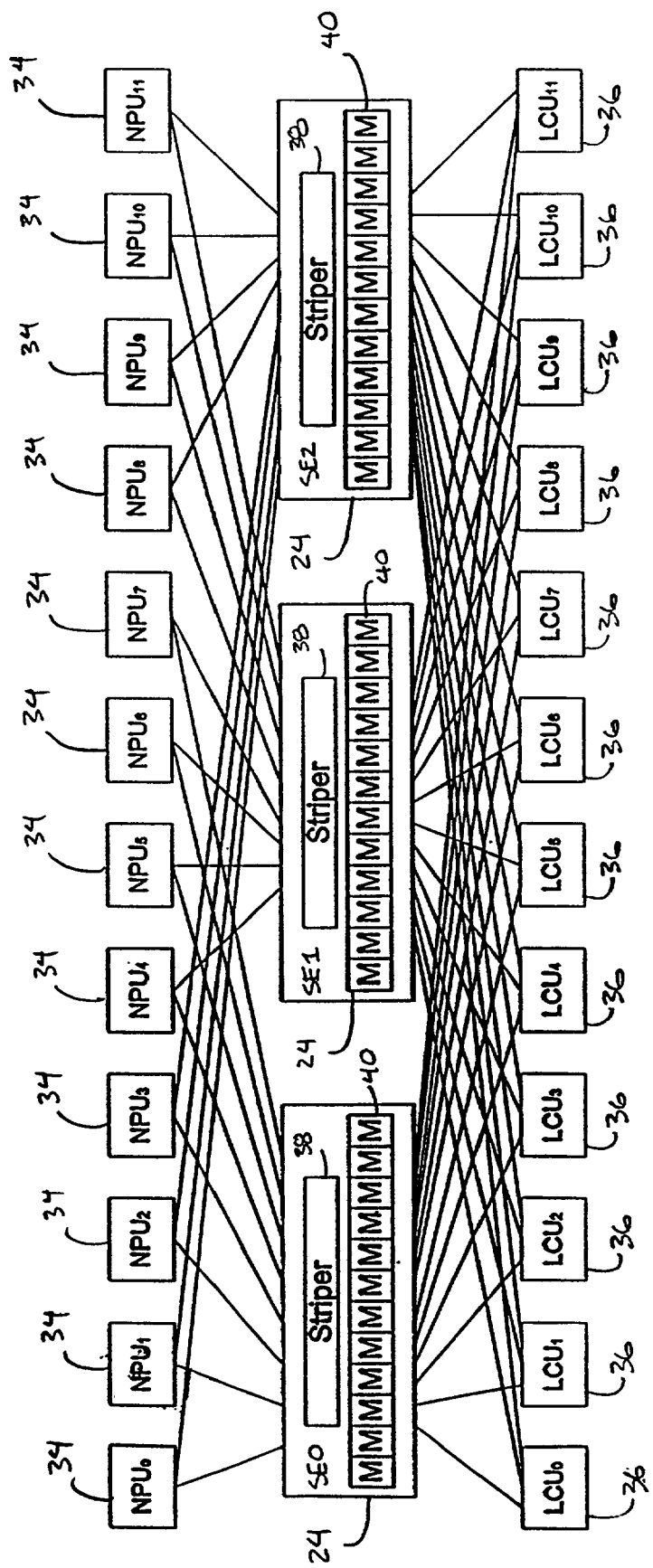
FIG. 39 illustrates an example of a topology of a router, in accordance with one embodiment of the present invention.

Referring now to FIG. 39, to support 2+1 redundancy in the full-scale router, each LCU 36 ($LCU_0$-$LCU_{11}$) is connected with three switching engines 24. However, as discussed herein, only two switching engines are active at any one time in the full-scale router implementation, with one switching engine being inactive and providing back-up should an active switching engine go offline for any reason. One particular advantage of the full-scale router is that one of the switching engines in a full-scale router may be removed while the router is operating (each switching engine is on a different switch card in one example) which is referred to as "hot-swapping." When a switching engine is hot-swapped, the connections from the LCU 36 to striper 38 and from the MCU 40 to LCU 36 are deactivated and are switched-over to an active switching engine. To ensure that hot-swapping occurs smoothly and with a minimum of packet drops, the LCU connections are switched-over after the RP 26 is notified of the hot-swap, in response to a signal generated within in the system. The LCU initiates a switching engine hot-swap sequence, which may include: disabling new cell requests by the LCU to the striper of the intended hot-swapped switching engine; clearing the delta count table for that switching engine; draining all queues from that switching engine until no complete packet can be formed from the remaining cells, and any cells remaining in that switching engine are dropped; and, at the LCU, initiating receipt of packets from the newly activated switching engine.

VI. Redundancy and Scalability

A. Redundancy of Full-Scale router

FIG. 39 illustrates the connectivity of the full-scale router in accordance with one embodiment of the present invention. In one embodiment, the NPUs 34 ($NPU_0$-$NPU_{11}$) are connected with the switching engines 24 in a rotationally symmetric topology, and the switching engines 24 are connected with the LCUs 36 ($LCU_0$-$LCU_{11}$) in a full-mesh topology. This connectivity between the NPUs and the switching engine, and between the switching engines and the LCUs, allows the router to operate even in the event of a switching engine failure or shut-down, and provides for bandwidth optimization for cell transmission between the switching engines and the LCUs.

As shown in FIG. 39, each NPU 34 is connected with two switching engines 24, wherein each connection is at 40 Gbps in one example. The connectivity between the NPUs and the switching engines is referred to herein as "rotationally symmetric" or as having "rotational symmetry." As mentioned earlier, each switching engine may have has six active 40 Gbps connections with the NPUs, for an aggregate bandwidth of 240 Gbps per switching engine. Additionally, each switching engine may have two inactive connections with the NPUs. FIG. 39 shows three switching engines: switching engine 0 (SEØ), switching engine 1 (SE1), and switching engine 2 (SE2). In normal operation, there are two active switching engines (480 Gbps aggregate bandwidth into the stripers) and one switching engine on stand-by. The switching engine on stand-by being activated in the event that one of the active switching engines goes off-line. The rotationally symmetric topology illustrated in FIG. 39, provides for failure of any switching engine, the rotation of active inputs to the remaining active switching engine and the activated stand-by switching engine. Accordingly, the maintenance of an aggregate bandwidth of 480 Gbps into the switching engines is maintained despite any failure or shut down of one switching engine.

For example, assume that SEØ is active, and that the active inputs into SEØ are from $NPU_0$ to $NPU_5$. In addition, assume that SE1 is also active, with active inputs from $NPU_6$ to $NPU_{11}$, and SE2 is on stand-by. In the event that SEØ is shut-down, SE2 is activated, and $NPU_0$ to $NPU_5$ will have to send packets to a different switching engine. The active connectivity is rotated to account for this problem, which provides a straightforward way to reconfigure the NPU connectivity with the active switching engines. After the shutdown, the active connectivity is "rotated" to begin with $NPU_4$. Accordingly, $NPU_4$ to $NPU_9$ are connected with SE1, and $NPU_{10}$ to $NPU_3$ are connected with SE2. In this example, $NPU_4$ to $NPU_7$ are connected with SE1, and $NPU_0$ to $NPU_3$ are connected with SE2. As illustrated in the preceding example, the active connectivity is rotated, and the NPUs associated with the shut down switching engine (SE2) are switched to an active switching engine. Accordingly, $NPU_8$ to $NPU_{11}$ may be connected with either SE1 or activated SE2. In one embodiment, however, because each switching engine supports six 40 Gbps connections, the four of $NPU_8$ to $NPU_{11}$ should be connected with different active switching engines 1 or 2.

In a second example where SE1 is shut down and switching engines 0 and 2 are active, the connectivity is rotated to begin with $NPU_8$. Accordingly, $NPU_8$ to $NPU_1$ are connected with SE2, and $NPU_2$ to $NPU_7$ are connected with SEØ. Accordingly, through the rotationally symmetric topology, all NPUs 34 can remain connected with an active switching engine regardless of which switching engine is active, and the connectivity can be maintained with less than a full mesh of physical connections therebetween, which is advantageous because it reduces the number of connections required between the NPUs 34 and the striper 38 without sacrificing performance.

Alternatively, there can be four switching engines with four active inputs each and a total of at least six inputs. In the event of a failure of any one switching engine, the active inputs can be switched to the adjacent switching engine.

In a second alternative, the NPUs can be connected with the switching engines in a full mesh input topology where each NPU is connected with each switching engine.

Referring to FIG. 39, the output connectivity of the switching engines with the LCUs as shown in a full-mesh topology in one example. In the full-mesh topology, each switching engine 24 has a connection with each LCU 36 ($LCU_0$-$LCU_{11}$), so that any switching engine can transmit packets to any of the LCUs. In this configuration, only one third of the connections between the switching engines are inactive, i.e., from the inactive switching engine.

B. Scalability—Cut-Down Routers

Scalability allows the router 20 to be tailored to a customer's needs, and allows the router to be upgraded as the customers needs change. Not every customer will require the full-scale router, which is capable of routing and switching packets at an aggregate bandwidth of about 480 Gbps, which under some standards translates to an incoming and outgoing packet processing rate of about 1 Terabit per second. Rather, some customer's immediate needs will be for a scaled-down or cut-down router. Accordingly, the router of the present invention is scalable. Moreover, it is desirable to provide the scalability while utilizing the same components as used in the full-scale router. As customers' needs increase, it is desirable to provide a router that may be upgraded. Accordingly, it is desirable to provide modularity to the router, to not only make the scalability simple, but to allow scalability of routers in the field.

Cut-down embodiments of the router have a reduced number of NPUs 34, MCUs 40 and/or a reduced number of LCUs 36. To accommodate for these changes, according to one embodiment, for unicast traffic the router 20 need only be modified by programming changes to the striper 38 and MCUs 40, and changes to the wiring between the MCUs and the LCUs. In particular, the number of MCUs per switching engine 24 in a full-scale router, (i.e., 12), is mapped to the reduced number of MCUs actually present in the cut-down router. Additionally, the queues in a full-scale router are mapped to a reconfigured set of queues in the cut-down system. Conceptually, the majority of the components in the cut-down router function as though there were a full complement of MCUs, when in fact there is some number less than a full complement. The MCU outputs for the remapped queues are wired to support the actual number of LCUs in the cut-down router.

Cut-down routers are implemented using the same components as the full-scale embodiment of the router wherever possible. In embodiments of the cut-down router described below, the MA 32, NPU 34, LCU 36, and MCU 40 (with associated memory) may be used without any physical change. For multicast traffic, a small change to the MCU is implemented, in one example. However, the operation of the striper 38 is modified in the cut-down routers to account for the change in the number of LCU's and/or MCU's. Additionally, the wiring between the MCU and LCU is modified, and can be accommodated with a different switchcard and/or backplane for each cut-down configuration. In this manner, the fact that the router is a cut-down system is transparent to the components and software of the router, other than the stripers.

Figure 40:
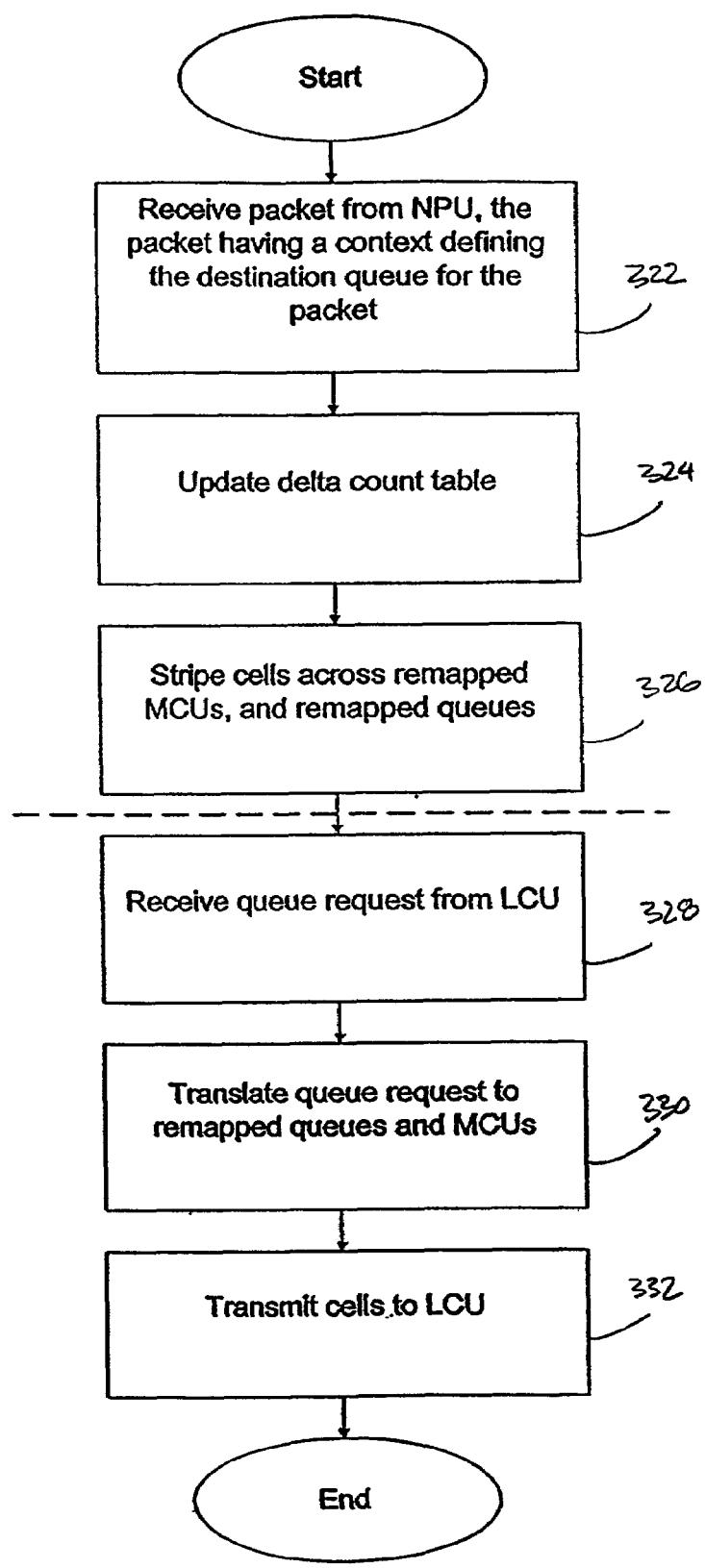
FIG. 40 illustrates a flowchart of an example of the operations for routing and switching a packet in a cut-down router, in accordance with one embodiment of the present invention.

Referring to FIG. 40, a method of switching a packet in a cut-down router is shown. In operation 322, a packet is received by the striper 38 from the NPU 34. The packet includes a packet context defining the destination queue for the packet. In operation 324, the delta count table 226 for the switching engine 24 receiving the packet is updated. The update of the delta count table is the same as illustrated herein with reference to the full-scale embodiment of the router. In operation 326, the packet is cellified, and the cells are output striped across the MCUs 40 in the destination queue. The MCUs are remapped as described herein from the MCU configuration of a full-scale router, to the MCU configuration of the cut-down router. Additionally, the destination queues are re-mapped as described herein from the destination queue configuration of a full-scale router, to the destination queue configuration of the cut-down router. The remapping of the MCUs and the remapping of the destination queues is performed in the striper 38, in one example.

In operation 328, the LCU 36 issues a request to the striper 38 for a cell or cells in a destination queue using substantially the same processes as described herein with regard to the full-scale router, and the striper receives the request. In operation 330, the striper translates the received request to the remapped MCUs, and the remapped destination queues. In operation 332, the MCUs transmit the cells to the LCU based on the direction of the striper.

Because the alterations to accommodate a cut-down system are limited to the striper 38 (and some instances to the MCU 40) and to the connectivity between the MCU and LCU, the full-scale router 2+1 redundancy described above can also be used in the cut-down routers. Additionally, 1+1 redundancy, up to and including a cut-down router of half of the full-scale router capacity, is also possible.

On the input-side of the router 20, the GA 46 and NPU 34 are organized on a granularity of 40 Gbps and in a very self-contained way. The embodiments of the routers described herein use the GA and NPU without having to modify them. On the output-side of the router, the LCU also handles 40 Gbps and can accept this rate continuously from any of the three switching engines 24 in the full-scale router. In the cut-down router, however, the LCU 36 expects data to arrive from all of the 12 MCUs 40 on each switching engine and hence on all of its 12 input bundles from each switching engine. Furthermore, the LCU expects to find the cells output-striped across the MCUs and hence across its MCU input bundles.

In one example, cut-down embodiments of the routers have fewer MCUs 40 as compared with a full-scale router. To utilize the same components as a full-scale router, but with a reduced physical number of MCUs, a reduced number of physical MCUs perform the function of the complete number of MCUs by each physical MCU masquerading as several logical MCUs. The LCUs' conceptually see a full complement of MCUs. Each LCU behaves as though there were a full complement of MCUs in the switching engines 24 and so receives cell data and notifications over all of its input ports.

In one embodiment, on its input-side, each MCU 40 receives all cells from the striper 38 on a single wiring bundle, which requires no connectivity changes as compared with the full-scale router. The output-side of the MCU is affected in the same way as the LCU's inputs. Each MCU uses all of its output bundles, treating the available LCUs 36 as though they were a fully populated system. Thus, the LCUs are also masquerading as multiple LCUs in order for the MCU to operate the same way that it does in a full-scale router.

Both of these forms of masquerading are handled by functionality and software in the striper 38. In one embodiment, both the LCU 36 and the MCU 40 function as if they were in a full-scale router, when in fact they are in a cut-down router. This is advantageous in that the same components (both physically and operationally) may be used in the cut-down systems as in the full-scale system, with only a change in the operating code of the striper (no attendant physical change is necessary).

The striper 38 is capable of receiving 40 Gbps from each of six active NPUs 34 in the full-scale router. A cut-down router with six or fewer NPUs, and no redundancy, will require only one striper 38 and therefore only one switching engine 24. A cut-down router with six or fewer NPUs, but with redundancy, will have two stripers. To satisfy the bandwidth requirement, a cut-down system's switchcard will need only a reduced number of MCUs 40 and their associated memory subsystems. The striper is informed, during boot-up, of how many MCUs are present in the router 20 in order to stripe the data across them uniformly. In one embodiment, the number of MCUs on a switchcard in a cut-down router is an even factor of the fully populated switchcard's MCU count (12), therefore 6, 4, 3, 2, and 1.

Figure 41A:
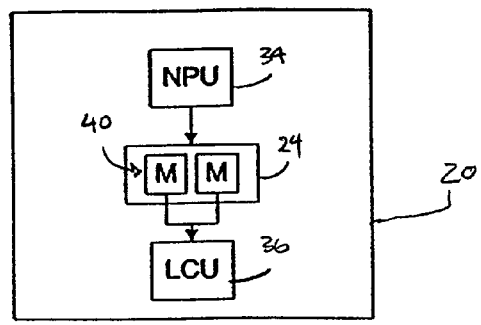
FIGS. 41A-41D illustrates examples of cut-down router topologies for routers having no redundancy, in accordance with one embodiment of the present invention.
Figure 41B:
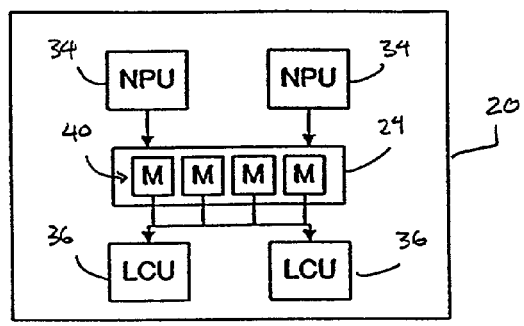
Figure 41C:
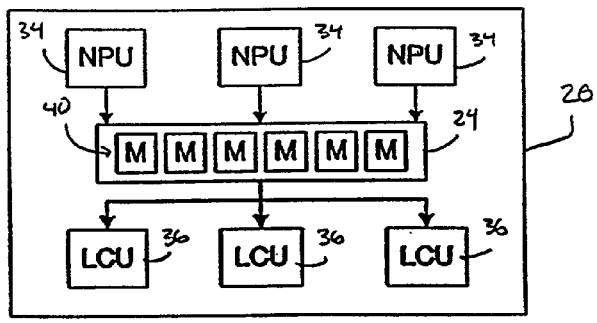
Figure 41D:
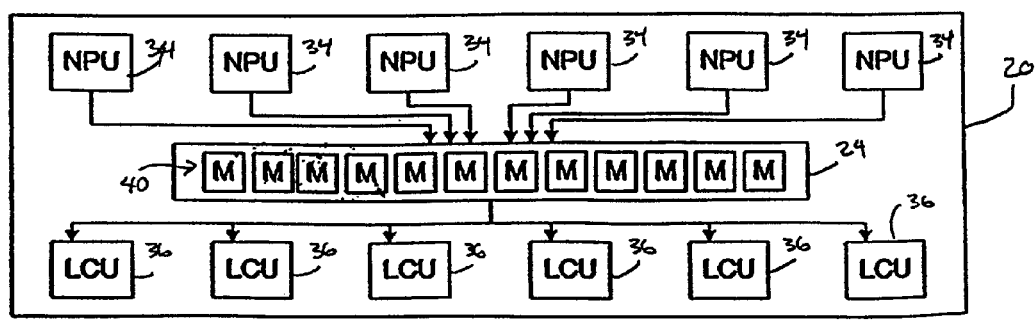

There are various configurations of a cut-down router 20, depending in part on the processing requirements for the router and the desired redundancy. FIGS. 41A-41D illustrate "no redundancy" topologies according to the present invention for cut-down routers, wherein FIG. 41A shows one LCU/NPU and two MCUs on a single switchcard 24; FIG. 41B shows two LCUs 36/NPUs 34 and four MCUs 40 on a single switchcard 24; FIG. 41C shows three LCUs 36/NPUs 34 and six MCUs 40 on a single switchcard 24; and FIG. 41D shows six LCUs 36/NPUs 34 and twelve MCUs 40 on a single switchcard 24.

Figure 42A:
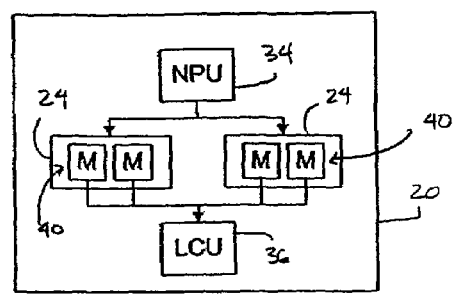
FIGS. 42A-42D illustrates examples of cut-down router topologies for routers having 1+1 redundancy, in accordance with one embodiment of the present invention.
Figure 42B:
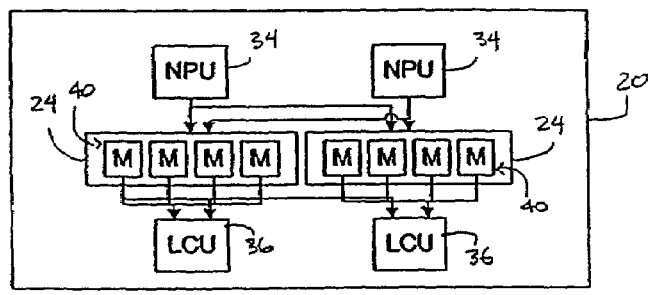
Figure 42C:
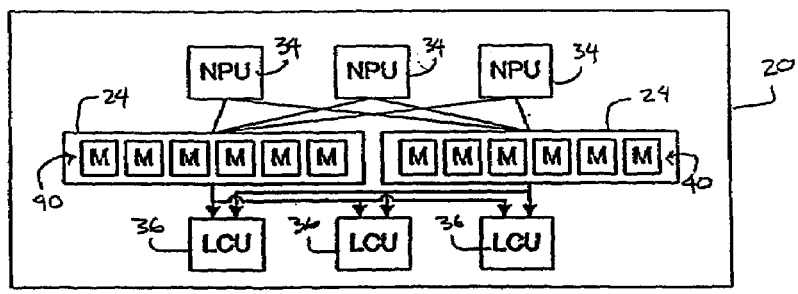
Figure 42D:
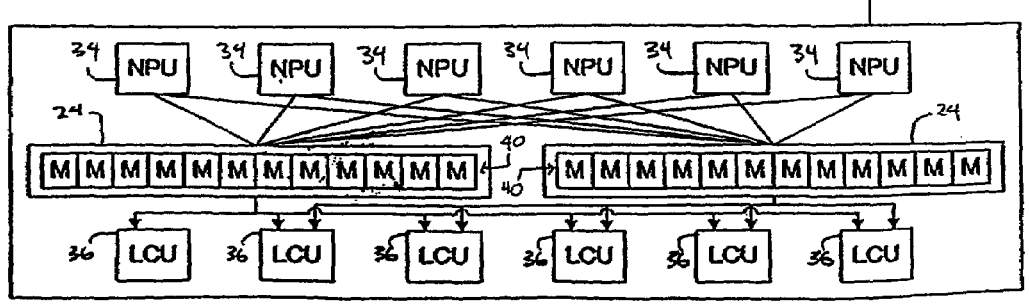

FIGS. 42A-42D illustrate "1+1 redundancy" topologies according to the present invention for cut-down routers, wherein FIG. 42A shows one LCU 36/NPU 34 and four MCUs 40 on two switchcards 24; FIG. 42B shows two LCUs/NPUs and eight MCUs on two switchcards; FIG. 42C shows three LCUs/NPUs and twelve MCUs on two switchcards; and FIG. 42D shows six LCUs/NPUs and twenty-four MCUs on two switchcards.

Figure 43A:
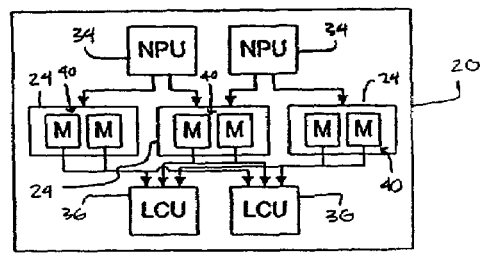
FIGS. 43A-43C illustrates examples of cut-down router topologies for routers having 2+1 redundancy, in accordance with one embodiment of the present invention.
Figure 43B:
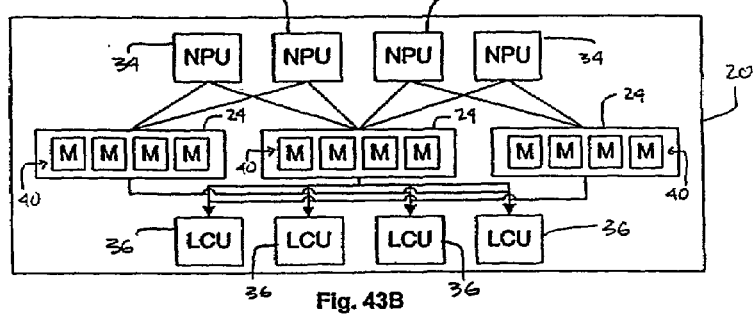
Figure 43C:
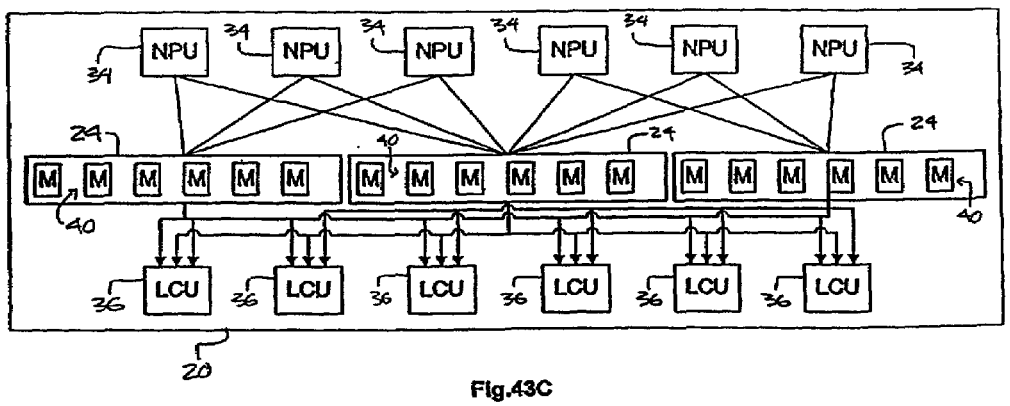

FIGS. 43A-43C illustrate "2+1" redundancy topologies according to examples of the present invention for cut-down routers, wherein FIG. 43A shows two LCUs 36/NPUs 34 and six MCUs 40 on three switchcards 24; FIG. 43B shows four LCUs/NPUs and 12 MCUs on three switchcards; and FIG. 43C shows six LCUs/NPUs and eighteen MCUs on three switchcards.

In one embodiment, the full-scale router backplane is used with a cut-down router 20. To understand how the existing backplane may be used, it is desirable to understand how the NPUs 34 are connected to redundant and active switching engines 34. FIG. 39 illustrates one embodiment of the rotationally symmetric connectivity between the NPU 34 and the switching engine 24 in a router 20 according to the present invention.

A set of mappings is used to describe the operational changes to the striper 38 and the wiring between the striper 38 and MCU 40 to implement a cut-down embodiment of the router. The mappings define one example of the logic of software in the striper and the wiring on the cut-down router's switchcard.

Definition of Constants:

$N_{MCU}$=Number of MCUs 40 in the switching engine 24 (i.e., on a switchcard)

$N_{LCU}$=Number of LCUs 36 in the cut-down router 10

To manage each cell or cell-request to an MCU 40 with the reduced number of MCUs in a cut-down router, the striper 38 maps, in one example, a virtual MCU (the MCU to which the cell or request would have been sent in a full system) to a Physical MCU (the MCU to which the cell or request is actually sent) in a round robin manner using the following modulo mapping:

Physical MCU number=(virtual MCU number)mod $(N_{MCU})$

Similarly, to manage the transmission of cells from the MCUs 40 to LCUs 36 a mapping between a Physical LCU (the LCU where we want the cell to actually arrive) and a Virtual LCU (the LCU that the MCU would have sent the cell to in a full system) is utilized, in one example. The wiring between the MCUs and the LCUs is effectively a mapping from the Virtual LCU to the Physical LCU. To insure correct cell routing, the striper 38 must invert the above-described modulo mapping to translate the Physical LCU to the Virtual LCU for each cell or cell request that is sent to a MCU. In the MCU, a specific set of hardware queues within the MCU are dedicated to each LCU bundle. Accordingly, the virtual LCU designates the set of queues to use and the exit bundle from the MCU, in the cut-down implementation.

In one example, the striper computes the virtual MCU number using the following equation:

Virtual LCU number =

$$int \frac{(\text{virtual } MCU \text{ number})}{N_{MCU}} * N_{LCU} + \text{physical } LCU \text{ number}$$

To see why this equation works, observe that the term int $$\left(\frac{\text{virtual } MCU \text{ number}}{N_{MCU}}\right)$$

effectively groups the virtual MCUs and then computes the index of the group where each group is of size $N_{MCU}$. Within each group, the cyclic assignment of MCU output ports is interleaved in groups of $N_{LCU}$ ports, and then the physical LCU index selects the offset within that group.

Figure 48:
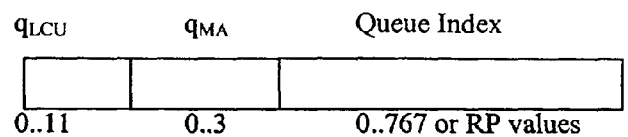
FIG. 48 illustrates an example of partitioning of a queue, in accordance with one embodiment of the present invention.

To distinguish between the cells for different logical MCUs, which are stored in one physical MCU, the striper 38 remaps the queue. One example of partitioning of a queue is shown in FIG. 48, where the queue number $q_{LCU}$ is the queue assigned by the NPU 34 to the packet in full-scale router; and $q_{MA}$ corresponds to the media adapter 32.

This partitioning operation affects the queue number field ($q_{LCU}$ field) and can be expressed as follows:

$q_{LCU}$ seen by MCU =

$$int \frac{(\text{virtual } MCU \text{ number})}{N_{MCU}} * N_{LCU} + (q_{LCU} \text{ given by } NPU)$$

The above-described partitioning operation limits the NPU forwarding table 64 to assigning packets to queues with the queue number field ($q_{LCU}$) within the range:

{O . . . $N_{LCU}$-1}

The NPU 34 does not generate $q_{LCU}$ numbers outside this range. The following table provides exemplary mappings according to the above-described calculations.

TABLE 1

Queue remapping for cut-down routers having (a) one LCU and two MCUs, (b) two LCUs and four MCUs, and (c) three LCUs and six MCUs.

| MCU # selected by normal striper algorithm | N_ LCU = 1 N_ MCU = 2 MCU # cell sent to | Number added to q_lcu | N_ LCU = 2 N_ MCU = 4 MCU # cell sent to | Number added to q_lcu | N_ LCU = 3 N_ MCU = 6 MCU # cell sent to | Number added to q_luc |
|---|---|---|---|---|---|---|
| 0 | 0 | 0 | 0 | 0 | 0 | 0 |
| 1 | 1 | 0 | 1 | 0 | 1 | 0 |
| 2 | 0 | 1 | 2 | 0 | 2 | 0 |
| 3 | 1 | 1 | 3 | 0 | 3 | 0 |
| 4 | 0 | 2 | 0 | 2 | 4 | 0 |
| 5 | 1 | 2 | 1 | 2 | 5 | 0 |
| 6 | 0 | 3 | 2 | 2 | 0 | 3 |
| 7 | 1 | 3 | 3 | 2 | 1 | 3 |
| 8 | 0 | 4 | 0 | 4 | 2 | 3 |
| 9 | 1 | 4 | 1 | 4 | 3 | 3 |
| 10 | 0 | 5 | 2 | 4 | 4 | 3 |
| 11 | 1 | 5 | 3 | 4 | 5 | 3 |

Figure 49:
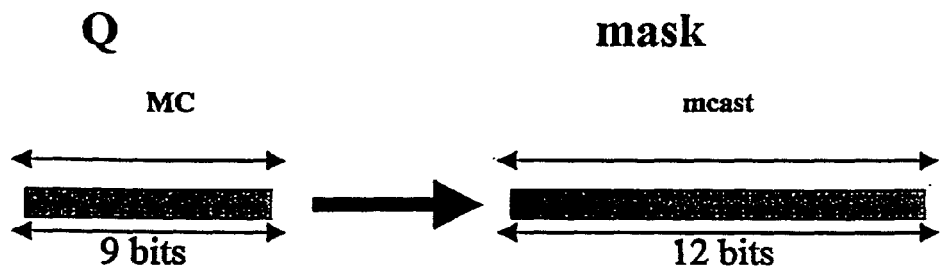
FIG. 49 illustrates an example of a queue number, in accordance with one embodiment of the present invention.

For multicast queues, the queue number is a nine bit queue number which is an index to lookup a 12 bit multicast mask, which is structured differently than a unicast queue number. As shown in FIG. 49, the nine bit queue number ("$Q_{MC}$") encodes 512 multicast queues each of which is assigned to a 12 bit mask. The 12 bits in the multicast mask correspond to the 12 linecards that need to transmit the multicast packet or cell.

In a cut-down router 20, the modifications are made to the multicast mask rather than $Q_{MC}$. The multicast mask exists in both the striper 38 and the MCUs 40, but not in the LCU 36. The multicast mask can be derived by a lookup, and a suitable queue number mapping. The programming of the lookup table provides the correct mapping in the multicast mask. Generally the approach is similar to that of unicast: the cells of a packet are striped across the virtual MCUs, and to transmit the cells properly to the physical LCUs, some transformations are required to address some cells to virtual LCUs. The following calculation is one method for modifying the multicast mask in a cut-down router 20 according to the present invention.

Mask$_{Mcast}$ seen by MCU =

$$\text{Mask}_{Mcast} \text{ given by } NPU << \left( int \frac{(\text{virtual } MCU \text{ number})}{N_{MCU}} * N_{LCU} \right)$$

The above described method for modifying the mask is best understood if each individual multicast queue is viewed as a related set of queues where the multicast mask is viewed as a part of the queue number encoded in unary. Unlike a unicast queue, which encodes the queue number in binary, the LCU portion of the multicast queue number can reference several LCU queues because it can set a separate bit for each one.

Each time the multicast mask is shifted, it indicates that the striper 38 has cycled through all of the physical MCUs and it needs to transmit to the next set of virtual MCUs and virtual LCUs. Once the striper has cycled through all of the virtual MCUs, it needs to go back to using the original mask for the multicast queue.

In one example, the striper 38 does not transmit its computations to the MCUs 40, as it does with the unicast case, which is addressed by remapping $Q_{MC}$, the multicast queue number. The computed values of $Q_{MC}$ cause the MCUs to fetch the correct mask to store cells for virtual LCUs.

It is envisioned that various mapping functions for $Q_{MC}$ would work. In one example, the three high order bits of the nine bit $Q_{MC}$ are reserved for use in this transformation. The three high order bits are set to int $$\left(\frac{\text{virtual } MCU \text{ number}}{N_{LCU}}\right)$$

This value never exceeds six so three bits suffice. To update the values of the three high order bits of $Q_{MC}$, multiples of $2^6$ are added to the current value of $Q_{MC}$.

As discussed earlier, the LCU 36 does not realize that it is operating in a cut-down router 20, so the three high order bits of $Q_{MC}$ are cleared when transmitting a multicast cell to a LCU 36. The masking of these bits is performed by the MCU 40 when it is configured as being part of a cut-down router.

In an example of multicast mapping in a cut-down router 20, a multicast queue q has a mask with two bits set representing LCUs i and j. In a cut-down router, the cells coming out of the striper 38 are sent to the physical MCUs with queue numbers:

q, q+$2^6$, q+$2*2^6$, q+$3*2^6$, . . .

Similarly, the striper takes requests from LCU l to this queue and maps them into requests for queues: q, q+$2^6$, q+$2*2^6$, q+$3*2^6$, . . .

More generally:

$$Q_{MC} = Q_{MC} + int\left(\frac{\text{virtual } MCU \text{ number}}{N_{MCU}}\right)*2^6$$

The requests appear to come from the appropriate virtual LCU, as with the unicast case, so the striper 38 again applies the function:

virtual $LCU$ number =

$$int\left(\frac{\text{virtual } MCU \text{ number}}{N_{MCU}}\right)*N_{LCU} + \text{physical } LCU \text{ number}$$

To continue the example, suppose mask {ij} represents a mask with bits for i and j set. Then the multicast queue q is configured as:

| | |
|---|---|
| Queue q | uses mask {ij} |
| Queue q + $2^6$ | uses mask {i + $N_{LCU}$j + $N_{LCU}$} or mask {ij} << $N_{LCU}$ |
| Queue q + 2 * $2^6$ | uses mask {i + 2 * $N_{LCU}$j + 2 * $N_{LCU}$} or mask {ij} << 2 * $N_{LCU}$ |
| Queue q + 3 * $2^6$ | uses mask {i + 3 * $N_{LCU}$j + 3 * $N_{LCU}$} or mask {ij} << 3 * $N_{LCU}$ |

An important aspect of this design choice is whether or not taking away three bits from the multicast queue number is affordable. Recall, in a full-scale router there are 12 linecards and that $2^{12}$ possible combinations of LCUs 36 are encoded in only $2^9$ queue numbers. Thus, the router 20 is oversubscribed by a factor of $2^3$ per multicast queue. In a cut-down router with six linecards, $2^6$ combinations of LCUs are encoded in $2^6$ possible multicast queues, so the cut-down router is not oversubscribed. If the number of linecards is reduced further, then the number of possible combinations is decreased without decreasing the number of queues, so the cut-down router actually becomes undersubscribed. Thus, multicast in a cut-down router actually provides some advantages as compared with a full-scale router.

To support these transformations of queue numbers in the striper 38, the wiring between MCUs 40 and LCUs 36 is configured differently for a cut-down router 20 as compared with a full-scale router 20. The following formulation provides a method for determining the connectivity:

There are $N_{MCU}$ MCUs 40 per switchcard

There are $N_{LCU}$ LCUs 36 in the router 20

It is desirable to specify how output o of MCU M connects to input i of LCU L

Output o of MCU M connects to LCU L=o mod $N_{LCU}$.

input i=M+$N_{MCU}$*int(o/$N_{LCU}$)

Figure 44A:
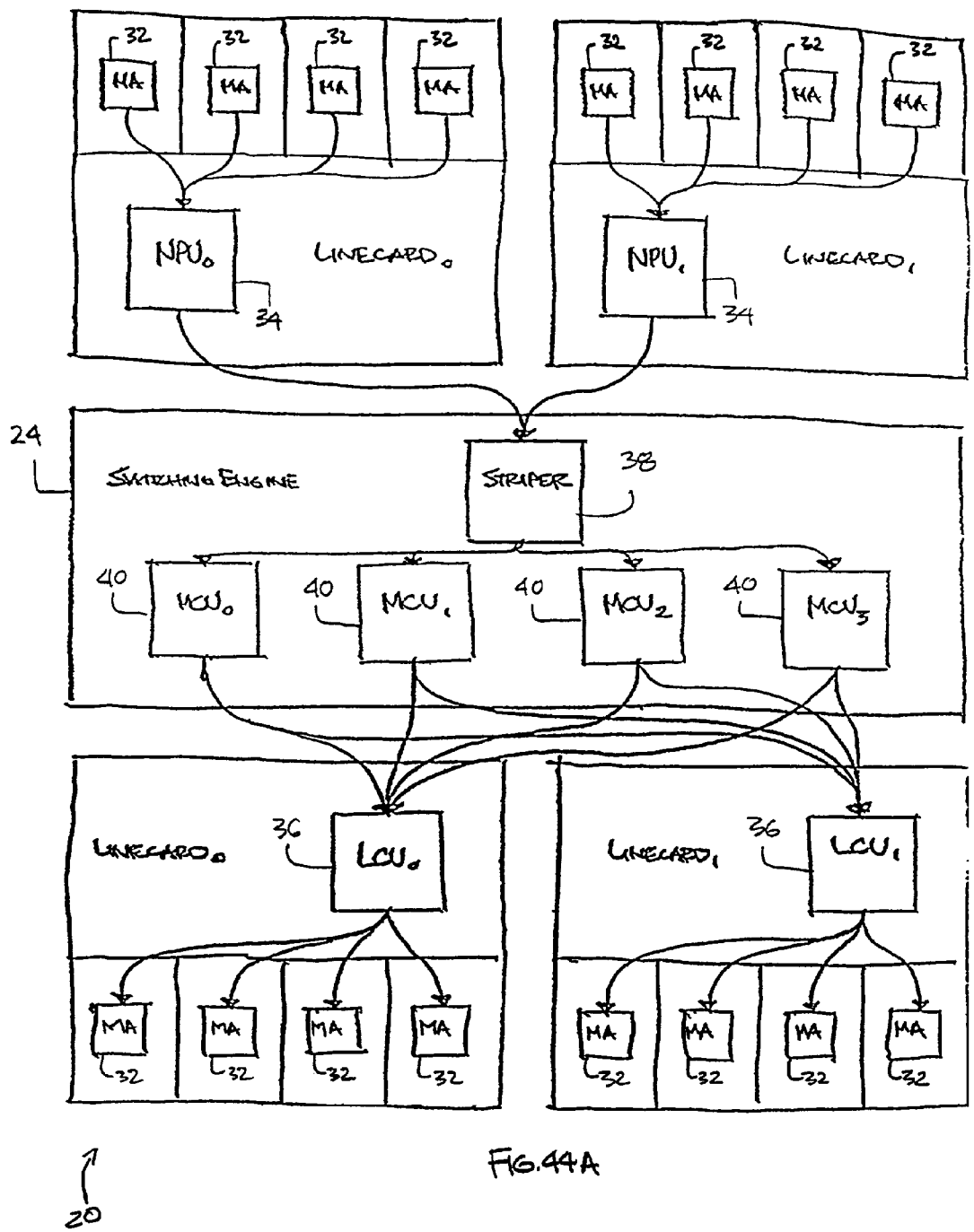
FIG. 44A illustrates a cut-down router having two NPUs, two LCUs, one striper, and four MCUs, in accordance with one embodiment of the present invention.
Figure 44B:
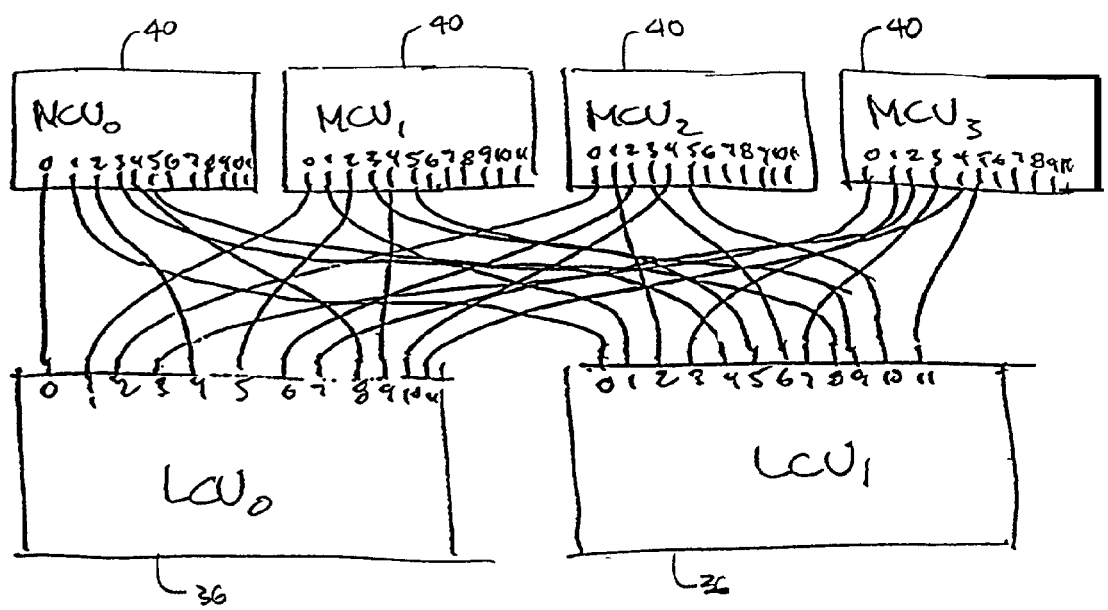
FIG. 44B illustrates an example of connections between the MCUs and LCUs of FIG. 44A, in accordance with one embodiment of the present invention.

FIG. 44A illustrates a connectivity, in one example, between the MCU 40 and the LCU 36 for an embodiment of a cut-down router 20 with one switching engine 24 having four MCUs and two LCUs ($LCU_0$-$LCU_1$) according to the above-described formulation for connectivity. In this embodiment, half of the MCU outputs are unconnected because they are unused in a cut-down router having only a single switching engine. The unconnected outputs would be employed by a router having an additional two linecards. The remaining half of the MCUs outputs are connected with the two LCUs. In this example, the router could have another four MCUs on a second switchcard to provide additional switchcard bandwidth. In the embodiment illustrated in FIG. 44B, each LCU ($LCU_0$-$LCU_1$) has one third of its available inputs connected with the MCUs ($MCU_0$-$MCU_3$). The remaining unconnected two thirds of the inputs are unused, but may be connected with second and third switchcards if the cut-down router is scaled-up.

The following table shows one mapping between the MCU 40 and its output ports and the LCU 36 and its input ports for the embodiment illustrated in FIG. 44A.

TABLE 2

Port mapping between MCU 40 and LCU 36 in a cut-down router 20 having 2 LCUs and 4 MCUs.
N_LCU = 2
N_MCU = 4

| MCU M | Output o | LCU L | Input i |
|---|---|---|---|
| 0 | 0 | 0 | 0 |
| 0 | 1 | 1 | 0 |
| 0 | 2 | 0 | 4 |
| 0 | 3 | 1 | 4 |
| 0 | 4 | 0 | 8 |
| 0 | 5 | 1 | 8 |
| 1 | 0 | 0 | 1 |
| 1 | 1 | 1 | 1 |
| 1 | 2 | 0 | 5 |
| 1 | 3 | 1 | 5 |
| 1 | 4 | 0 | 9 |
| 1 | 5 | 1 | 9 |
| 2 | 0 | 0 | 2 |
| 2 | 1 | 1 | 2 |
| 2 | 2 | 0 | 6 |
| 2 | 3 | 1 | 6 |
| 2 | 4 | 0 | 10 |
| 2 | 5 | 1 | 10 |
| 3 | 0 | 0 | 3 |
| 3 | 1 | 1 | 3 |
| 3 | 2 | 0 | 7 |
| 3 | 3 | 1 | 7 |
| 3 | 4 | 0 | 11 |
| 3 | 5 | 1 | 11 |

In one instance, a cut-down router that employs only a single switchcard 24 uses only half of the MCU output connections. This is true both for fully populated switchcards and for ones in a cut-down router. In a cut-down router that employs two switchcards, or more, the MCUs 40 use all their output bundles to connect to the other half of the outgoing linecards or LCUs 36, in one example.

Figure 45:
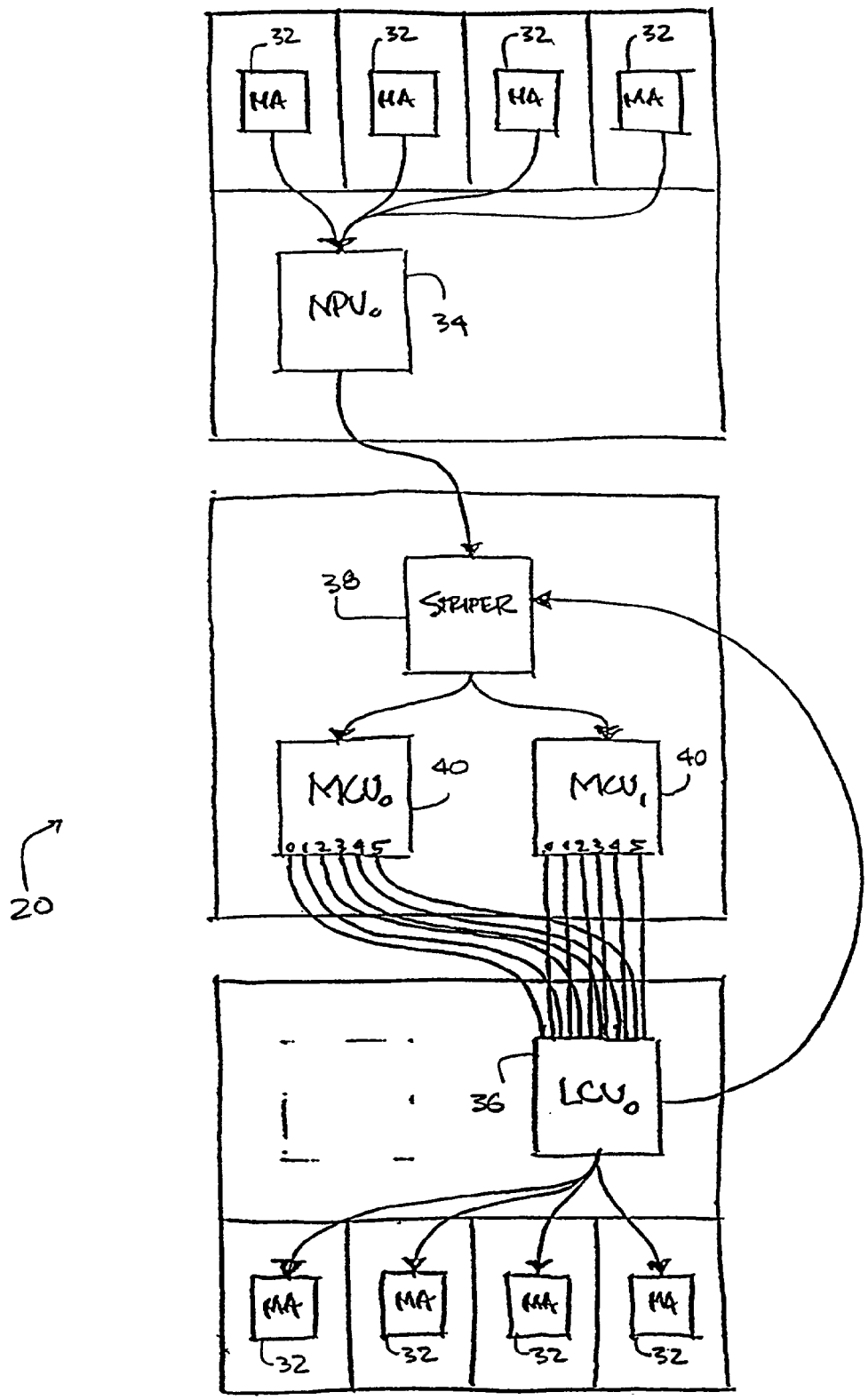
FIG. 45 illustrates a cut-down router having one NPU, one LCU, one striper, and two MCUs, in accordance with one embodiment of the present invention.

The simplest cut-down router, which has are fully populated linecard, is about a 40 Gbps router. FIG. 45 illustrates the 40 Gbps cut-down router with a fully populated linecard. This system would use a backplane that is different from the one in the full-scale router.

Figure 46:
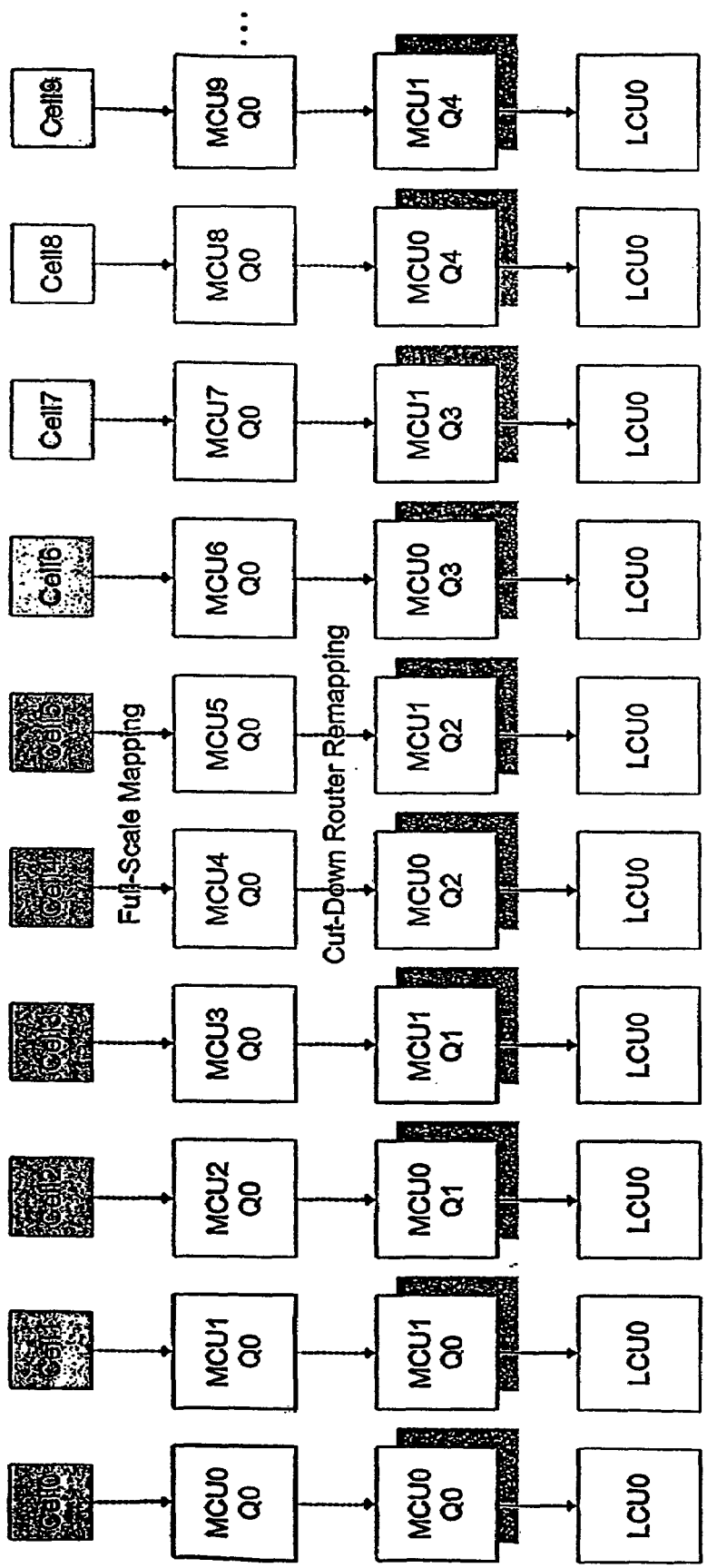
FIG. 46 illustrates an example of cell mapping for the cut-down router illustrated in FIG. 45, in accordance with one embodiment of the present invention.

In one example as shown in FIGS. 45-46 where there are two MCUs ($MCU_0$-$MCU_1$) and one LCU, the following table describes how the cells of a packet are distributed by the striper 38 and received by the LCU 36 ($LCU_0$ in this case).

TABLE 3

Example of cut-down system with 1 LCU and 2 MCUs

Striper logically writes cells across MCUs as if in a full-scale system

| (Virtual MCU number) | 0 | 1 | 2 | 3 | 4 | 5 | 6 | 7 | 8 | 9 | 10 | 11 |
|---|---|---|---|---|---|---|---|---|---|---|---|---|

Physically, striper directs cells towards MCUs as follows:

| (Physical MCU number) | 0 | 1 | 0 | 1 | 0 | 1 | 0 | 1 | 0 | 1 | 0 | 1 |
|---|---|---|---|---|---|---|---|---|---|---|---|---|

And striper re-maps the queues as follows based on the number of actual MCUs:

| (Queue number) | 0 | 0 | 1 | 1 | 2 | 2 | 3 | 3 | 4 | 4 | 5 | 5 |
|---|---|---|---|---|---|---|---|---|---|---|---|---|

From a connectivity perspective, MCU output ports are coupled to LCU0 input ports as follows:

| | | | | | | | | | | | | |
|---|---|---|---|---|---|---|---|---|---|---|---|---|
| MCU0:LCU0 | 0:0 | | 1:2 | | 2:4 | | 3:6 | | 4:8 | | 5:10 | |
| MCU1:LCU0 | | 0:1 | | 1:3 | | 2:5 | | 3:7 | | 4:9 | | 5:11 |

LCU0 starts by requesting cells from Q0 as if across a full set of MCUs

| (Q:MCU) | 0:0 | 0:1 | 0:2 | 0:3 | 0:4 | 0:5 | 0:6 | 0:7 | 0:8 | 0:9 | 0:10 | 0:11 |
|---|---|---|---|---|---|---|---|---|---|---|---|---|

Striper translates LCU0's requests as follows using the re-mapped queues, and obtains the cells:

| (Q:MCU) | 0:0 | 0:1 | 1:0 | 1:1 | 2:0 | 2:1 | 3:0 | 3:1 | 4:0 | 4:1 | 5:0 | 5:1 |
|---|---|---|---|---|---|---|---|---|---|---|---|---|

These cells arrive at LCU0 looking like cells from Q0

| (Q:MCU) | 0:0 | 0:1 | 0:2 | 0:3 | 0:4 | 0:5 | 0:6 | 0:7 | 0:8 | 0:9 | 0:10 | 0:11 |
|---|---|---|---|---|---|---|---|---|---|---|---|---|

Hence, LCU0 receives all cells from the queues of the actual MCUs as if there were a full set of MCUs in the system.

Figure 47:
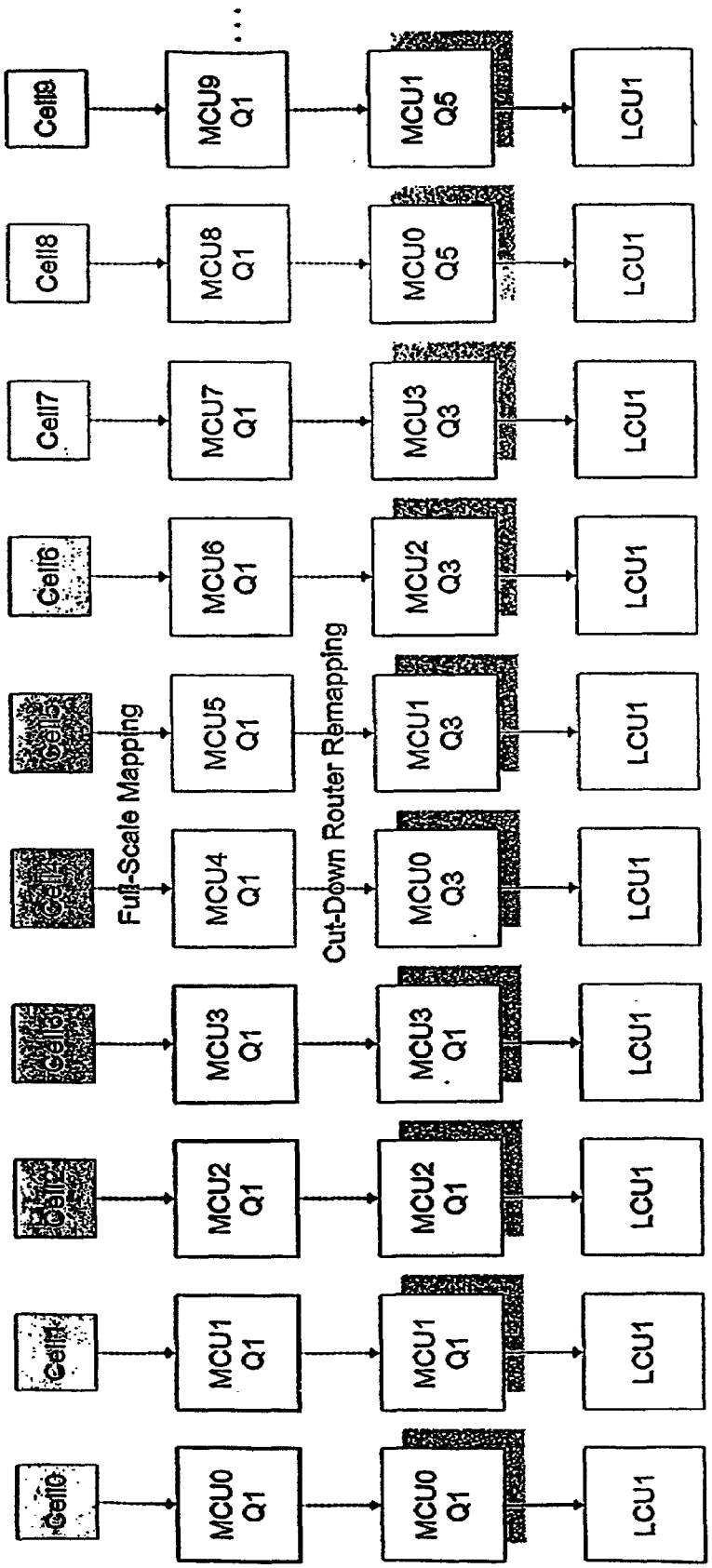
FIG. 47 illustrates an example of cell mappings for the cut-down router illustrated in FIG. 32, in accordance with one embodiment of the present invention.

One embodiment of a cut-down router uses two fully populated linecards to provide about 80 Gbps in the system. This cut-down router requires a switchcard or backplane which is different from the one in the full-scale router. FIG. 44A, illustrates the 80 Gbps cut-down router. The following table along with FIG. 47 describes an example of how the cells of a packet are distributed by the striper 38 and received by the LCUs 36.

Hence, LCU1 receives all cells from the queues of the actual MCUs as if there were a full set of MCUs in the system.

The following table illustrates one example of routing a multicast packet in a cut-down router having three LCUs 36 (LCU 0, LCU 1, and LCU 2) and six MCUs. In this example, a packet arrives at the striper destined for multicast queue number 2, denoted by $Q_{MC}=2$, and queue 2 has a multicast mask of 0x6, or binary 000000000110, indicating LCUs 1 and 2.

TABLE 4

Example of cut-down system with 2 LCUs and 4 MCUs

Striper logically writes cells across MCUs as if in a full-scale system

| (Virtual MCU number): | 0 | 1 | 2 | 3 | 4 | 5 | 6 | 7 | 8 | 9 | 10 | 11 |
|---|---|---|---|---|---|---|---|---|---|---|---|---|

Physically, striper directs cells towards MCUs as follows:

| (Physical MCU number): | 0 | 1 | 2 | 3 | 0 | 1 | 2 | 3 | 0 | 1 | 2 | 3 |
|---|---|---|---|---|---|---|---|---|---|---|---|---|

And striper re-maps the queues as follows based on the number of actual MCUs:

| (Queue number) | 1 | 1 | 1 | 1 | 3 | 3 | 3 | 3 | 5 | 5 | 5 | 5 |
|---|---|---|---|---|---|---|---|---|---|---|---|---|

From a connectivity perspective, MCU output ports are coupled to LCU1 input ports as follows:

| | | | | | | | | | | | | |
|---|---|---|---|---|---|---|---|---|---|---|---|---|
| MCU0:LCU1 | 1:0 | | | | 3:4 | | | | 5:8 | | | |
| MCU1:LCU1 | | 1:1 | | | | 3:5 | | | | 5:9 | | |
| MCU2:LCU1 | | | 1:2 | | | | 3:6 | | | | 5:10 | |
| MCU3:LCU1 | | | | 1:3 | | | | 3:7 | | | | 5:11 |

LCU1 starts by requesting cells from Q1 as if across a full set of MCUs

| (Q:MCU) | 1:0 | 1:1 | 1:2 | 1:3 | 1:4 | 1:5 | 1:6 | 1:7 | 1:8 | 1:9 | 1:10 | 1:11 |
|---|---|---|---|---|---|---|---|---|---|---|---|---|

Striper translates LCU1's requests as follows using the re-mapped queues, and obtains the cells:

| (Q:MCU) | 1:0 | 1:1 | 1:2 | 1:3 | 3:0 | 3:1 | 3:2 | 3:3 | 5:0 | 5:1 | 5:2 | 5:3 |
|---|---|---|---|---|---|---|---|---|---|---|---|---|

These cells arrive at LCU1 looking like cells from Q1

| (Q:MCU) | 1:0 | 1:1 | 1:2 | 1:3 | 1:4 | 1:5 | 1:6 | 1:7 | 1:8 | 1:9 | 1:10 | 1:11 |
|---|---|---|---|---|---|---|---|---|---|---|---|---|

TABLE 5

Example of routing a multicast packet cut-down system with 3 LCUs.

Striper logically writes cells across MCUs as if in a full-scale system

| (Virtual MCU number): | 0 | 1 | 2 | 3 | 4 | 5 | 6 | 7 | 8 | 9 | 10 | 11 |
|---|---|---|---|---|---|---|---|---|---|---|---|---|

Physically, striper directs cells towards MCUs as follows:

| (Physical MCU number): | 0 | 1 | 2 | 3 | 4 | 5 | 0 | 1 | 2 | 3 | 4 | 5 |
|---|---|---|---|---|---|---|---|---|---|---|---|---|

The queue number is transformed by adding 1 to the top three bits of the 9-bit multicast queue number. So, the transformed queue number is $2 + 2 \wedge 6 = 66$, resulting in cells with q_mc number:

| (Queue number, multicast mask number in hex) | 2, 6 | 2, 6 | 2, 6 | 2, 6 | 2, 6 | 2, 6 | 66, 0x30 | 66, 0x30 | 66, 0x30 | 66, 0x30 | 66, 0x30 | 66, 0x30 |
|---|---|---|---|---|---|---|---|---|---|---|---|---|

A pair of delta notifications are sent by the striper to LCU 1 (via MCU 1) and LCU 2 (via MCU2) in the normal way, indicating the presence of this packet and giving its size and the original queue number. The LCUs are therefore aware of this packet and expect to find it on queue 2 and striped across all virtual MCUs.

LCU1 starts by requesting cells from queue 2 as if across a full set of MCUs

| (Physical LUC: Virtual MCU) | 1:0 | 1:1 | 1:2 | 1:3 | 1:4 | 1:5 | 1:6 | 1:7 | 1:8 | 1:9 | 1:10 | 1:11 |
|---|---|---|---|---|---|---|---|---|---|---|---|---|

LCU2 starts by requesting cells from queue 2 as if across a full set of MCUs

| (Physical LCU: Virtual MCU) | 2:0 | 2:1 | 2:2 | 2:3 | 2:4 | 2:5 | 2:6 | 2:7 | 2:8 | 2:9 | 2:10 | 2:11 |
|---|---|---|---|---|---|---|---|---|---|---|---|---|

Striper translates the queue number in each request to:

| (queue: translated queue) | 2:2 | 2:2 | 2:2 | 2:2 | 2:2 | 2:2 | 2:66 | 2:66 | 2:66 | 2:66 | 2:66 | 2:66 |
|---|---|---|---|---|---|---|---|---|---|---|---|---|

Striper transforms physical LCU number to virtual LCU numbers:

| (from LCU1) | 1 | 1 | 1 | 1 | 1 | 1 | 4 | 4 | 4 | 4 | 4 | 4 |
|---|---|---|---|---|---|---|---|---|---|---|---|---|
| (from LCU2) | 2 | 2 | 2 | 2 | 2 | 2 | 5 | 5 | 5 | 5 | 5 | 5 |

In summary: the MCUs see the following requests:

| (Queue: virtual LCU: physical MCU) from LCU1 | 2:1:0 | 2:1:1 | 2:1:2 | 2:1:3 | 2:1:4 | 2:1:5 | 66:4:0 | 66:4:1 | 66:4:2 | 66:4:3 | 66:4:4 | 66:4:5 |
|---|---|---|---|---|---|---|---|---|---|---|---|---|
| (Queue: physical LCU: virtual MCU) to LCU2 | 2:2:0 | 2:2:1 | 2:2:2 | 2:2:3 | 2:2:4 | 2:2:5 | 66:5:0 | 66:5:1 | 66:5:2 | 66:5:3 | 66:5:4 | 66:5:5 |

MCU masks the top 3-bits of the multicast queue number $Q_{MC}$. These cells arrive at the LCUs looking like cells with (queue: physical LCU: virtual MCU) values.

| (Queue: physical LCU: virtual MCU) from LCU1 | 2:1:0 | 2:1:1 | 2:1:2 | 2:1:3 | 2:1:4 | 2:1:5 | 2:1:6 | 2:1:7 | 2:1:8 | 2:1:9 | 2:1:10 | 2:1:11 |
|---|---|---|---|---|---|---|---|---|---|---|---|---|
| (Queue: virtual LCU: physical MCU) from LCU2 | 2:2:0 | 2:2:1 | 2:2:2 | 2:2:3 | 2:2:4 | 2:2:5 | 2:2:6 | 2:2:7 | 2:2:8 | 2:2:9 | 2:2:10 | 2:2:11 |

All cells appear to be from queue $Q_{MC} = 2$ in the right order

While the methods disclosed herein have been described and shown with reference to particular operations or steps performed in a particular order, it will be understood that these operations or steps may be combined, sub-divided, or re-ordered to form equivalent methods without departing from the teachings of the present invention. Accordingly, unless specifically indicated herein, the order and grouping of the operations or steps are not generally intended to be a limitation of the embodiments of the present invention.

While the invention has been particularly shown and described with reference to various embodiments thereof, it will be understood by those skilled in the art that various other changes in the form and details may be made without departing from the spirit and scope of the invention.

We claim:

1. A method for storing a packet in a memory of a router, comprising:
    parsing a packet header to extract an Internet Protocol (IP) address and Quality of Service (QoS) data, the IP address and QoS data used, in part, to create a packet context;
    assigning an Interface Ordinal Descriptor (IOD) number to the packet, the IOD specifying a port upon which the packet was received;
    passing the IP address of the packet through a systolic array pipeline to perform a forwarding table lookup using a trie search of tries stored in a forwarding table;
    based on at least a portion of the IP address of the packet obtained from the forwarding table lookup, assigning the packet to at least one outgoing link of the router; and
    storing the packet in the memory based on the assigning operation.

2. The method of claim 1, wherein the assigning operation includes assigning a destination queue to the packet, the destination queue being mapped to the assigned outgoing link.

3. The method of claim 2, wherein the storing operation writes the packet in the destination queue.

4. The method of claim 1, wherein the storing operation includes dividing the packet into at least two cells.

5. The method of claim 4, wherein the at least two cells are less than or equal to 34 bytes.

6. The method of claim 4, wherein the storing operation writes the at least two cells in the destination queue.

7. The method of claim 4, wherein the storing operation writes the at least two cells in the destination queue contiguously in round robin order.

8. The method of claim 1, wherein the assigning operation further comprises:
provides a forwarding table memory having a plurality of nodes arranged in a trie, wherein each node contains a portion of various IP addresses, an indicator indicating if the IP address of the node is supported by the router and a queue of the router associated with the node;
comparing a portion of the IP address of the packet to one or more of the various destination addresses in the trie to locate the longest match there between;
determining the node which contains longest match and examining the indicator therein;
if the indicator, in the node which contains the longest match, indicates that the router supports the IP address of the node which contains the longest match, then associating the packet with the queue of the router associated with the node which contains the longest match.

9. The method of claim 8, wherein the comparing operation compares the most significant bits of the destination address of the packet to the most significant bits of the various destination addresses in the trie.

10. In a router for routing and switching data packets from one or more incoming links to one or more outgoing links, each data packet including a packet header specifying a Internet Protocol (IP) address and Quality of Service (QoS) data for the data packet, a method for routing and switching a data packet comprising:
receiving the data packet from the incoming link, and assigning an Interface Ordinal Descriptor (IOD) number to the data packet, the IOD specifying a port upon which the data packet was received;
passing the IP address of the packet through a systolic array pipeline to perform a forwarding table lookup using a trie search of tries stored in a forwarding table;
assigning at least one outgoing link to the data packet based on the IP address of the data packet, the IP address being obtained from the forwarding table lookup;
after the assigning operation, storing the data packet in a switching memory based on the assigned outgoing link for the data packet;
extracting the data packet from the switching memory; and
transmitting the data packet to the assigned outgoing link.

11. The method of claim 10, wherein the operation of assigning an outgoing link to the data packet includes assigning a destination queue to the data packet, the destination queue being mapped to the assigned outgoing link.

12. The method of claim 11, wherein the operation of storing the data packet in a switching memory includes the operation of storing the data packet in the assigned destination queue.

13. The method of claim 10, wherein the operation of storing the data packet in a switching memory includes dividing the data packet into at least two cells.

14. The method of claim 13, wherein the at least two cells are less than or equal to 34 bytes.

15. The method of claim 13, wherein the operation of storing the data packet in the switching memory includes the operation of storing the at least two cells in the destination queue.

16. The method of claim 13, wherein the operation of storing the data packet in the switching memory includes the operation of storing the at least two cells contiguously in round robin order in the destination queue.

17. In a router having one or more incoming links and one or more outgoing links, a method of routing and switching data packets where each data packet has a packet header specifying a destination internet protocol (IP) address for the packet, the method comprising:
providing a systolic array pipeline in communications with a forwarding table;
receiving a data packet from an incoming link;
looking-up the destination IP address of the data packet in the forwarding table using the systolic array pipeline, the looking-up performed using a trie search of tries stored in the forwarding table;
assigning an outgoing link to the data packet;
storing the data packet in a memory based on the assigning operation;
extracting the data packet from the memory as cells in a contiguous order stored in an assigned destination queue; and
transmitting the packet to the assigned outgoing link.

18. The method of claim 17, wherein the operation of storing a data packet in a memory occurs after the looking-up operation.

19. The method of claim 17, wherein the looking-up operation assigns a destination queue to the packet, the destination queue being mapped to the outgoing link for the packet.

20. The method of claim 19, wherein the operation of storing the data packet in a memory includes the operation of storing the data packet in the assigned destination queue.

21. The method of claim 19, wherein the operation of storing the data packet in a memory includes the operation of dividing the data packet into at least two cells.

22. The method of claim 21, wherein the at least two cells is less than or equal to 34 bytes.

23. The method of claim 21, wherein the operation of storing the data packet in a memory includes storing the at least two cells in the destination queue.

24. The method of claim 21, further comprising reassembling the data packet using, in part, the cells stored in the contiguous order.

25. In a router for routing and switching a data packet from an incoming link in a packet switched network to an outgoing link in the packet switched network, the data packet including a packet header having a Internet Protocol (IP) address for the packet, a method of routing and switching the data packet comprising:
receiving the data packet from the incoming link;
parsing a packet header to extract an Internet Protocol (IP) address and Quality of Service (QoS) data, the IP address and QoS data used, in part, to create a packet context; assigning an Interface Ordinal Descriptor (IOD) number to the packet, the IOD specifying a port upon which the packet was received;
determining the outgoing link for the data packet using a systolic array pipeline to perform a forwarding table lookup using a trie search of tries stored in a forwarding table;
writing a portion of the data packet to a memory as cells in a contiguous order; and
transmitting the data packet to the outgoing link.

26. The method of claim 25, wherein determining the outgoing link for the packet further includes:
- parsing the packet to extract the IP address;
- performing a forwarding table lookup of the IP address to assign a base destination queue to the data packet using a trie search of tries stored in a forwarding table; and
- queuing to assign a destination queue to the data packet.

27. The method of claim 26, wherein determining the outgoing link for the data packet includes assigning a destination queue to the data packet, the destination queue being mapped to the outgoing link for the data packet.

28. The method of claim 27, wherein writing the data packet further includes:
- dividing the data packet into at least two cells; and
- storing the at least two cells in the destination queue for the data packet.

29. The method of claim 28, further comprising reassembling the data packet using, in part, the cells stored in the contiguous order.

* * * * *

UNITED STATES PATENT AND TRADEMARK OFFICE
CERTIFICATE OF CORRECTION

PATENT NO.         : 7,382,787 B1
APPLICATION NO. : 10/177496
DATED                 : June 3, 2008
INVENTOR(S)       : Barnes et al.

It is certified that error appears in the above-identified patent and that said Letters Patent is hereby corrected as shown below:

Title Page; item (56);

On page 2, under "Other Publications", in column 2, line 7, after "Infocom" insert -- , --.

On page 2, under "Other Publications", in column 2, line 14, delete "Lookp" and insert -- Lookup --, therefor.

On page 2, under "Other Publications", in column 2, line 66, delete "No. 10/414.135" and insert -- No. 10/414,135 --, therefor.

On page 3, under "Other Publications", in column 1, line 4, delete "Saptember" and insert -- September --, therefor.

On page 3, under "Other Publications", in column 1, line 7, delete "Heirarchy" and insert -- Hierarchy --, therefor.

On page 3, under "Other Publications", in column 2, line 5, delete "Protocoi" and insert -- Protocol --, therefor.

On sheet 30 of 56, in "Box 140" ((Left side of 144C (Fig. 23)), line 1, after "N1" insert -- , --.

In column 6, line 62, delete "illustrates" and insert -- illustrate --, therefor.

In column 6, line 65, delete "illustrates" and insert -- illustrate --, therefor.

In column 7, line 1, delete "illustrates" and insert -- illustrate --, therefor.

In column 17, line 38, delete "(QOS)" and insert -- (QoS) --, therefor.

In column 17, line 53, delete "(QOS)" and insert -- (QoS) --, therefor.

In column 18, line 63, delete "(10D)" and insert -- (IOD) --, therefor.

In column 18, line 65, delete "(10D)" and insert -- (IOD) --, therefor.

In column 19, line 18, delete "(10D)" and insert -- (IOD) --, therefor.

In column 21, line 62, delete "datapath" and insert -- data path --, therefor.

UNITED STATES PATENT AND TRADEMARK OFFICE
CERTIFICATE OF CORRECTION

PATENT NO.       : 7,382,787 B1
APPLICATION NO.  : 10/177496
DATED            : June 3, 2008
INVENTOR(S)      : Barnes et al.

It is certified that error appears in the above-identified patent and that said Letters Patent is hereby corrected as shown below:

In column 25, line 19, delete "in cycle" and insert -- In cycle --, therefor.

In column 35, line 36, delete "(Quotient,Remainder)" and insert -- (Quotient, Remainder) --, therefor.

In column 40, line 13, delete "MCU," and insert -- $MCU_1$ --, therefor.

In column 41, line 58, delete "tp1," and insert -- $t_{p1}$, --, therefor.

In column 42, line 16, delete "MCU8" and insert -- $MCU_8$ --, therefor.

In column 48, line 14, delete "switch card" and insert -- switchcard --, therefor.

In column 49, line 15, delete "$NPU_{10}$" and insert -- $NPU_0$ --, therefor.

In column 49, line 28, delete "$NPU_1$" and insert -- $NPU_{11}$ --, therefor.

In column 53, line 51, delete "N·3 MCU" and insert -- N_ MCU --, therefor.

In column 53, line 55, delete "q_luc" and insert -- q_lcu --, therefor.

In column 57–58 (Table 3), line 3, after "number)" insert -- : --.

In column 57–58 (Table 3), line 5, after "number)" insert -- : --.

In column 59–60 (Table 5), line 15, delete "Virtural" and insert -- Virtual --, therefor.

In column 61, line 32, in Claim 10, after "specifying" delete "a" and insert -- an --, therefor.

In column 62, line 12, in Claim 17, delete "internet protocol" and insert -- Internet Protocol --, therefor.

UNITED STATES PATENT AND TRADEMARK OFFICE
CERTIFICATE OF CORRECTION

PATENT NO.         : 7,382,787 B1
APPLICATION NO.    : 10/177496
DATED              : June 3, 2008
INVENTOR(S)        : Barnes et al.

It is certified that error appears in the above-identified patent and that said Letters Patent is hereby corrected as shown below:

In column 62, line 52, in Claim 25, after "having" delete "a" and insert -- an --, therefor.

Signed and Sealed this

Fourteenth Day of October, 2008

JON W. DUDAS
*Director of the United States Patent and Trademark Office*